(12) United States Patent
Mock et al.

(10) Patent No.: US 11,538,052 B1
(45) Date of Patent: Dec. 27, 2022

(54) SYSTEM FOR GENERATING AND TRACKING OFFERS CHAIN OF TITLES

(71) Applicant: DOSH Holdings, Inc., Austin, TX (US)

(72) Inventors: Ed Mock, Austin, TX (US); Ryan Wuerch, Austin, TX (US)

(73) Assignee: DOSH HOLDINGS, INC., Austin, TX (US)

( * ) Notice: Subject to any disclaimer, the term of this patent is extended or adjusted under 35 U.S.C. 154(b) by 388 days.

(21) Appl. No.: 15/486,769

(22) Filed: Apr. 13, 2017

Related U.S. Application Data

(63) Continuation of application No. 15/375,979, filed on Dec. 12, 2016.

(51) Int. Cl.
  *G06Q 30/02* (2012.01)
  *G06Q 20/22* (2012.01)

(52) U.S. Cl.
  CPC ......... *G06Q 30/0215* (2013.01); *G06Q 20/22* (2013.01)

(58) Field of Classification Search
  CPC ..... G06Q 30/00; G06Q 30/0215; G06Q 20/22
  See application file for complete search history.

(56) References Cited

U.S. PATENT DOCUMENTS

| | | |
|---|---|---|
| 4,723,212 A | 2/1988 | Mindrum et al. |
| 4,910,672 A | 3/1990 | Off et al. |
| 5,173,851 A | 12/1992 | Off et al. |
| 5,220,501 A | 6/1993 | Lawlor et al. |
| 5,612,868 A | 3/1997 | Off et al. |
| 5,689,100 A | 11/1997 | Carrithers et al. |
| 5,832,457 A | 11/1998 | O'Brien et al. |
| 5,870,724 A | 2/1999 | Lawlor et al. |
| 5,884,035 A | 3/1999 | Butman et al. |
| 5,892,827 A | 4/1999 | Beach et al. |
| 5,915,007 A | 6/1999 | Klapka |
| 5,918,014 A | 6/1999 | Robinson |
| 5,926,795 A | 7/1999 | Williams |
| 6,026,370 A | 2/2000 | Jermyn |
| 6,067,524 A | 5/2000 | Byerly et al. |
| 6,202,054 B1 | 3/2001 | Lawlor et al. |
| 6,216,129 B1 | 4/2001 | Eldering |
| 6,240,394 B1 | 5/2001 | Uecker et al. |
| 6,278,979 B1 | 8/2001 | Williams |

(Continued)

FOREIGN PATENT DOCUMENTS

| | | |
|---|---|---|
| EP | 1259947 B1 | 10/2004 |
| EP | 1257992 B1 | 2/2007 |

(Continued)

OTHER PUBLICATIONS

Barron's Dictionary of Computer and Internet Terms (Year: 2009).*

(Continued)

*Primary Examiner* — Breffni Baggot
(74) *Attorney, Agent, or Firm* — Husch Blackwell LLP; Bryan D. Stewart; Andrew C. Landsman

(57) ABSTRACT

An offer processing system is configured to receive transaction data associated with user purchases from third party point of sales devices and/or third party payment processing (Continued)

systems. The offer processing system may then identify offers or savings that are applicable to the transaction data and redeem the offers on behalf of the users.

11 Claims, 46 Drawing Sheets

(56) References Cited

U.S. PATENT DOCUMENTS

| | | | |
|---|---|---|---|
| 6,282,516 | B1 | 8/2001 | Giuliani |
| 6,304,849 | B1 | 10/2001 | Uecker et al. |
| 6,307,958 | B1 | 10/2001 | Deaton et al. |
| 6,321,210 | B1 | 11/2001 | O'Brien et al. |
| 6,327,574 | B1 | 12/2001 | Kramer et al. |
| 6,332,126 | B1 | 12/2001 | Peirce et al. |
| 6,334,108 | B1 | 12/2001 | Deaton et al. |
| 6,351,735 | B1 | 2/2002 | Deaton et al. |
| 6,377,935 | B1 | 4/2002 | Deaton et al. |
| 6,424,949 | B1 | 7/2002 | Deaton et al. |
| 6,424,951 | B1 | 7/2002 | Shurling et al. |
| 6,434,747 | B1 | 8/2002 | Khoo et al. |
| 6,484,146 | B2 | 11/2002 | Day et al. |
| 6,560,578 | B2 | 5/2003 | Eldering |
| 6,604,085 | B1 | 8/2003 | Kolls |
| 6,795,809 | B2 | 9/2004 | O'Brien et al. |
| 6,885,994 | B1 | 4/2005 | Scroggie et al. |
| 7,024,374 | B1 | 4/2006 | Day et al. |
| 7,058,591 | B2 | 6/2006 | Giuliani et al. |
| 7,076,458 | B2 | 7/2006 | Lawlor et al. |
| 7,136,875 | B2 | 11/2006 | Anderson et al. |
| 7,228,285 | B2 | 6/2007 | Hull et al. |
| 7,292,999 | B2 | 11/2007 | Hobson et al. |
| 7,309,001 | B2 | 12/2007 | Banfield et al. |
| 7,310,609 | B2 | 12/2007 | Middleton, III et al. |
| 7,386,485 | B1 | 6/2008 | Mussman et al. |
| 7,392,224 | B1 | 6/2008 | Bauer et al. |
| 7,415,426 | B2 | 8/2008 | Williams et al. |
| 7,430,521 | B2 | 9/2008 | Walker et al. |
| 7,580,856 | B1 | 8/2009 | Pliha et al. |
| 7,693,790 | B2 | 4/2010 | Lawlor et al. |
| 7,774,229 | B1 | 8/2010 | Dernehl |
| 8,160,921 | B2 | 4/2012 | Gebhardt et al. |
| 8,302,169 | B1 | 10/2012 | Presotto et al. |
| 8,479,978 | B1 | 7/2013 | Miller et al. |
| 8,489,456 | B2 | 7/2013 | Burgess et al. |
| 8,527,421 | B2 | 9/2013 | Gailey et al. |
| 8,589,225 | B2 | 11/2013 | Cohagan et al. |
| 8,590,022 | B2 | 11/2013 | Faryna |
| 8,606,865 | B2 | 12/2013 | Layson, Jr. |
| 8,688,579 | B1 | 4/2014 | Ethington et al. |
| 10,580,049 | B2 | 3/2020 | Graylin |
| 2002/0023955 | A1 | 2/2002 | Frank et al. |
| 2002/0069115 | A1 | 6/2002 | Fitzpatrick |
| 2002/0078147 | A1 | 6/2002 | Bouthers et al. |
| 2002/0091566 | A1 | 7/2002 | Siegel |
| 2002/0123928 | A1 | 9/2002 | Eldering et al. |
| 2002/0147639 | A1 | 10/2002 | Williams et al. |
| 2003/0033199 | A1 | 2/2003 | Coleman |
| 2003/0040959 | A1 | 2/2003 | Fei et al. |
| 2003/0055723 | A1 | 3/2003 | English |
| 2003/0069808 | A1 | 4/2003 | Cardno |
| 2003/0088466 | A1 | 5/2003 | Fitzpatrick |
| 2003/0101454 | A1 | 5/2003 | Ozer et al. |
| 2003/0158844 | A1 | 8/2003 | Kramer et al. |
| 2004/0111491 | A1 | 6/2004 | Raja et al. |
| 2004/0122736 | A1 | 6/2004 | Strock et al. |
| 2004/0159700 | A1 | 8/2004 | Khan et al. |
| 2006/0122921 | A1 | 6/2006 | Comerford et al. |
| 2006/0206376 | A1 | 9/2006 | Gibbs |
| 2006/0212350 | A1 | 9/2006 | Ellis et al. |
| 2007/0000996 | A1 | 1/2007 | Lambert et al. |
| 2007/0027754 | A1 | 2/2007 | Collins et al. |
| 2007/0027758 | A1 | 2/2007 | Collins et al. |
| 2007/0219865 | A1 | 9/2007 | Leining |
| 2007/0265948 | A1 | 11/2007 | Maiorino et al. |
| 2008/0052153 | A1 | 2/2008 | Cook |
| 2008/0086365 | A1 | 4/2008 | Zollino et al. |
| 2008/0091535 | A1 | 4/2008 | Heiser et al. |
| 2008/0103887 | A1 | 5/2008 | Oldham et al. |
| 2008/0205655 | A1 | 8/2008 | Wilkins et al. |
| 2008/0021986 | A1 | 9/2008 | Soicher et al. |
| 2009/0006212 | A1 | 1/2009 | Krajicek et al. |
| 2009/0037264 | A1 | 2/2009 | Del Favero et al. |
| 2009/0048978 | A1 | 2/2009 | Ginter et al. |
| 2009/0099931 | A1 | 4/2009 | Aaltonen et al. |
| 2009/0106368 | A1 | 4/2009 | Padveen et al. |
| 2009/0112757 | A1 | 4/2009 | Hammad et al. |
| 2009/0119769 | A1 | 5/2009 | Ross et al. |
| 2009/0132415 | A1 | 5/2009 | Davis et al. |
| 2009/0199094 | A1 | 8/2009 | Jurgens et al. |
| 2009/0234708 | A1 | 9/2009 | Heiser, II et al. |
| 2009/0287562 | A1 | 11/2009 | Bosch et al. |
| 2009/0300723 | A1 | 12/2009 | Nemoy et al. |
| 2009/0327151 | A1 | 12/2009 | Carlson et al. |
| 2010/0010887 | A1* | 1/2010 | Karlin ............... G06Q 30/0213 705/14.15 |
| 2010/0106596 | A1 | 4/2010 | Grimes |
| 2010/0332260 | A1 | 12/2010 | Kassas |
| 2011/0035594 | A1 | 2/2011 | Fox |
| 2011/0046621 | A1 | 2/2011 | Poshajsky |
| 2011/0047023 | A1 | 2/2011 | Leiblang et al. |
| 2011/0082708 | A1* | 4/2011 | Pourfallah ............. G06Q 30/06 705/3 |
| 2011/0082731 | A1 | 4/2011 | Kepecs |
| 2011/0137717 | A1 | 6/2011 | Reuthe et al. |
| 2011/0161150 | A1 | 6/2011 | Steffens et al. |
| 2011/0208656 | A1 | 8/2011 | Alba |
| 2011/0238469 | A1 | 9/2011 | Gershman et al. |
| 2011/0288918 | A1 | 11/2011 | Cervenka et al. |
| 2012/0047003 | A1 | 2/2012 | Hammad et al. |
| 2012/0101881 | A1* | 4/2012 | Taylor .................. G06Q 30/02 705/14.13 |
| 2012/0150611 | A1 | 6/2012 | Isaacson et al. |
| 2012/0150641 | A1 | 6/2012 | Dobbs et al. |
| 2012/0150746 | A1 | 6/2012 | Graham |
| 2012/0191525 | A1 | 7/2012 | Singh et al. |
| 2012/0226530 | A1 | 9/2012 | Gebb et al. |
| 2012/0253852 | A1* | 10/2012 | Pourfallah ........... G06Q 20/405 705/4 |
| 2012/0271697 | A1 | 10/2012 | Gilman et al. |
| 2012/0271705 | A1 | 10/2012 | Postrel |
| 2012/0330736 | A1 | 12/2012 | Beckner |
| 2012/0331073 | A1 | 12/2012 | Williams |
| 2013/0046621 | A1 | 2/2013 | Asseoff et al. |
| 2013/0060631 | A1 | 3/2013 | Corson et al. |
| 2013/0124315 | A1 | 5/2013 | Doughty et al. |
| 2013/0155118 | A1 | 6/2013 | Robinson et al. |
| 2013/0191213 | A1 | 7/2013 | Mock et al. |
| 2013/0218657 | A1* | 8/2013 | Salmon ................ G06Q 20/381 705/14.29 |
| 2013/0218660 | A1 | 8/2013 | Fargo et al. |
| 2013/0253967 | A1 | 9/2013 | Single |
| 2013/0268342 | A1 | 10/2013 | Tune et al. |
| 2013/0285855 | A1 | 10/2013 | Dupray |
| 2013/0325582 | A1 | 12/2013 | Drozd et al. |
| 2013/0332258 | A1 | 12/2013 | Shiffert et al. |
| 2013/0334308 | A1 | 12/2013 | Priebatsch |
| 2014/0006127 | A1 | 1/2014 | Decook et al. |
| 2014/0058818 | A1 | 2/2014 | Drozd et al. |
| 2014/0067571 | A1 | 3/2014 | Fricke et al. |
| 2014/0074569 | A1 | 3/2014 | Francis et al. |
| 2014/0081729 | A1 | 3/2014 | Ocher |
| 2014/0108108 | A1 | 4/2014 | Artman |
| 2014/0108260 | A1 | 4/2014 | Poole et al. |
| 2014/0129443 | A1 | 5/2014 | Whitler |
| 2014/0164084 | A1 | 6/2014 | Battles et al. |
| 2014/0200997 | A1 | 7/2014 | Anderson et al. |
| 2014/0278970 | A1 | 9/2014 | Caiman et al. |
| 2014/0279420 | A1 | 9/2014 | Okerlund et al. |
| 2015/0006265 | A1 | 1/2015 | White et al. |
| 2015/0032627 | A1 | 1/2015 | Dill |
| 2015/0088607 | A1 | 3/2015 | Georgoff et al. |
| 2015/0170112 | A1* | 6/2015 | DeCastro ............ G06Q 20/381 705/39 |

(56) References Cited

U.S. PATENT DOCUMENTS

| | | | |
|---|---|---|---|
| 2015/0178693 A1 | 6/2015 | Solis | |
| 2015/0187149 A1 | 7/2015 | Frank et al. | |
| 2016/0012465 A1 | 1/2016 | Sharp | |
| 2016/0034877 A1 | 2/2016 | Poole et al. | |
| 2016/0055513 A1 | 2/2016 | Kuhn | |
| 2016/0092902 A1 | 3/2016 | Storry | |
| 2016/0104187 A1 | 4/2016 | Tietzen et al. | |
| 2016/0150078 A1 | 5/2016 | Joshi et al. | |
| 2016/0232556 A1* | 8/2016 | Postrel | G06Q 30/0233 |
| 2016/0275558 A1* | 9/2016 | Tiku | G06Q 30/0261 |
| 2016/0283920 A1 | 9/2016 | Fisher | |
| 2017/0046638 A1 | 2/2017 | Chan et al. | |
| 2017/0064402 A1 | 3/2017 | Killoran | |
| 2017/0076306 A1 | 3/2017 | Snider et al. | |
| 2017/0094042 A1 | 3/2017 | Dagit, III | |
| 2017/0140408 A1 | 5/2017 | Wuehler | |
| 2017/0236143 A1 | 8/2017 | Code | |
| 2017/0286987 A1 | 10/2017 | Carter | |
| 2018/0247330 A1 | 8/2018 | Duerr | |
| 2018/0285920 A1 | 10/2018 | Loomis | |
| 2018/0365733 A1 | 12/2018 | Christensen et al. | |
| 2019/0005529 A1 | 1/2019 | Lee | |
| 2020/0250694 A1 | 8/2020 | Mock et al. | |

FOREIGN PATENT DOCUMENTS

| | | |
|---|---|---|
| KR | 20130086738 A | 8/2013 |
| KR | 20150108458 A | 9/2015 |
| TW | 201511513 A | 3/2015 |
| WO | 1999050775 | 10/1999 |
| WO | 2001022374 | 3/2001 |
| WO | 2010016778 | 2/2010 |
| WO | 2015175033 A1 | 11/2015 |

OTHER PUBLICATIONS

Patent application for related U.S. Appl. No. 15/375,866, filed Dec. 12, 2016, pp. 1 to 108.

Patent application for related U.S. Appl. No. 15/375,979, filed Dec. 12, 2016, pp. 1 to 107.

Patent application for related U.S. Appl. No. 15/375,705, filed Dec. 12, 2016, pp. 1 to 107.

Downing et al., "Dictionary of Computer and Internet Terms," Barron's Business Guides, Tenth Edition, Revised edition (2008), 561 pages.

Wiley Encyclopedia of Computer Science and Engineering, Published Nov. 2008, 2365 pages.

Fitzgerald, U.S. Bank Launches Merchant-Funded Rewards Program witt1 FreeMonee, http://www.freemonee.com/wp-contentluploadsiPaymentsSource_4_•12_2012.pdf, Apr. 12, 2012, 2 pgs.

Dowling, et al., Do Customer Loyalty Programs Really Work?, http:liwww.royalloyalties.com/case_study.pdf, 1997, pp. 1-24 (28 pgs. total), Centre for Corporate Change—Australian Graduate School of Management, Australlia.

Wibowo, et al., Loyalty Program Scheme for Anonymous Payment Systems, http://ittf.vlsm.org/bebas/v01/OnnoWPurbo/contrib/aplikasi/e-commerce/loyalty-program-scheme-for-anonymous-payment-systems-1999.pdf, 2000, pp. 1-2, National University of Singapore, Singapore.

International Search Report and Written Opinion dated Jun. 8, 2015 for international patent application No. PCT/US15/15008.

International Search Report and Written Opinion dated Mar. 17, 2020 for international patent application No. PCT/US19/69104.

* cited by examiner

SYSTEM FOR GENERATING AND TRACKING OFFERS CHAIN OF TITLES

CROSS-REFERENCE TO RELATED APPLICATION(S)

This application is a continuation of and claims priority to U.S. patent application Ser. No. 15/375,979, filed on Dec. 12, 2016 and entitled "System for Generating and Tracking Officers Chain of Titles," which is incorporated by reference herein in its entirety.

BACKGROUND

Many merchants offer incentives or discounts to consumers to promote interest and purchase of particular goods and services. Unfortunately, many consumers are unaware of the merchant's offers that are intended to entice the consumer into a purchase resulting in a less than effective marketing campaign. Additionally, conventional systems fail to provide inexpensive and reliable systems for ensuring and promoting the widespread distribution of the offers over a communications network or social network.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
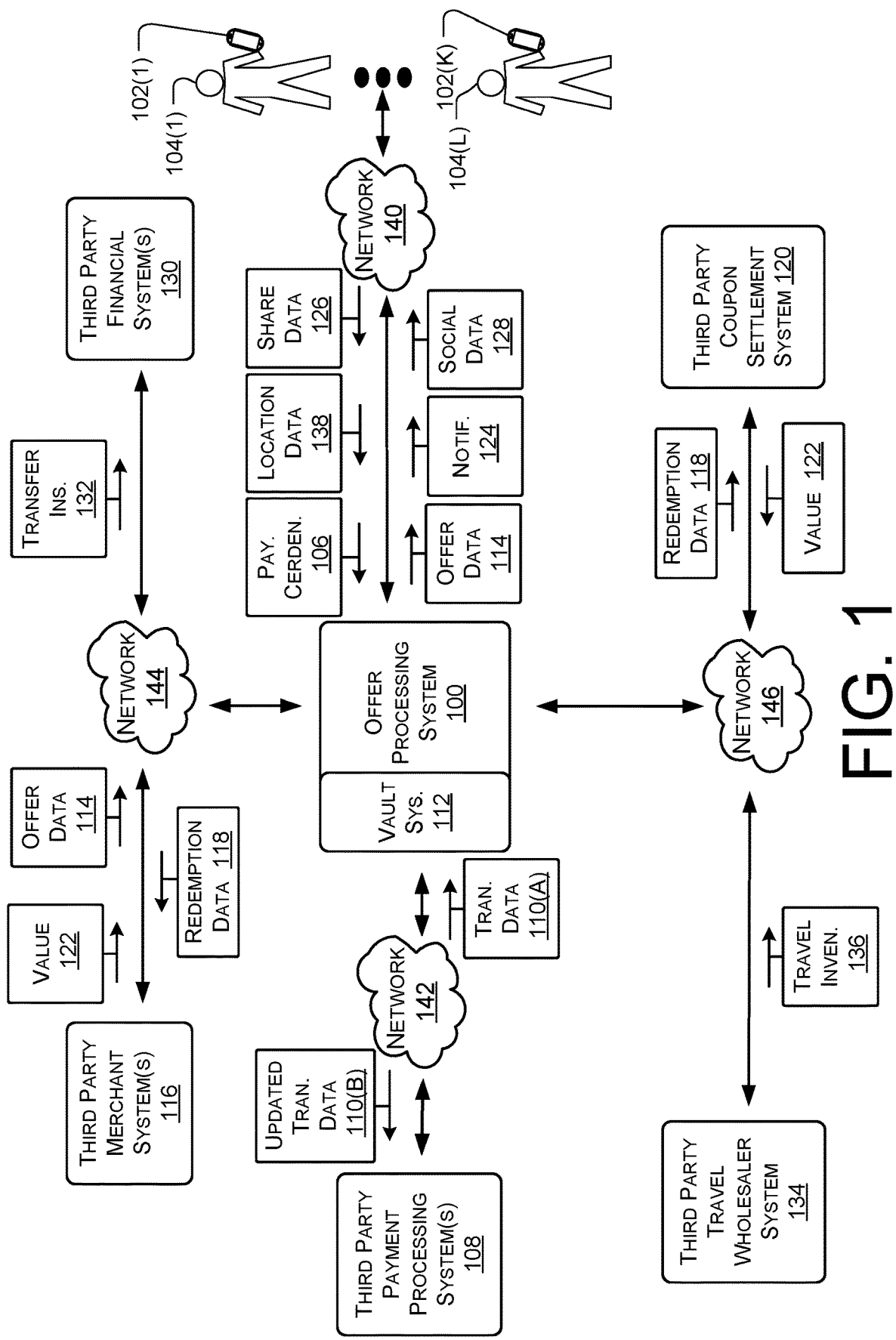
FIG. 1 illustrates an example offer processing system according to some implementations.

This disclosure includes techniques and implementations associated with an offer processing system that may apply offers, such as cash back offers, on behalf of users of the offer processing system. For example, the offer processing system may be a third party cloud-based or server system that is configured to aggregate or collect offers (e.g., cash back offers at a retailer) from coupon sites, the merchant systems or sites, marketplace systems or sites as well as to receive offers from the merchants via a merchant dashboard or other input system.

In some cases, the offer processing system may receive transaction data from third party payment processing systems during the pendency of a transaction (e.g., during a period of time after payment credentials have been entered at a point of sale device but prior to the approval of the transaction by the payment processing system). During this period of time, the offer processing system may identify a user associated with the transaction and at least one offer associated with the transaction (e.g., cash back offers for shopping at a retailer) and apply the offer to the transaction.

The payment processing system may send a notification to a user device associated with the user (e.g., via an associated application operating on the user device) that the user received the benefits of the offer (e.g., in a cash back scenario that the user received an amount of a cash back). In some implementations, the value or benefits of the offer applied to the transaction may be updated via a per user ledger within the offer processing system. For example, if the offer was a $5 cash back offer, the $5 may be applied to the user ledger and the user may receive a notification of an increase in the ledger by an amount equal to $5. In other cases, the payment processing system may be configured to transfer the value of the offer to a financial institution associated with the user (e.g., a checking or savings account of the user). Additionally, in some implementations, the offer processing system may credit an amount of less than the full value or benefit of the offer to the user. For instance, a portion of the value may be provided directly to a charity and/or collected by the payment processing system as a processing or finder's fee.

In some cases, the user may opt in or provide the payment credential information to the offer processing system and provide the offer processing system with authorization to receive transaction data from the third party payment processing system prior to the system redeeming offers on the user's behalf. For example, the user may input various payment credentials (e.g., credit card information, debit cards information, check routing information, etc.) to authorize the offer processing system to receive the transaction data associated with each of the particular third party payment processing systems.

In some cases, the benefit or the value of the offer applied to the transaction by the offer processing system may be converted into a jurisdiction neutral currency or offer processing system currency, such that the general ledger of each individual may be maintained in the jurisdiction neutral currency. Thus, when a portion of the currency is transferred to a remote institution, individual, or entity, the value may be converted into the currency related to the institution, individual, or entity. In this manner, the offer processing system disclosed herein removes the necessity of a conventional third party exchange system and any processing associated with the third party exchange system required to covert the value between jurisdictions, thereby reducing processing resources associated with transferring value between jurisdiction. In some cases, the offer processing system may also reduce or even eliminate exchange fees typically charged to the user.

Additionally, unlike conventional systems, the offer processing system, disclosed herein, is remote and independent from the point of sales system, merchant system, coupon settlement system, and payment processing system. In this manner, the system discussed herein may collect and aggregate offer data, purchase data, user data (e.g., buying habits or shopping habits), and/or merchant data. In this example, the aggregation may be performed across payment processing platforms (e.g., a credit card platform and financial institutions) as well as across merchant systems) and point of sale systems. By collecting and aggregating transaction data as a third party system, the data collected may be more complete and accurate. Further, unlike conventional systems, the offer processing system is configured to apply the offer during the pendency of the transaction without the input of the user. Thus, the user is no longer required to activate offers and the merchant, marketplace, social system, or user device is no longer required to store and track activation data for each user regardless of whether or not the offer is redeemed. In this manner, the offer processing system, discussed herein, saves processing and data storage resources when compared with conventional systems. Additionally, as the user no longer needs to select and apply the offers, the system may be designed with reduced user interface capabilities and/or even, in one particular example, without a user interface for selecting offers.

Additionally, since the offers are identified and collected by the remote processing system and applied to transactions data received from the payment processing system, the merchant is no longer required to create platform specific offers over each possible marketplace or retailer. Thus, the offer may be created using one system and used across marketplace system, retailer, or other purchasing venue or system rather than in the conventional sense were an offer is created with each social site, marketplace or vendor. Again, the offer processing system, discussed herein, saves processing and data storage resources over conventional systems.

In some implementations, the offer processing system may allow users to share offers with others. For instance, in one specific example, upon receiving notification that value has been added to a first user's ledger, the first user may share the offer redeemed by the payment processing system with a second user, such as the user's friend. In this example, the second user may receive a notification from the offer processing system related to the offer and when the offer is redeemed by the second user, the payment processing system may add a portion of the value of the offer redeemed by the second user to the ledger associated with the first user. Thus, each user of the offer processing system is encouraged to share offers with others in order to receive a portion of the value when the offer is redeemed.

In order to track the sharing of the offers between users, the offer processing system may create instances of an offer and track a chain of title associated with each instance. For instance, in one particular example, the offer processing system may use block chain system to distribute the chain of title data per instance of an offer over multiple computing devices (e.g., hundreds of computing devices) in a manner that prevents the chain of title data from being lost or hacked. In one case, as an instance is redeemed and shared, the user data may be stored with each interaction of the instance. The offer processing system may walk back up the chain of title when distributing the value associated with a redeemed offer. In some cases, the chain of title may be maintained or built using hash codes.

In some implementations, the offer processing system may be configured to receive transaction data on a stock keeping unit (SKU) or item level from point of sales devices at a retailer's venue, online merchant shopping cart/checkout system, and/or marketplace shopping cart/checkout systems. In this implementation, the offer processing system may be configured to apply transaction level offers (e.g., cash back for shopping at a retailer or merchant) as well as item level offers or coupons (e.g., cash back or discounts for purchasing a particular item from a distributor).

In some particular implementations, the offer processing system may be configured to process travel related transactions. In this implementation, the offer processing system may purchase inventory from a travel wholesaler system (e.g., a flight or hotel room) at a discount. The offer processing system may convert the discounted purchase price into an offer (e.g., as a cash back offer), which may then be shared and redeemed by users. In some cases, the cash back offer generated by the offer processing system may be based on information collected from other travel inventory resellers.

FIG. 1 illustrates an example offer processing system 100 according to some implementations. In the current example, the offer processing system 100 is configured to apply offers to transactions associated with users 102(1)-102(K) of the offer processing system 100. For example, a user 102(1)-102(K) may download a client side application associated with the offer processing system 100 on a user device 104(1)-104(L) associated with the user 102(1)-102(K). The user 102(1)-102(K) may register or provide payment credentials 106 associated with one or more third party payment processing systems 108, such as one or more credit or debit cards, to the offer processing system 100 via the client side application on the user device 104(1)-104(L).

The offer processing system 100 may also receive transaction data 110(A) from the third party payment processing systems 108 as the users 102(1)-102(K) make purchases at various retailers, online, or otherwise. The transaction data 110(A) may be received during a period of pendency of the transaction following input of the payment credentials 106 at a point of sale device (not shown) and approval of the transaction by the third party payment processing systems 108. In some cases, the transaction data 110(A) may be received by the third party payment processing system 108 via a vault system 112 or other secure module in order to protect the confidential and financial data of the users 102(1)-102(K).

During the pendency of the transaction, the offer processing system 100 may identify the user 102(1) as the user associated with the transaction from the group of users 102(1)-102(K). For example, the offer processing system 100 may identify the user 102(1) by identifying that the payment credentials 106 associated with the transaction data 110(A) correspond to the user 102(1). The offer processing system 100 may also identify one or more offers that may be applied to the transaction data 110(A). For example, the offer processing system 100 may receive offer data 114 from third party merchant systems 116. The offer processing system 100 may convert the offer data 114 into an offer (e.g., a cash back offer). The offer may then be applied to the transaction data 110(A) when the transaction data 110(A) meets or exceeds the criteria for the offer, such as spending more than a threshold amount at a retailer or merchant. The offer processing system 100 may send updated transaction data 110(B) to the third party payment processing system 108 for final approval and payment to the retailer or merchant.

Once the offer has been identified, the offer processing system 100 may send redemption data 118 to a third party coupon settlement system 120 and/or back to the third party merchant system 116 in order to collect the value 122 associated with the offer. For example, the third party coupon settlement system 120 may return or facilitate a transfer of the value 122 (e.g., cash back value) from the third party merchant system 116 to the offer processing system 100.

Once the value 122 associated with the offer is received by the offer processing system 100, the offer processing system 100 may update a ledger associated with the user 102(1) to reflect the application of the offer to a transaction associated with the user 102(1). The offer processing system 100 may send a notification 124 to the user 102(1) via the client side application operating on the user device 104(1) to alert the user that the ledger has been updated.

In some cases, the offer processing system 100 may only update the ledger with a portion of the value less than the total value redeemed. For instance, in some cases, the offer processing system 100 may charge a fee or percentage of the value associated with the offer for applying the offer to the transaction on behalf of the user 102(1). In other instances, the offer processing system 100 may credit another user 102(2)-(K) with a portion of the value 122 of the offer. For example, the user 102(1) may receive the notification 124 and decide to share the offer with user 102(2). The share data 126 may be received from the user device 104(1) and a chain of title may be applied to an instance associated with the offer. The offer data 114 may be provided to the user 102(2). In this example, when the offer processing system 100 receives transaction data 110(A) that represents the user 102(2) making a purchase that qualifies for the offer, the offer processing system 100 may redeem the offer, as discussed above, and apply a first portion of the value 122 of the offer to the user 102(1) and a second portion of the value of the offer to the user 102(2). Thus, unlike conventional systems, the offer processing system 100 may encourage or promote the sharing of offers between users 102(1)-(K) and, thereby, more affectively distribute the offer throughout users of the system.

In some regards, the share data 126 associated with offers may be aggregated by the offer processing system 100 and provided to each user 102(1)-(K) as social data 128. For example, the offer processing system 100 may provide social data 128 to each user 102(1)-(K) related to a total value redeemed by individuals that the user 102(1)-(K) shared the offer with. For instance, if user 102(1) shared the offer with users 102(2), 102(3), and 102(4), the social data 128 provided to the user device 104(1) may be a sum of the value redeemed by users 102(2)-102(4) on offers shared with the users 102(2)-(4) by the user 102(1).

In some cases, the value associated with offers being redeemed by the offer processing system 100 may be distributed to one or more third party financial systems 130 associated with the users 102(1)-102(K) (e.g., a bank or credit union). In these cases, the offer processing system 100 may provide transfer instructions 132 to the third party financial system 130 associated or selected by the user 102(1)-(K) to transfer the value 122 from either the third party coupon settlement system 120 or the offer processing system 100 to the third party financial system 130.

In some particular implementations, the offer processing system 100 may be configured to process travel related transactions. In this implementation, the offer processing system 100 may purchase inventory from a third party travel wholesaler system 134. In some cases, the third party travel wholesaler system 134 may sell travel inventory 136 (e.g., flights, hotels, excursions, etc.) at a discount. The offer processing system 100 may convert the discounted purchase price of the travel inventory 136 into a cash back offer, which may then be shared and redeemed by user 102(1).

In some cases, the offer processing system 100 may send or otherwise notify the users 102(1)-(K) to the existence of an offer, such as when offers are shared between users 102(1)-(K). In one particular example, the offer processing system 100 may receive location data 138 from the client side application operating on the user devices 104(1)-(L). In this example, the offer processing system 100 may provide or send offer data 114 back to the user device 104(1)-(L) based on the location data 138, such as all offers within a 5 mile radius of the user device 104(1)-(L). In other examples, the user devices 104(1)-(L) may request or the offer processing system 100 may send offer data 114 related to offers with threshold values, select merchants or retailers, type of offers, etc.

In the illustrated example, the offer processing system 100 is shown as communicatively coupled to user devices 104(1)-(L), third party payment processing system 108, third party merchant systems 116, third party coupon settlement system 120, third party financial systems 130, and third party travel wholesaler system 134 via networks 140-146. In some cases, the networks 140-146 may be wired technologies (e.g., wires, USB, fiber optic cable, etc.), wireless technologies (e.g., radio frequency (RF), cellular, satellite, Bluetooth, etc.), or other connection technologies. The networks 140-146 are representative of any type of communication network, including data and/or voice network, and may be implemented using wired infrastructure (e.g., cable, CAT5, fiber optic cable, etc.), a wireless infrastructure (e.g., RF, cellular, microwave, satellite, Bluetooth, etc.), and/or other connection technologies. The networks 140-146 carry data. In the illustrated example, the networks 140-146 are shown as separate networks, however, in some cases, the networks 140-146 may be the same network, such as the Internet®.

Figure 2:
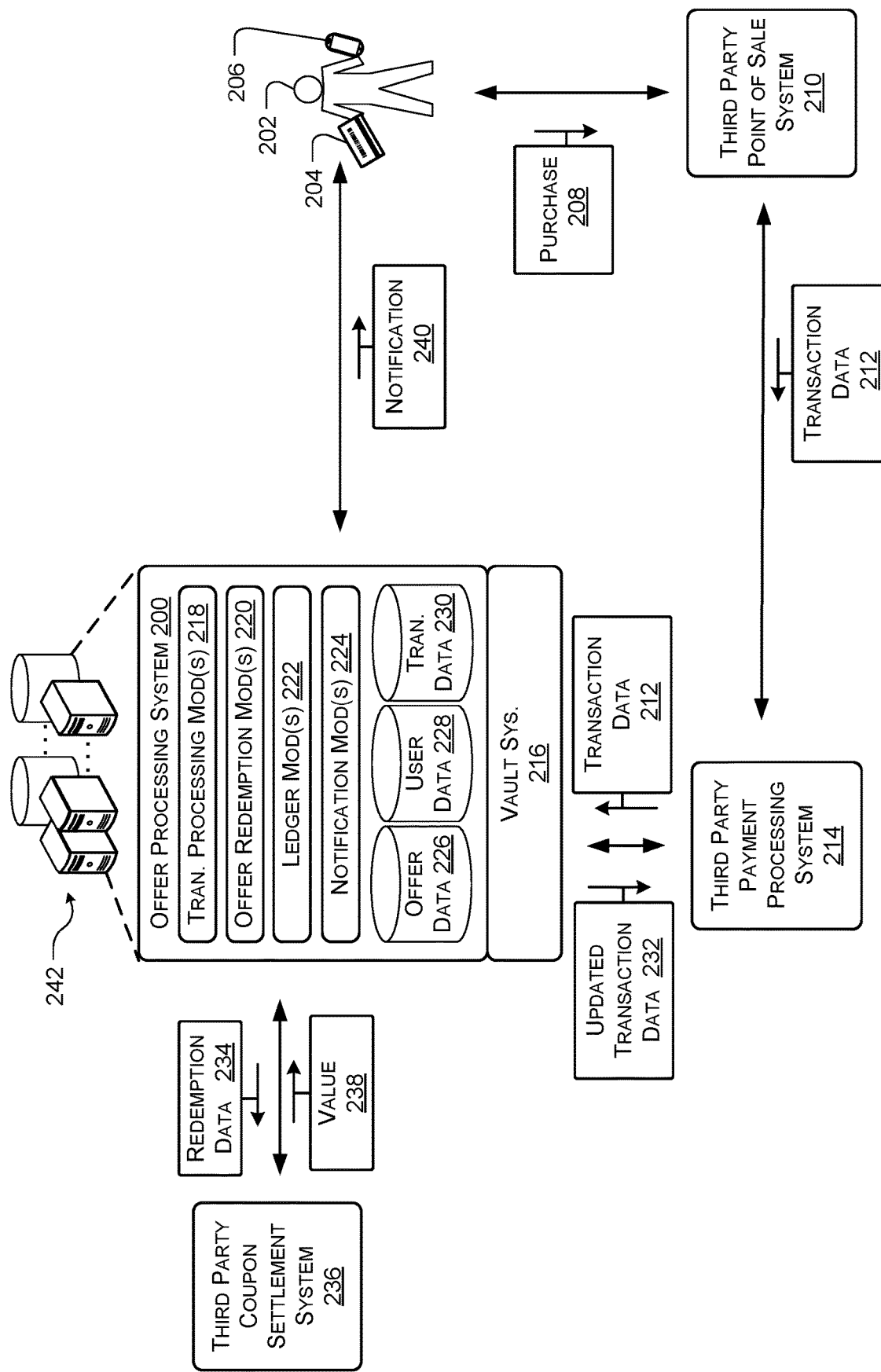
FIG. 2 illustrates another example offer processing system according to some implementations.

FIG. 2 illustrates another example offer processing system 200 according to some implementations. In the current example a user 202 may have stored or registered payment credentials 204 (e.g., credit card or debit card information) with the offer processing system 200 via a user device 206. The user 202 has also made a purchase 208 via a third party point of sale system 210 using the payment credentials 204.

The transaction data 212 associated with the purchase 208 may be transmitted from the third party point of sale system 210 to a third party payment processing system 214. The third party payment processing system 214 may provide the transaction data 212 to the offer processing system 200 via a vault system 216 (or other secured and/or encrypted system) during a pendency period (e.g., a period associated with the transaction prior to approval by the third party payment processing system 214). In some cases, the vault system 216 may be at third party vault that is associated with credit card forwarding services to ensure encrypted data transfer. In some alternative examples, the vault system 216 may be associated with the third party payment processing system 214.

In the current illustration, the offer processing system 200 may host various modules and data for applying offers to transactions. For example, the offer processing system 200 may implement a transaction processing module 218, an offer redemption module 220, a ledger module 222, and a notification module 224. In some cases, the offer processing system 200 may also store data, such as offer data 226, user data 228, and/or transaction data 230 to assist with identifying, selecting, and applying offers on behalf of the user 202. In some cases, the offer data 226 may include information associated with multiple offers, the user data 228 may include user account data, user device data, payment credential information (including the payment credentials 204 associated with the user 202), purchasing or shopping data, ledger data, etc., and the transaction data 230 may include data associated with multiple transactions for multiple individual users (e.g., transaction data 212). In some cases, the transaction data 230 and/or user data 228 may be utilized to provide analytics to various merchants to assist with the merchant's marketing research.

In the current example, the transaction processing module 218 may process the transaction data 212 received via the vault system 216. The transaction processing module 218 may first identify the user 202 (or an account associated with the user 202) as the individual making the purchase 208. For instance, the transaction processing module 218 may identify the user 202 as associated with the transaction data 212 based at least in part on payment credentials 204 associated with the transaction data 212 (e.g., the credit card number). For example, the transaction data 212 received from the payment processing system 214 may be tokenized and compared with payment credentials 204 stored in a tokenized from.

The transaction processing module 218 may also identify one or more offers from the offer data 226 that may apply to the transaction data 212. For example, the transaction processing module 218 may identify a merchant or retailer associated with the transaction from the transaction data 212. The transaction processing module 218 may then identify offers from the offer data 226 associated with the merchant. For instance, the merchant may be offering a $5 cash back offer on any purchase of more than $25. In this example, the transaction processing module 218 may determine from the transaction data 212 that the purchase 208 was for greater than $25 and that the $5 cash back offer was not redeemed at the third party point of sale system 210. The transaction processing module 218 may apply the cash back offer and generate updated transaction data 232. The updated transaction data 232 may be sent via the vault system 216 to the third party payment processing system 214 for final approval of the transaction. The transaction data 212 and/or the updated transaction data 232 may be stored as part of the transaction data 230 for access later by the merchant.

In another specific example, the transaction processing module 218 may identify a distributor, item, unit, or service associated with the transaction from the transaction data 212. The transaction processing module 218 may identify offers from the offer data 226 associated with the distributor, item, unit, or service. For instance, the distributor may be offering a $0.25 cash back offer on an item associated with the purchase 208. In this example, the transaction processing module 218 may determine from the transaction data 212 that the purchase 208 includes the item and that the $0.25 cash back offer was not redeemed at the third party point of sale system 210. The transaction processing module 218 may apply the cash back offer and generate updated transaction data 232. The updated transaction data 232 may be sent via the vault system 216 to the third party payment processing system 214 for final approval of the transaction. The transaction data 212 and/or the updated transaction data 232 may be stored as part of the transaction data 230 for access later by the distributor. It should be understood, that in some cases, the transaction processing module 218 may apply multiple offers to the transaction data 212 created or redeemable from multiple sources (e.g., the merchant, retailer, distributor, marketplace, etc.).

Once the offer is identified, the offer redemption module 220 may generate and provide redemption data 234 associated with the offer. The offer redemption module 220 may also cause the redemption data 234 to be sent to a third party coupon settlement system 236 to redeem the offer. The third party coupon settlement system 236 may in response to receiving the redemption data 234 send value 238 associated with the offer or cause the value 238 associated with the offer to be transferred to the offer processing system 200.

Once the value 238 is received at the offer processing system 200, the ledger module 222 may determine an amount or portion of the value 238 to attribute to the user 202. For example, the ledger module 222 may add all of the value 238 or a portion of the value 238 to a ledger representing an amount of currency attributable to the user 202 currently deposited with the offer processing system 200. In one particular example, the transaction processing module 218 may have identified an instance of the offer applied to the transaction data 212 that was shared with the user 202. In this particular example, the ledger module 222 may apply a portion of the value 238 to the ledger of the user 202 and a portion to a ledger associated with the user that shared the offer with the user 202.

Upon receipt of the value 238 and updating of the user's 202 ledger, the notification module 224 may send a notification 240 to the user device 206 associated with the user 202 in order to alert the user 202 to the value 238 or portion of the value 238 that was redeemed on the user's 202 behalf by the offer processing system 200. For example, the notification 240 may cause the ledger associated with the user 202 to be presented on a display of the user device 206. In another example, the notification 240 may cause the value 238 and/or the offer details associated with the offer redeemed to be presented on a display of the user device 206.

In the current example, the offer processing system 200, as illustrated, is implemented as one or more cloud-based services or modules hosted on servers 242. In general, cloud-based services refer to a network accessible platform implemented as a computing infrastructure of processors, storage, software, data access, and so forth that is maintained and accessible via a network such as the Internet®. The cloud-based services do not require end-user knowledge of the physical location and configuration of the system that delivers the services. Common expressions associated with cloud services include "on-demand computing," "software as a service (SaaS)," "platform computing," "network accessible platform" and so forth.

It should be understood that the servers 242 may include various types of computing devices and may be owned by a single entity and collocated at a common data center or may be located at separate data centers. Alternatively, the servers 242 may be owned and operated by independent entities at separate locations. The servers 242 may be further arranged in any number of ways, such as server farms, stacks, and the like that are commonly used in data centers.

Figure 3:
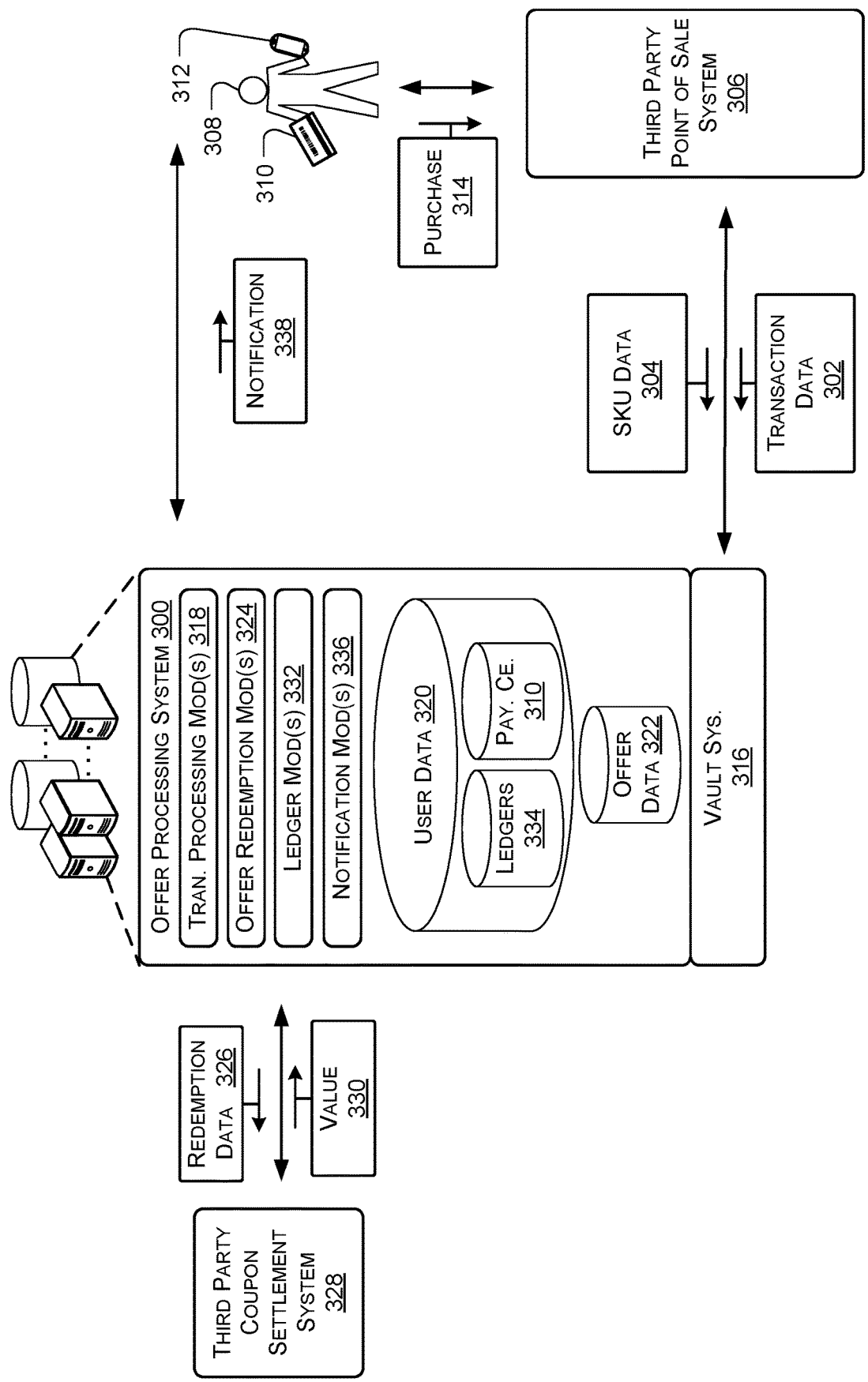
FIG. 3 illustrates yet another example offer processing system according to some implementations.

FIG. 3 illustrates yet another example offer processing system 300 according to some implementations. In some cases, item or unit level transaction data from the third party payment processing system may be utilize to redeem offers. In some implementations, the offer processing system 300 may receive the transaction data 302 as well as SKU data 304 (e.g., item or unit level data) from the third party point of sale system 306.

In the current illustration, similar to the example above, a user 308 may have stored or registered payment credentials 310 (e.g., credit card or debit card information) with the offer processing system 300 via a user device 312. The user 308 has also made a purchase 314 via the third party point of sale system 306 using the payment credentials 310.

The transaction data 302 and SKU data 304 associated with the purchase 314 may be transmitted from the third party point of sale system 306 to the offer processing system 300 in addition to a third party payment processing system (not shown). The offer processing system 300 may receive the transaction data 302 and the SKU data 304 via a vault system 316, as discussed above.

A transaction processing module 318 may process the transaction data 302 and the SKU data 304 received via the vault system 316. The transaction processing module 318 may first identify the user 308 as the individual making the purchase 314. For instance, the transaction processing module 318 may identify the user 308 as associated with the transaction data 302 by comparing the payment credentials 310 associated with the transaction data 302 to payment credentials 310 stored as part of the user data 320.

The transaction processing module 318 may also identify one or more offers from the offer data 322 that may apply to the transaction data 302 or the SKU data 304. For example, the transaction processing module 318 may identify a merchant or retailer associated with the transaction from the transaction data 302 and an item associated with the transaction from the SKU data 304. The transaction processing module 318 may then identify offers from the offer data 322 associated with the merchant and/or the item.

Once the offers are identified, the offer redemption module 324 may generate and provide redemption data 326 associated with the offers. The offer redemption module 324 may also cause the redemption data 326 to be sent to a third party coupon settlement system 328 to redeem the offer. The third party coupon settlement system 328 may send value 330 associated with the offers or cause the value 330 associated with the offers to be transferred to the offer processing system 300.

Once the value 330 is received at the offer processing system 300, the ledger module 332 may determine an amount or portion of the value 330 to attribute to the user 308. For example, the ledger module 332 may add at least a portion of the value 330 to a ledger representing an amount of currency attributable to the user 308. In one particular example, the transaction processing module 318 may have identified an instance of the offer applied to the transaction data 302 that was shared with the user 308. In this particular example, the ledger module 332 may apply a portion of the value 330 to the ledger 334 of the user 308 and a portion to a ledger associated with the user that shared the offer with the user 308.

Upon receipt of the value 330 and updating of the ledger 334, the notification module 336 may send a notification 338 to the user device 312 associated with the user 308 in order to alert the user 308 to the value 330 or portion of the value 330 that was redeemed on the user's 308 behalf by the offer processing system 300. For example, the notification 338 may cause the ledger 334 associated with the user 308 to be presented on a display of the user device 312. In another example, the notification 338 may cause the value 330 and/or the offer details associated with the offer redeemed to be presented on a display of the user device 312.

Figure 4:
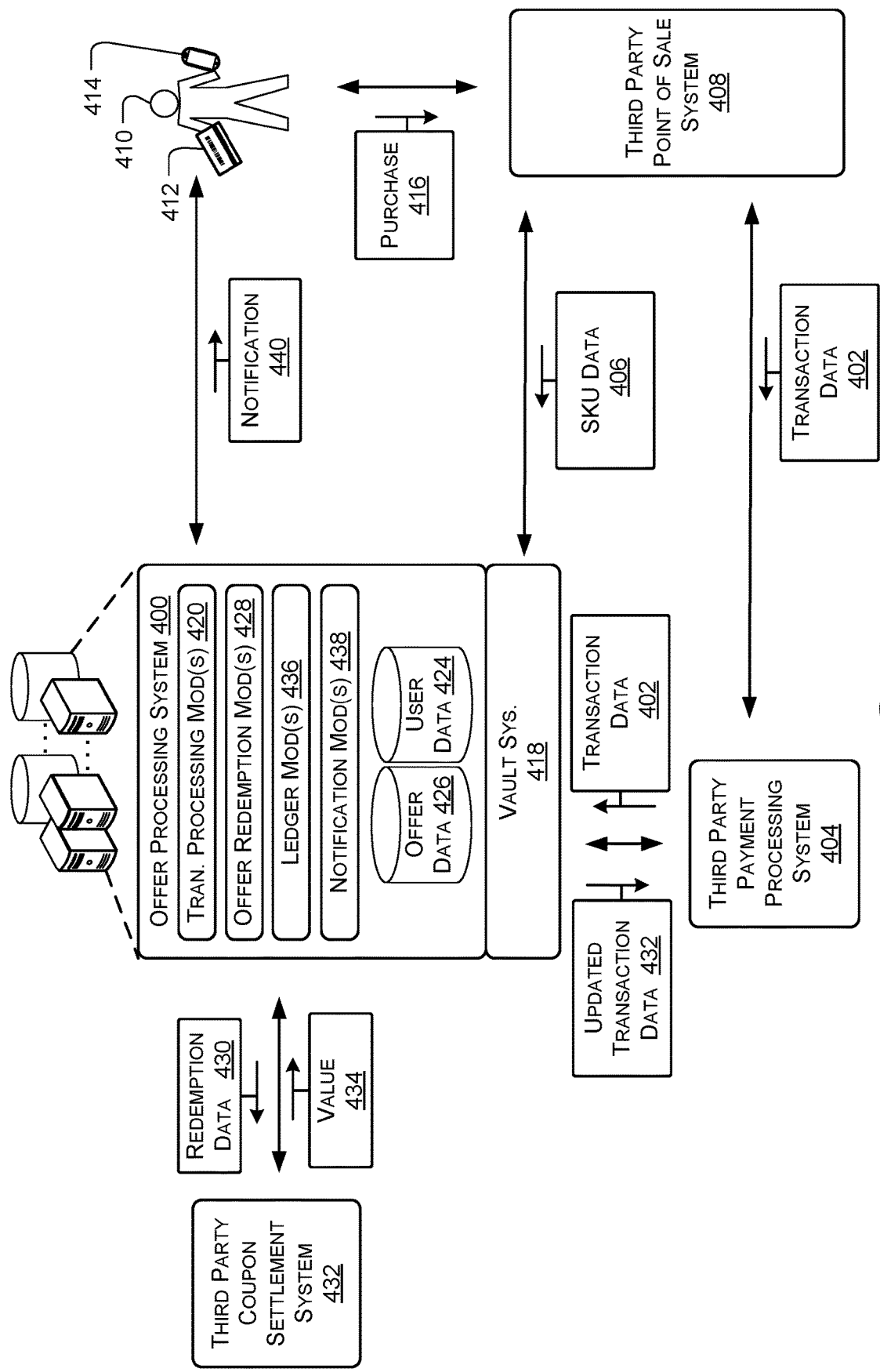
FIG. 4 illustrates yet another example offer processing system according to some implementations.

FIG. 4 illustrates yet another example offer processing system 400 according to some implementations. In some implementations, such as the currently illustrated implementation, the offer processing system 400 may receive some data associated with a transaction, such as the transaction data 402, from the third party payment processing system 404 and other data associated with a transaction, such as the SKU data 406, from the third party point of sale system 408.

In the current illustration, similar to the examples above, a user 410 may have stored or registered payment credentials 412 (e.g., credit card or debit card information) with the offer processing system 400 via a user device 414. The user 410 has also made a purchase 416 via the third party point of sale system 408 using the payment credentials 412.

In this example, the transaction data 402 associated with the purchase 416 may be transmitted from the third party point of sale system 408 to the third party payment processing system 404. The third party payment processing system 404 may provide the transaction data 402 to the offer processing system 400 via a vault system 418 during a pendency period (e.g., a period associated with the transaction prior to approval by the third party payment processing system 404). The third party point of sale system 408 may also send the SKU data 406 to the offer processing system 400 via the vault system 418.

A transaction processing module 420 may process the transaction data 402 and the SKU data 406. For instance, the transaction processing module 420 may identify the user 410 as the individual making the purchase 416 from the transaction data 402 and the user data 424. The transaction processing module 420 may also identify one or more offers from the offer data 426 that may apply to the transaction. For example, the transaction processing module 420 may identify a merchant or retailer associated with the transaction from the transaction data 402 and a distributor associated with the transaction from the SKU data 406. The transaction processing module 420 may then identify offers from the offer data 426 associated with the merchant and/or the distributor.

Once the offers are identified, the offer redemption module 428 may generate and provide redemption data 430 associated with the offers. The offer redemption module 428 may also cause the redemption data 430 to be sent to a third party coupon settlement system 432 to redeem the offer. The third party coupon settlement system 432 may send value 434 associated with the offers or cause the value 434 associated with the offers to be transferred to the offer processing system 400.

Once the value 434 is received at the offer processing system 400, the ledger module 436 may determine an amount or portion of the value 434 to attribute to the user 410 and apply the portion of the value to the ledger associated with the user 410. The notification module 438 may also send a notification 440 to the user device 414 associated with the user 410 in order to alert the user 410 to the portion of the value 434 that was redeemed on the user's 410 behalf by the offer processing system 400.

Figure 5:
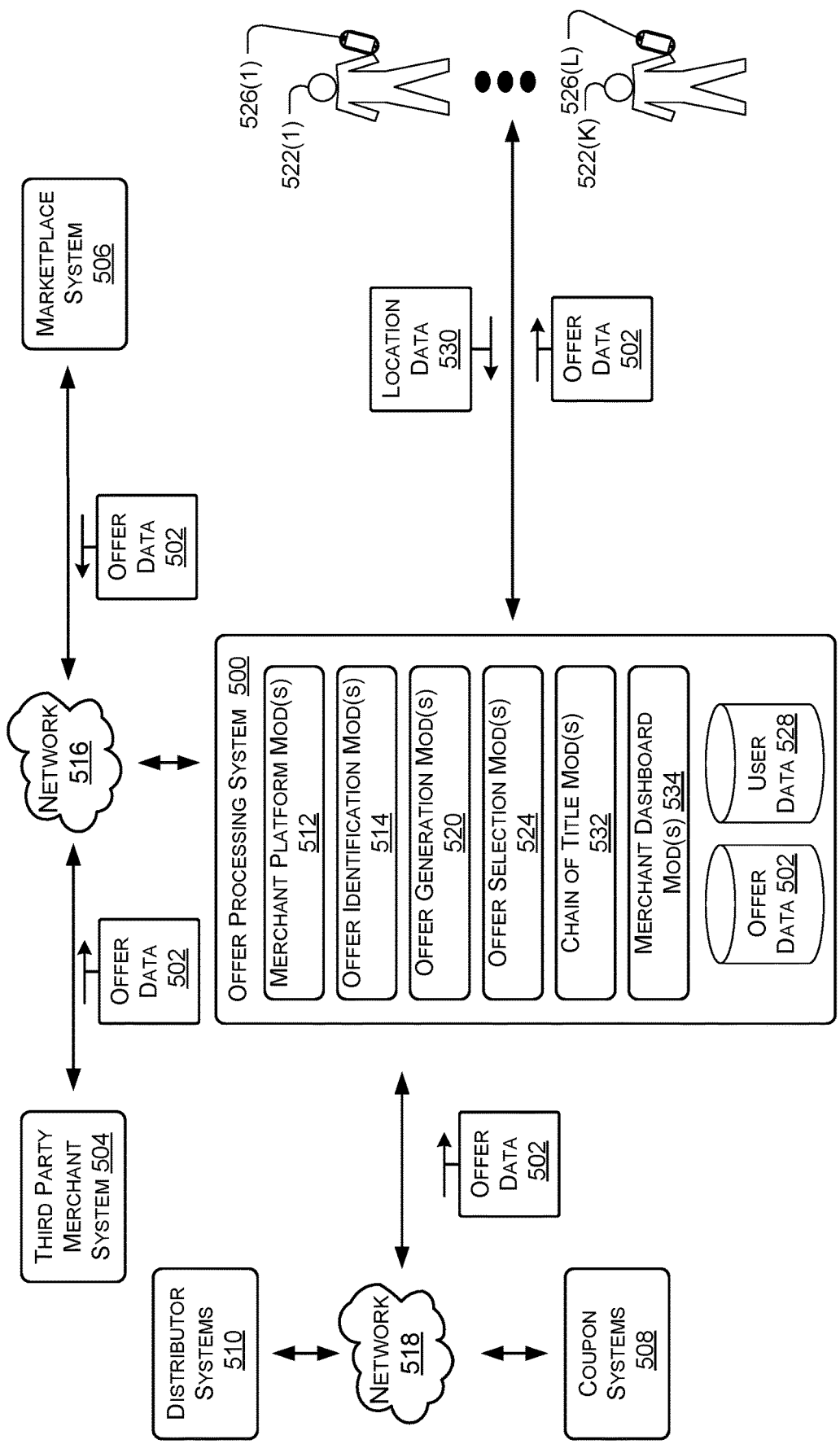
FIG. 5 illustrates an example offer processing system that aggregates offers according to some implementations.

FIG. 5 illustrates an example offer processing system 500 in the process of aggregating offers 502 according to some implementations. For example, the offer data 502 may be collected from various sources, such as third party merchant systems 504, marketplace systems 506, coupon systems 508, and/or distributor systems 510. In some cases, the offer data 502 may be aggregated from the sources 504-510 and applied to transaction data received from third party point of sales systems (not shown) and/or third party payment processing systems (not shown).

In the illustrated example, the offer processing system 500 may implement or host various modules for the collection of offer data 502. For instance, the offer processing system 500 may include a merchant platform module 512. The merchant platform module 512 may allow merchants 504, marketplaces 506, or distributors 508 to create offers and/or offer campaigns with the offer processing system 500. For example, the merchant 504 or marketplace 506 may utilize the merchant platform module 512 to create cash back offers associated with shopping at particular retail establishments or online venues. Similarly, the distributors 508 may create offers associated with purchasing a particular item, unit, or service offered by the distributor 508 regardless of the merchant 504 or marketplace 506 utilized to purchase the item, unit, or service. In some cases, the offers may be created electronically using a merchant interface of the offer processing system.

Similarly, the offer processing system 500 may implement or host an offer identification module 514. The offer identification module 514 may be configured to search and locate the offer data 502 associated with current valid offers provided by the sources 504-510. For example, the offer identification module 514 may identify offers on various items, retail locations, online venues, etc. by searching networks 516 and 518 for the offer data 502 on various websites. For instance, in one particular example, the offer identification module 514 may locate and collect offer data 502 associated with offers posted on the Internet®.

In some implementations, the offer processing system 500 may include an offer generation module 520. For instance, the offer generation module 520 may create offers based on the offer data 502 collected by the offer identification module 520. For example, the offer identification module 514 may identify discount or wholesale goods (e.g., via a travel wholesaler system). The offer generation module 520 may convert the discounted price or wholesale price of the goods into an offer redeemable by users 522(1)-(K). In one particular implementation, the offer generation module 520 may be configured to purchase discounted items, units, inventory, or services and to generate offers to purchase the discounted items, units, inventory, or services via the offer processing system 500.

In some implementations, the offer processing system 500 may also include an offer selection module 524. In this implementation, the offer selection module 524 may select offers to send to user devices 526(1)-(L) associated with the users 522(1)-(K) based at least in part on the offer data 502 and user data 528. For example, the user data 528 may include location data 530 received from one or more of the user devices 526(1)-(L). The offer selection module 524 may select and send offers within a threshold distance of the corresponding user device 526(1)-(L). For example, the offer may include savings associated with a gas station within five miles of the corresponding user device 526(1)-(L).

In one particular example, the offer selection module 524 may identify and send offers to user devices 526(1)-(L) when the offer data 502 is shared between the users 522(1)-(K). In this particular example, a chain of title module 532 associated with the offer processing system 500, may create and track instances of the offers, as will be discussed in more detail below with respect to FIGS. 7-14.

The offer processing system 500 may also host or implement a merchant dashboard module 534. The merchant dashboard module 534 may allow the merchant 504, marketplace 506, coupon system 508, or distributor 510 to track the effectiveness of an offer, such as a redemption rate, a sharing rate, a view or impression rate, etc. In some cases, the merchant dashboard module 534 may convert the redemption rate into a revenue versus expense metric using the offer data 502, user data 528, and transaction data received from third party payment processing systems (not shown) and/or third party point of sale systems (not shown).

Figure 6:
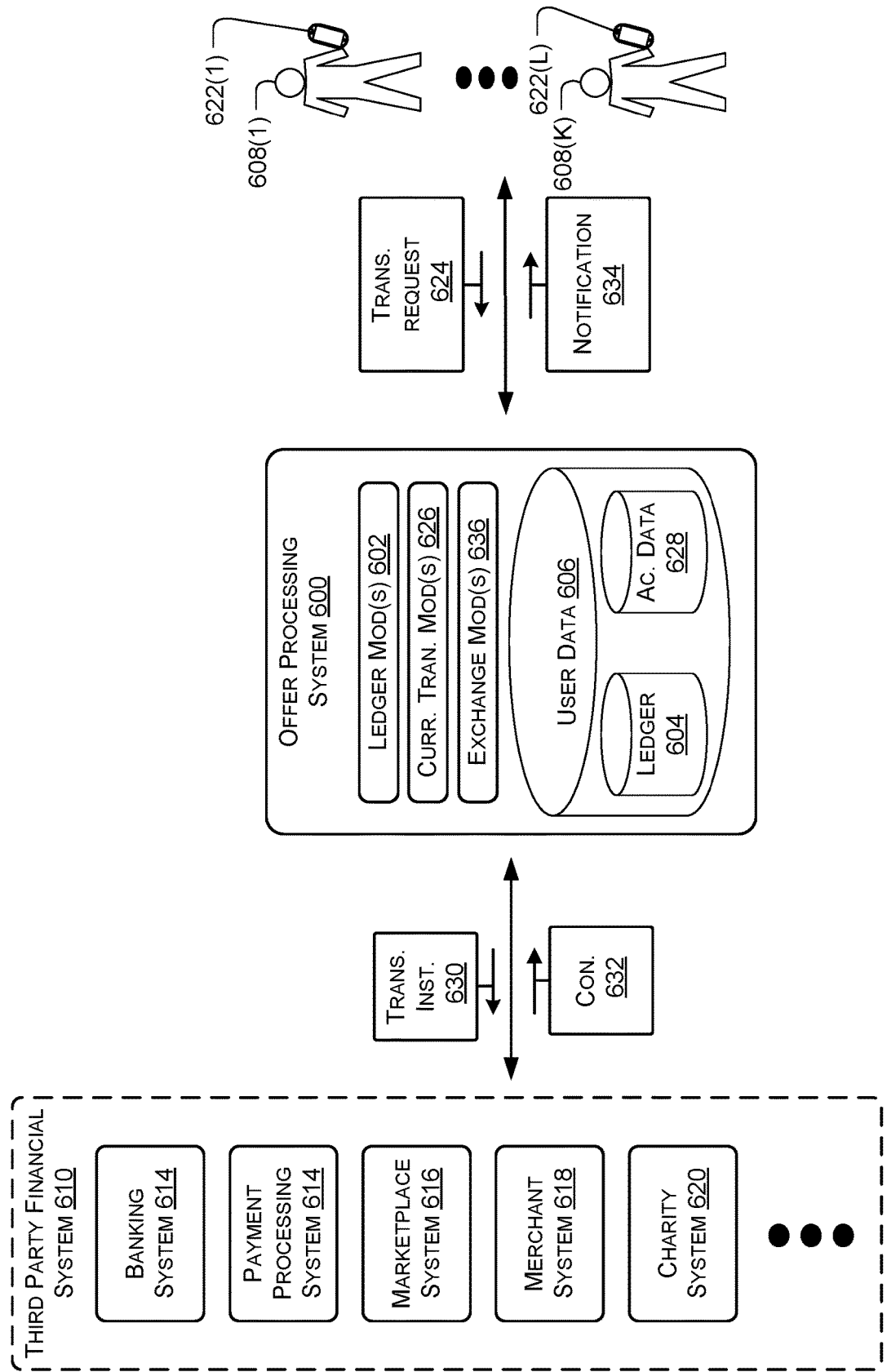
FIG. 6 illustrates an example offer processing system configured to transfer funds according to some implementations.

FIG. 6 illustrates an example offer processing system 600 configured to transfer funds according to some implementations. In the current example, the offer processing system 600 may include a ledger module 602 that is configured to maintain a user specific ledger 604 in relation to user data 606 associated with each user 608(1)-(K). The user specific ledger 604 may represent an amount or value of currency that the user 608(1)-(K) has acquired as the offer processing system 600 applies offers to purchases made by the user 608(1)-(K) using registered payment credentials.

In the illustrated example, one of the users 608(1)-(K), such as user 608(1), may desire to transfer some of the currency represented by the ledger 604 to a third party financial system 610. For instance, the user 608(1) may desire to transfer currency into a savings or checking account with a banking system 614, pay a bill at a payment processing system 614, a marketplace system 616, or merchant system 618. The user 608(1) may also desire to donate currency to a charity system 620. In this example, the user 608(1) may utilize a user device, such as user device 622(1), to send transfer request 624 to the offer processing system 600. The transfer request 624 may be received by a currency transfer module 626 of the offer processing system 600. In one alternative example, the user 608(1) may also transfer currency via the currency transfer module 626 to gift cards, store credit accounts, prepaid-cards, or general purpose reloadable payment cards.

The currency transfer module 626 may access account data 628, such as a savings account number, and generate transfer instruction 630. The transfer instructions 630 may be provided to the third party financial system 610 to affect the transfer of the currency from the ledger 604 to the third party financial system 610. In some cases, the offer processing system 600 may receive a confirmation 632 in response confirming receipt of the currency at the third party financial system 610. Once the confirmation 632 is received, the offer processing system 600 may provide a notification 634 to the user device 622(1) to alert the user 608(1) that the transfer is complete.

In some cases, the ledger 604 may be maintained in a jurisdiction independent currency of the offer processing system 600. In these cases, the offer processing system 600 may include an exchange module 636. The exchange module 636 may be configured to determine a current exchange rate of the offer processing system currency with regards to a currency associated with the third party financial system 610. For example, the exchange module 636 may determine the currency associated with the third party financial system 610 is the pound and convert the currency represented by the ledger 604 into pounds prior to transferring the funds to the third party financial system 610. In other cases, the ledger 604 may be maintained in the currency associated with the user 608(1). In this case, the ledger 604 may be in US dollars and when transferred to the third party financial system 610 may be converted into pounds by the exchange module 636. In some cases, by converting the currency to the currency of the receiving party prior to processing the transaction, in addition to saving the user 608(1) an exchange fee, the offer processing system 600 may reduce the processing required to affect the transfer by removing the necessity of involving a conventional exchange system.

In the current example, it should be understood that the systems 612-620 may be part of the same financial system 610 or independent systems.

Figure 7:
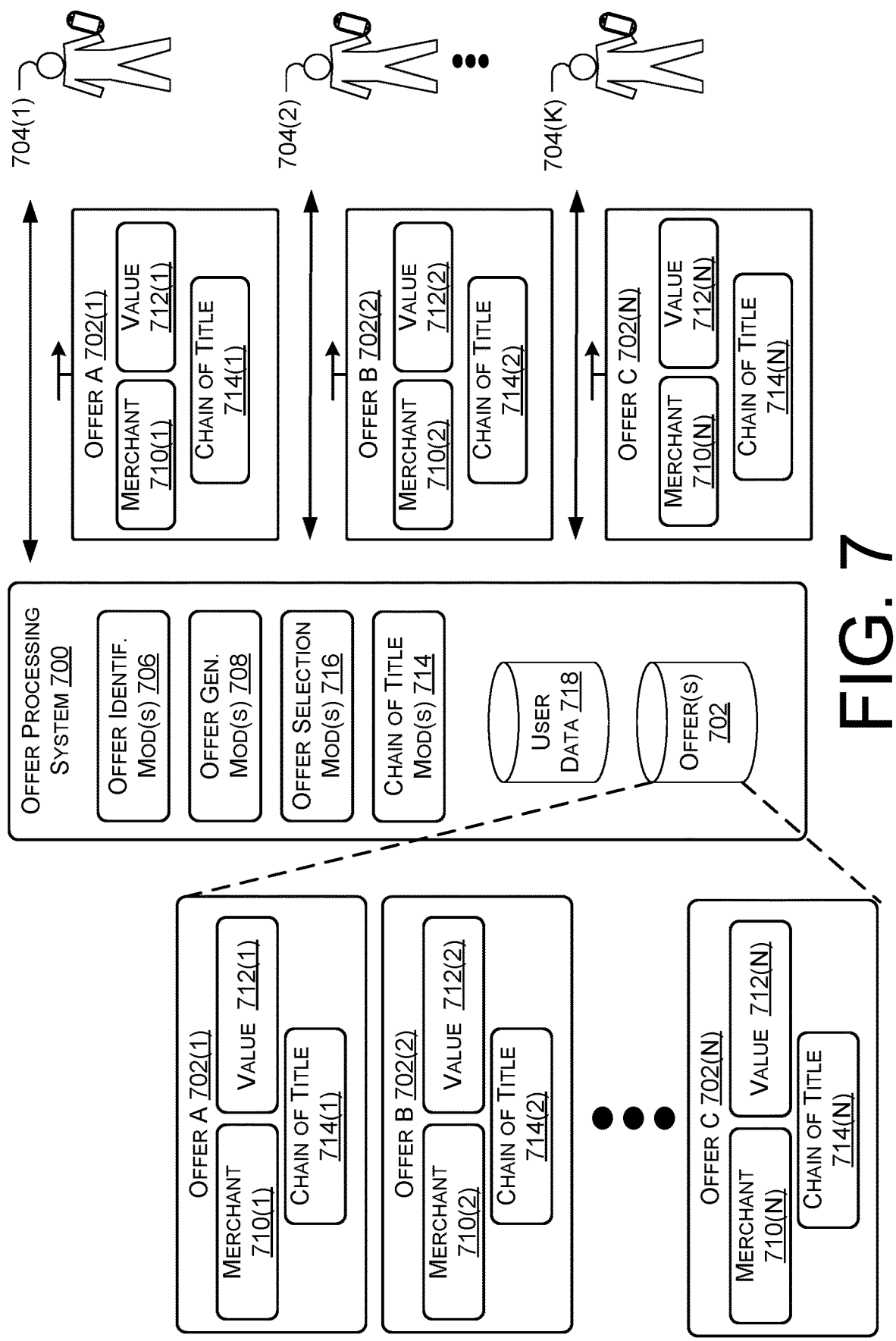
FIG. 7 illustrates an example offer processing system configured to select offers for individual users according to some implementations.

FIG. 7 illustrates an example offer processing system 700 configured to select offers, such as offers 702(1)-(N), for individual users, such as users 704(1)-(K), according to some implementations. In the illustrated example, the offer processing system 700 may include an offer identification module 706 and an offer generation module 708 to catalog and create offers 702, as discussed above with respect to FIG. 5. Each of the offers 702(1)-(N) may have a corresponding merchant 710(1)-(N), a value 712(1)-(N), and a chain of title 714(1)-(N). The chain of title 714(1)-(N) is used to track the sharing, origination and redemption of the offers 702, as will be discussed in more detail below with respect to FIGS. 8-14. It should also be understood that the merchants 710(1)-(N) and the values 710(1)-(N) associated with various offers 702(1)-(N) may be the same.

The offer processing system 700 may also include an offer selection module 716 to select offers 702 to send to the users 704(1)-(K) based at least in part on user data 718. For instance, the offer selection module 716 may select offer A 702(1) to send to user 704(1), offer B 702(2) to send to user 704(2), and offer C 702(N) to send to user 704(K) based on a distance of each of the users 704(1)-(N) to a merchant 710(1)-(N) associated with each of the offers 702(1)-(N). As each offer 702(1)-(N) is shared or sent to the users 704(1)-

(K), the chain of title module 720 may update the chain of title 714(1)-(N) associated with the offer 702(1)-(N).

Figure 8:
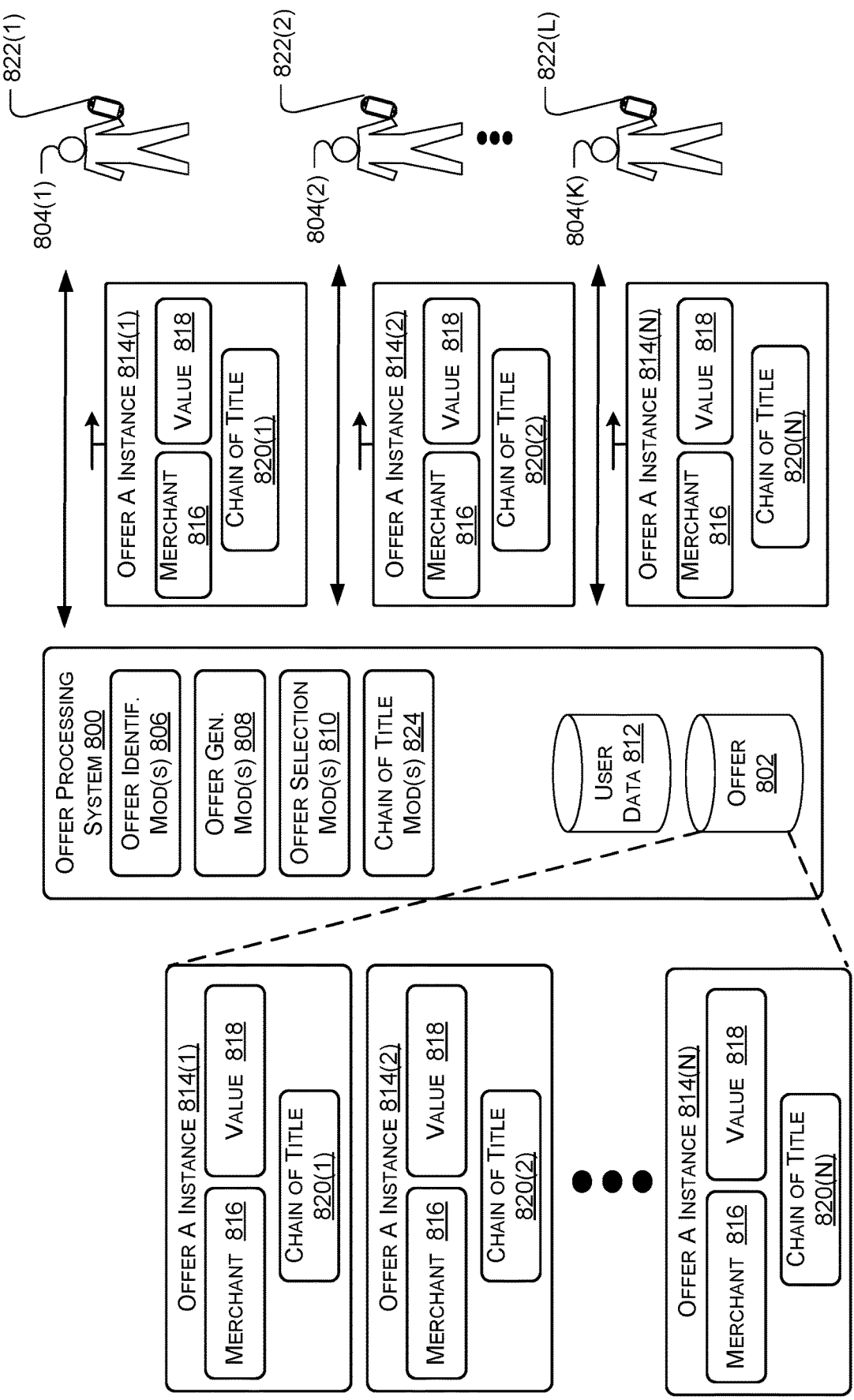
FIG. 8 illustrates an example offer processing system configured to track instances of offers shared with or by individual users according to some implementations.

FIG. 8 illustrates an example offer processing system 800 configured to track instances of offers 802 shared with or by individual users 804(1)-(K) according to some implementations. Similar to the example of FIG. 7, the offer processing system 800 may include an offer identification module 806 and an offer generation module 808 to catalog and create offer data 802 and an offer selection module 810 to select offers 802 to send to the users 804(1)-(K) based at least in part on user data 812.

However, in the current example, the offer selection module 810 has selected the same offer 802 to send to each of the users 804(1), 804(2), and 804(K). In this case, each of the users 804(1), 804(2), and 804(K) may receive a difference instance 814(1), 814(2), and 814(N) representing an offer having the same merchant 816 (or merchant identifier) and the same value 818 but a different or unique chain of title 820(1)-(N). As discussed above, the chain of title 820(1)-(N) is used to track the sharing, origination and redemption of each instance 814(1)-(N) of the offer 802. As each instance 814(1)-(N) may have a different sharing history. Starting with the offer processing system 800 sending the instances 806(1)-(N) to the various users devices 822(1)-(L) associated with the various users 804(1)-(K), as illustrated. Thus, as each offer instance 814(1)-(N) is shared or sent to the user devices 824(1)-(L) of the users 804(1)-(K), the chain of title module 824 may update the chain of title 820(1)-(N) to reflect the sharing and redemption activity.

Figure 9:
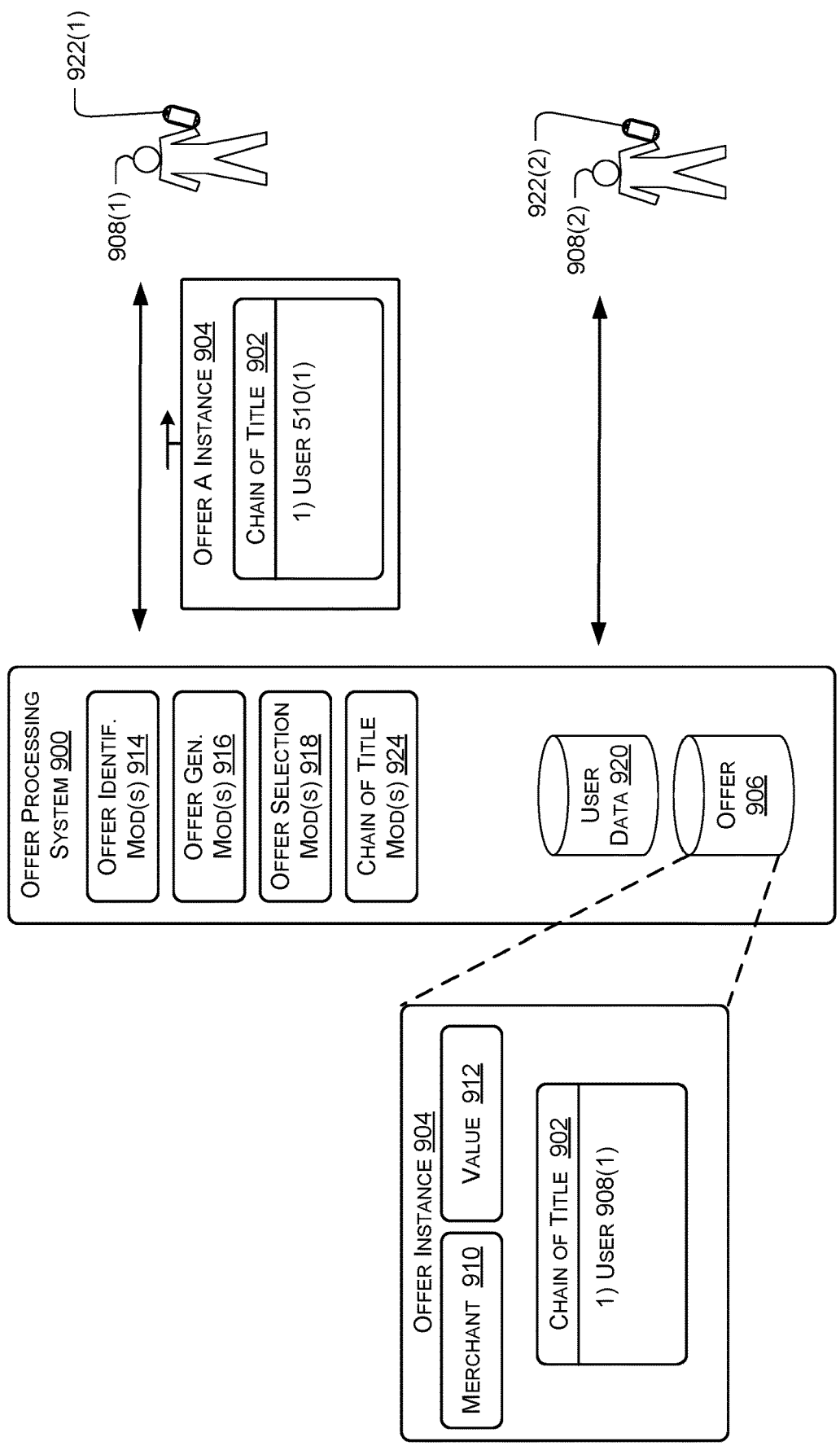
FIG. 9 illustrates an example offer processing system configured to track a chain of title of an instance of an offer being shared with individual users according to some implementations.

FIG. 9 illustrates an example offer processing system 900 configured to track a chain of title 902 of an instance 904 of offer 906 being shared with individual users 908(1) and 908(2) according to some implementations. In this example, the instance 904 of the offer 906 associated with a merchant 910 and having a value 912 may have been created by either the offer identification module 914 or the offer generation module 916. The offer selection module 918 may determine that the instance 904 of the offer 906 should be sent to the user 908(1) based on the user data 920 via the user device 922(1). In this case, the chain of title module 924 may update the chain of title 902 of an instance 904 of the offer 906 to show that the instance 904 was shared or sent by the offer processing system 900 to the user 908(1).

Figure 10:
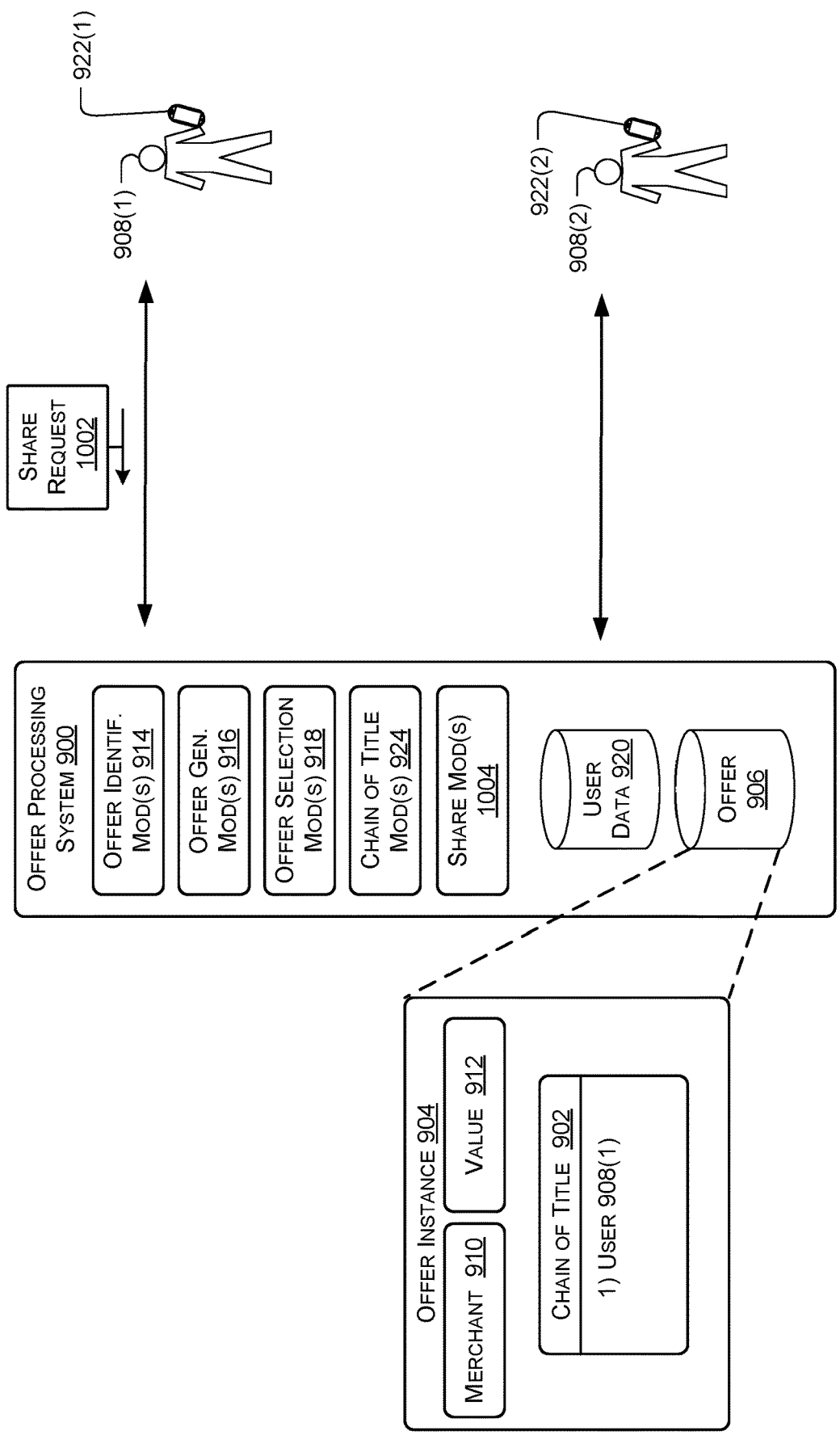
FIG. 10 illustrates the example offer processing system of FIG. 9 configured to track a chain of title of an instance of an offer being shared with individual users according to some implementations.

FIG. 10 illustrates the example offer processing system 900 of FIG. 9 configured to track a chain of title 902 of an instance 904 of offer 906 being shared with individual users 908(1) and 908(2) according to some implementations. In the illustrated example, the user 908(1) has received the instance 904 of the offer 906 at the user device 922(1) and determined that the user 908(2) may desire to utilize or redeem the offer 906. Thus, the user 908(1) may cause the user device 922(1) to send a share request 1002 to the offer processing system 900 to cause a share module 1004 of the offer processing system 900 to share details of the offer 906 with the user 908(2).

Figure 11:
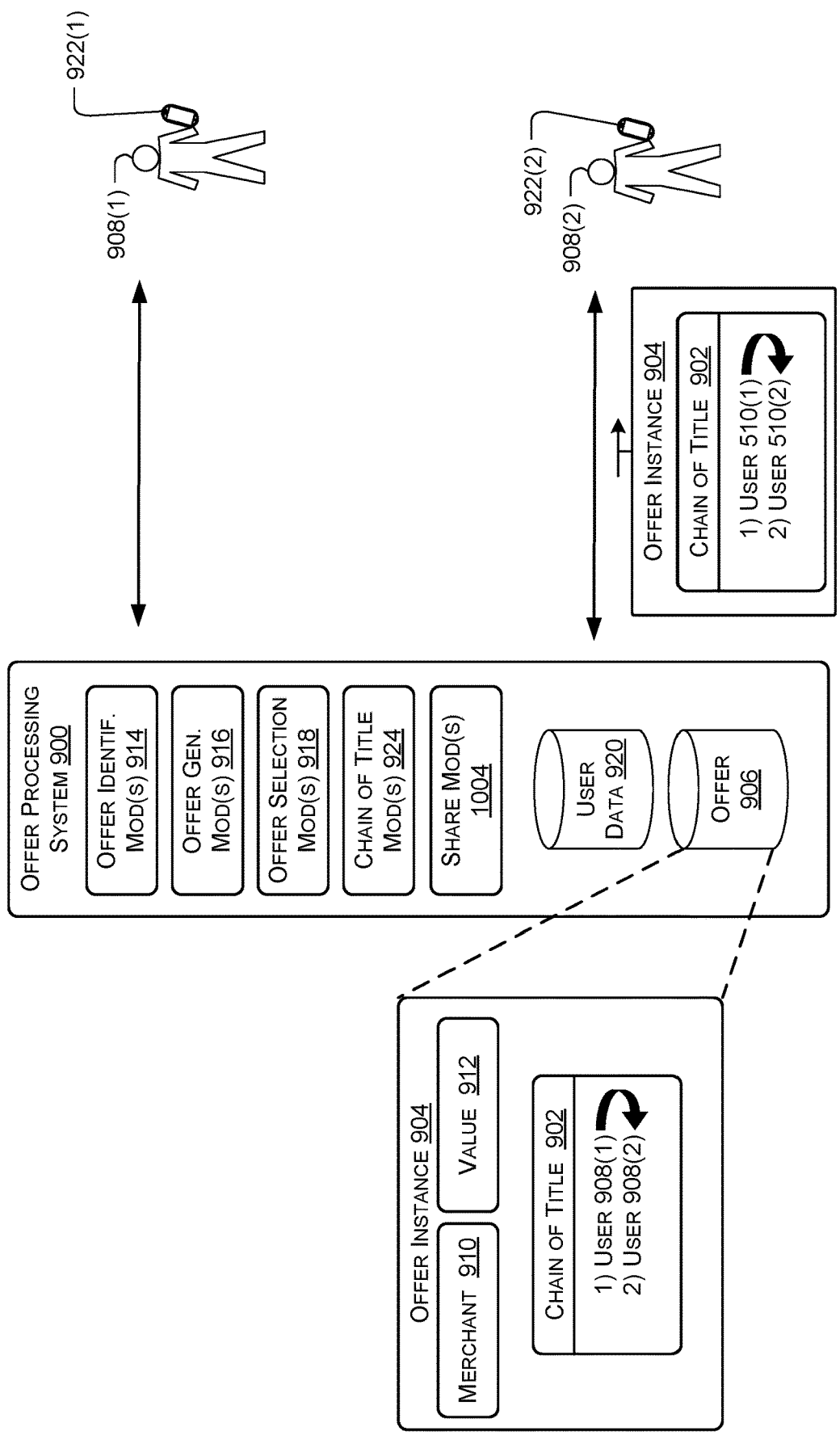
FIG. 11 illustrates the example offer processing system of FIG. 9 configured to track a chain of title of an instance of an offer being shared with individual users according to some implementations.

FIG. 11 illustrates the example offer processing system 900 of FIG. 9 configured to track a chain of title 902 of an instance 904 of offer 906 being shared with individual users 908(1) and 908(2) according to some implementations. In the present example, the share request 1002 has been received and processed by the share module 1004 and the chain of title 902 has been updated by the chain of title module 924 to show that the user 908(1) caused the instance 904 of the offer 906 to be shared with the user 908(2). In this case, the instance 904 was updated as the chain of title module 924 determined from the chain of title 902 that instance 904 was the version of the offer 906 provided or viewed by the user 908(1).

Figure 12:
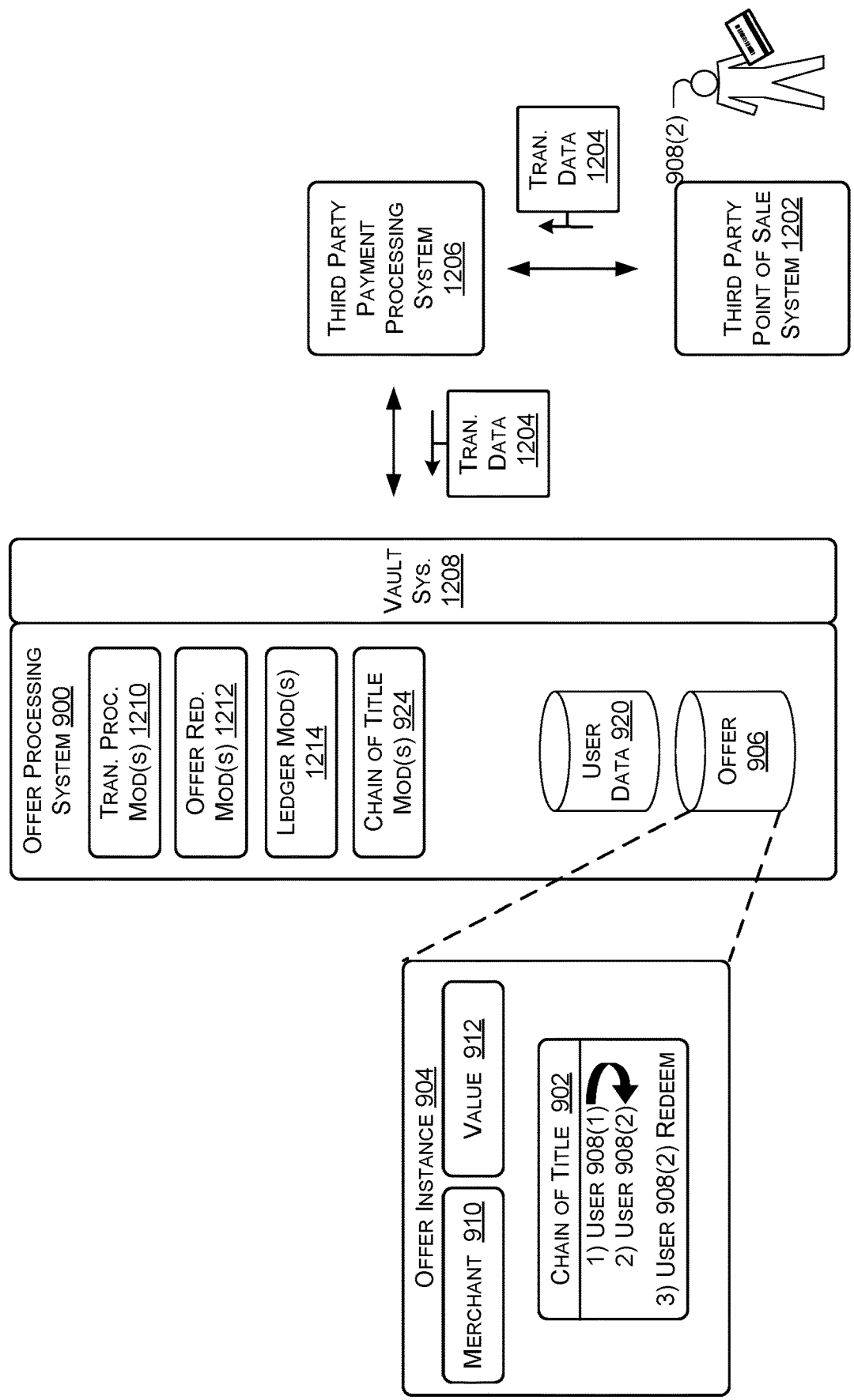
FIG. 12 illustrates the example offer processing system of FIG. 9 configured to track a chain of title of an instance of an offer being shared with individual users according to some implementations.

FIG. 12 illustrates the example offer processing system 900 of FIG. 9 configured to track a chain of title 902 of an instance 904 of offer 906 being shared with individual users 908(1) and 908(2) according to some implementations. In the current example, the instance 904 has been shared with the user 908(2) and the user 908(2) is in the process of making a purchase at a third party point of sale system 1202 associated with the offer 906.

As discussed above, the transaction data 1204 is provided to a third party payment processing system 1206 which in turn provides the transaction data 1204 to the offer processing system 900 via a vault system 1208. A transaction processing module 1210 may identify the user 908(2) as associated with the transaction data 1204 via user data 920 (e.g., via stored payment credentials). The transaction processing module 1210 may also determine the offer 906 is applicable to the purchase represented by the transaction data 1204. The offer redemption module 1212 may cause a coupon settlement system (not shown) to transfer a value 912 associated with the offer 906 to the offer processing system 900.

The chain of title module 924 may determine that there was a version of the offer 906 shared with the user 908(2) and that the version was instance 904. The chain of title module 924 may also determine that the user 908(1) shared the instance 904 of the offer 906 with the user 908(2). In this case, the chain of title module 924 may alert the ledger module 1214 that the user 908(1) shared the offer 906 with the user 908(2) and the ledger module 1214 may apply a portion of the value 912 to the ledger of the user 908(1) to reflect the sharing of the offer 906. Thus, by utilizing an offer processing system 900 that tracks chain of title 902 per instance 904 of an offer 906, the value 912 redeemed on the offer 906 may be shared between individual users 908 in a manner that prevents fraud.

In some cases, the chain of title module 924 may be distributed over multiple devices or servers and operate under a block chain scheme. Thus, in these cases, the chain of title 902 associated with the instance 904 may be distributed as a plurality of copies over the various devices and servers. In some cases, if a particular copy of the chain of title 902 fails to match or validate correctly, the particular copy may be discarded from the system.

Figure 13:
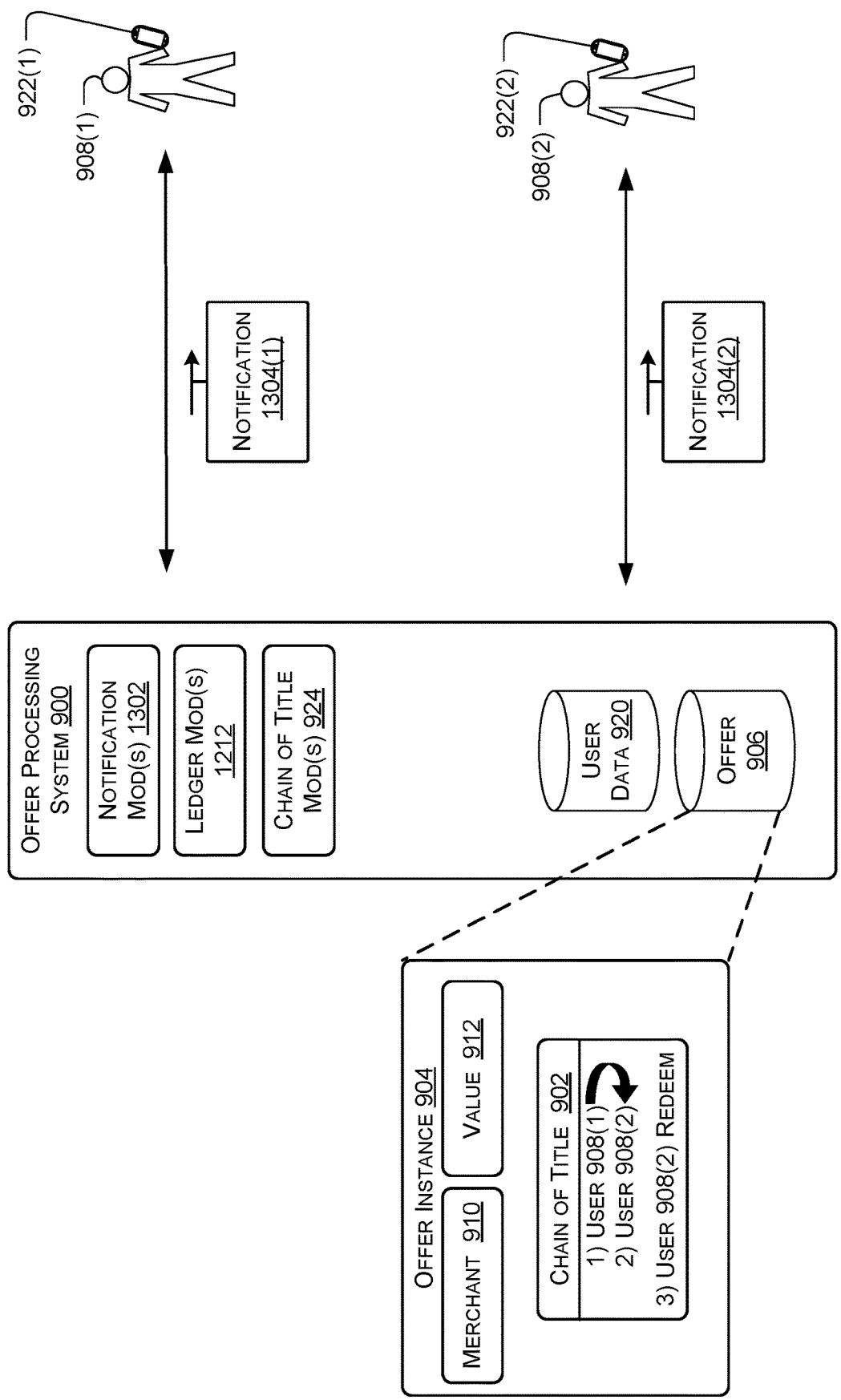
FIG. 13 illustrates the example offer processing system of FIG. 9 configured to track a chain of title of an instance of an offer being shared with individual users according to some implementations.

It should also be understood, that in some cases, the ledgers or leger data associated with each individual user 908 may also be distributed. In this example, each ledger may be distributed as a plurality of copies over multiple devices and servers. In some cases, if a particular copy of the ledger fails to match or validate correctly with respect to the other copies, the particular copy may be discarded from the system. FIG. 13 illustrates the example offer processing system 900 of FIG. 9 configured to track a chain of title 902 of an instance 904 of offer 906 being shared with individual users 908(1) and 908(2) according to some implementations. In the current illustration, the ledger module 1212 has updated the ledger of user 908(1) with the first portion of the value 912 and the ledger of user 908(2) with the second portion of the value 912 redeemed by applying the offer 906 to the purchase of the user 908(2). A notification module 1302 may then be configured to send a notification 1304(1) to the user device 922(1) associated with the user 908(1) indicating the addition of the first portion of the value 912 to the user's 908(1) ledger. Similarly, the notification module 1302 may send a notification 1304(2) to the user device 922(2) associated with the user 908(2) indicating the addition of the second portion of the value 912 to the user's 908(2) ledger.

Figure 14:
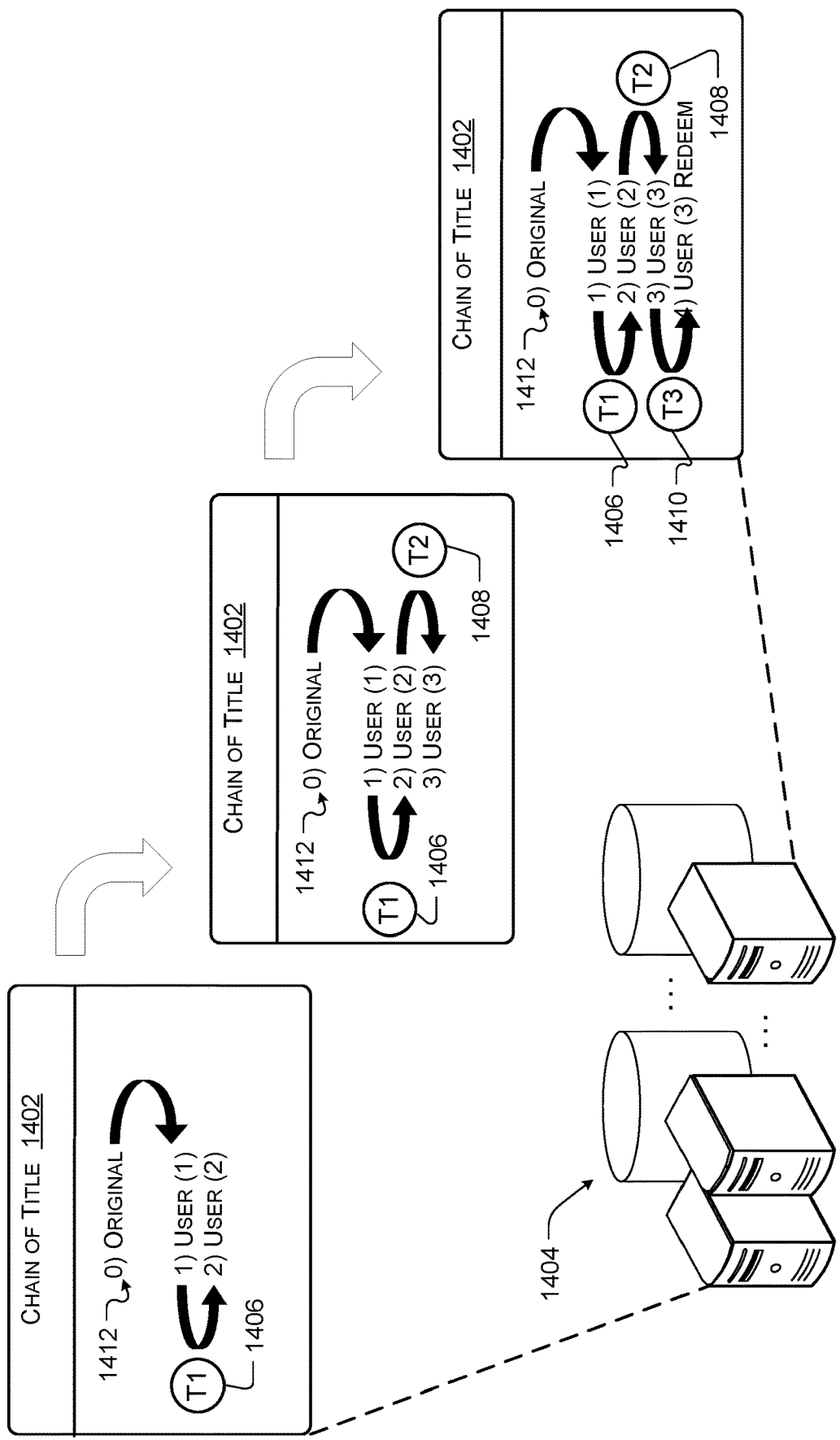
FIG. 14 illustrates an example chain of title distributed over a plurality of computing resources being updated over time according to some implementations.

FIG. 14 illustrates an example chain of title 1402 distributed over a plurality of computing resources, generally indicated by 1404, being updated over time, T1 1406, T2 1408, and T3 1410, according to some implementations. For instance, at the time T1 1406, a first user may share an instance of an offer that was redeemed or presented to the first user by an offer processing system. Thus, the offer processing system may update the chain of title to reflect the sharing of the instance from the first user to the second user. Next at a time T2 1408, the second user may again share the offer with a third user. Again, the offer processing system may update the chain of title to reflect the sharing of the instance from the second user to the third user.

At a time T3 1408, the third user may complete a purchase that meets or exceeds the criteria of the offer represented by the instance of the offer. For example, as discussed above, the offer processing system may receive transaction data from either or both of a third party point of sale device and/or a third party payment processing system and determine that the purchase meets or exceeds the criteria of the offer. In this case, once the offer processing system receives value associated with the offer, the offer processing system may distribute the offer in portions to the first, second, and third user by determining that the chain of title 1402 is valid and that each of the first, second and third user were involved with the third user making a purchase to redeem the offer.

In some cases, the chain of title 1402 may include an original unique node, generally indicated by 1412, that may be utilized to validate that the instance and chain of title 1402 is valid. In some cases, the original unique node 1412 may include a time stamp that invalidates the instance represented by the chain of title 1402. For example, if the third user's purchase was performed more than three months from receiving the shared offer, the first user and the second user may not be entitled to receive portions of the value redeemed as it is unlikely the third user made the purchase in response or because of the sharing of the instance. In some implementations, copies of the chain of title 1402 associated with each instance of an offer may be stored in a distributed manner over the computing resources 1404. In these implementations, the chain of title 1402 may be considered valid if each of the copies or greater than a threshold percentage of the copies are valid. In this manner, the offer processing system may avoid tampering with the chain of title 1402 and prevent unauthorized distribution of portions of offer value redeemed by the offer processing system. In other cases, the chain of title 1402 may be effected by generating unique hash codes for each interaction with the chain of title 1402. The offer processing system may then validate the chain of title 1402 based on the hash codes associated with the chain of title.

Figure 15:
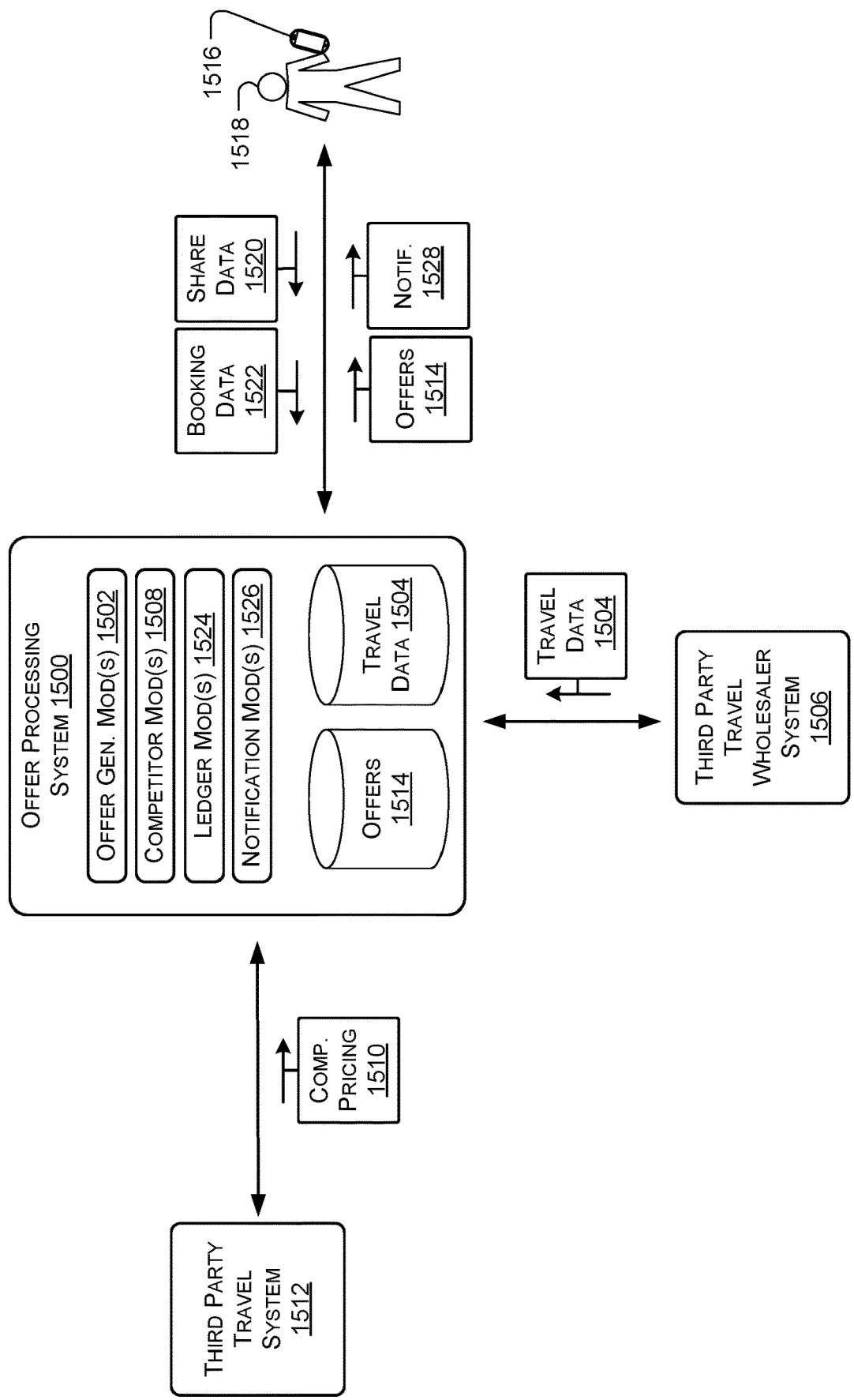
FIG. 15 illustrates an example offer processing system configured to generate and redeem travel based offers according to some implementations.

FIG. 15 illustrates an example offer processing system 1500 configured to generate and redeem travel based offers according to some implementations. In the illustrated example, the offer processing system 1500 may include an offer generation module 1502. The offer generation module 1502 may be configured to receive travel data 1504 associated with discounted or wholesale inventory available for purchase from a third party travel wholesaler system 1506. A competitor module 1508 or the offer generation module 1502 may also be configured to retrieve or receive competitive pricing data 1510 from third party travel systems 1512, such as a travel reseller system or travel merchant site.

The offer generation module 1502 may generate offers 1514 based at least in part on the competitive pricing 1510 and the wholesale price of the inventory. For example, the offer generation module 1502 may determine a difference between the competitive pricing 1510 of the inventory and the wholesale price of the same inventory item. The offer generation module 1502 may then convert the difference or a portion of the difference into a cash back offer 1514. For instance, in one particular example, a hotel room that is available on the wholesaler system 1506 for $150 may be for sale at the third party travel system 1512 for $200. From this data, the offer generation module 1502 may generate an offer 1514 to purchase the hotel room for $200 with a $50 cash back when purchased via the offer processing system 1500. Alternately, the offer generation module 1502 may generate an offer 1514 to purchase the hotel room for $200 with a $25 cash back when purchased via the offer processing system 1500. In yet another example, the offer generation module 1502 may generate an offer 1514 to purchase the hotel room for $175 with a $25 cash back when purchased via the offer processing system 1500.

Once the offer generation module 1502 generates an offer 1514 based on the competitive pricing 1510 and the travel data 1504 received from the third party travel wholesaler system 1506, the offer 1514 may be provided to a user's device 1516 to alert a user 1518 to the existence of the offer 1514. In some cases, the offer 1514 may be sent to the user device 1516 in response to a request for pricing or offers related to a particular travel inventory or item. In one particular example, the offer 1514 may be generated (e.g., the competitive pricing 1510 determined and the travel data 1504 retrieved) in response to a request for pricing or offers related to a particular travel inventory or item. Thus, the offer processing system 1500 may operate to generate offers in substantially real time based on requests or searches received from the user devices 1516.

Additionally, once the offer 1514 is generated and sent to the user device 1516, the user 1518 may share 1520 the offer 1514 or book the offer 1514. In one particular case, the ledger module 1524 may be configured to receive the booking data 1522 from the user device 1516 and to cause the value represented by the ledger associated with the user 1518 to reflect the booking data 1522. For example, if the user 1518 booked the $200 hotel room then the ledger module 1524 may convert the offer system currency reflected in the ledger to US dollars and subtract the $200 or cause the $200 to be transferred to the wholesaler system 1506 in order to purchase the room. The ledger may also credit the ledger with the $50 saving associated with the offer 1514. In one particular example, the ledger module 1524 may subtract the $150 from the user's ledger, as the value of the offer 1514 does not need to be redeemed from a third party system. Thus, the offer processing system 1500 may reduce any overhead associated with debiting and crediting the ledger. Once the offer value is credited to the user's ledger, a notification module 1526 may send a notification 1528 to the user device 1516 to alert the user 1518 to the credit, as discussed above.

FIGS. 16-22 are timing diagrams illustrating example flows associated with the offer processing system of FIGS. 1-15 according to some implementations. The processes are illustrated as a collection of blocks in a logical flow diagram, which represent a sequence of operations, some or all of which can be implemented in hardware, software or a combination thereof. In the context of software, the blocks represent computer-executable instructions stored on one or more computer-readable media that, which when executed by one or more processors, perform the recited operations. Generally, computer-executable instructions include routines, programs, objects, components, encryption, deciphering, compressing, recording, data structures and the like that perform particular functions or implement particular abstract data types.

Figure 16:
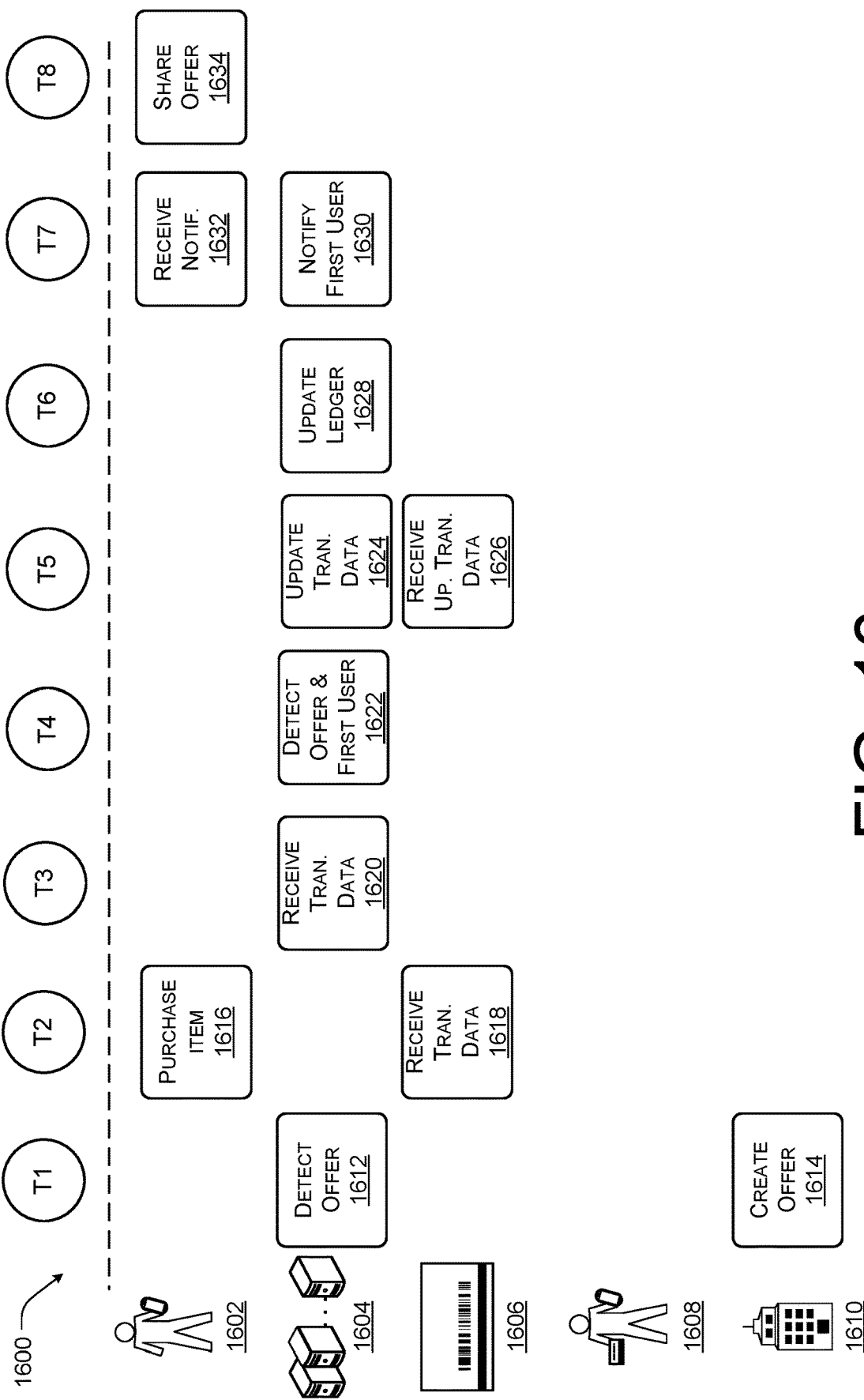
FIG. 16 is an example timing diagram showing an illustrative process for redeeming offers according to some implementations.

FIG. 16 is an example timing diagram showing an illustrative process 1600 for redeeming offers according to some implementations. As shown in the illustrated example, the process 1600 is performed over times T1-T8 by actors, such as a first user 1602, the offer processing system 1604, a third party payment processing system 1606, a second user 1608, and a merchant or merchant system 1610.

Initially at 1612 and a time T1, the offer processing system 1604 may detect an offer. For example, the offer processing system 1604 may detect an offer that is published to the Internet® or another network via one or more webcrawls or offer detection modules. In another case, such as discussed above with respect to FIG. 15, the offer processing system 1604 may generate an offer by converting a discount or wholesale price of an item, unit, inventory, or service into a cash back offer.

Alternatively, at 1614 and at time T1, the merchant 1610 may create the offer. For example, the merchant 1610 may access a merchant dashboard or platform, as discussed above with respect to FIG. 5, to generate an offer or an offer campaign (e.g., multiple offers or offers presented based on thresholds, such as redemption numbers or time).

At 1616 and time T2, the first user 1602 may purchase an item. For example, the user 1602 may utilize payment credentials stored with the offer processing system 1604 to make a purchase at a point of sale device (not shown). In some cases, the purchase may meet or exceed one or more criteria associated with the offer detected at 1612 or created at 1614.

At 1618 and at time T2, transaction data associated with the purchase of the first user 1602 is received by the third party payment processing system 1606. The third party payment processing system 1606 may then provide the transaction data to the offer processing system 1604 during the pendency of the transaction or prior to final approval of the transaction.

At 1620 and time T3, the offer processing system 1604 may receive the transaction data from the third party payment processing system 1606. At 1622 and T4, the offer processing system 1604 may detect that the transaction data meets or exceeds the requirements of the offer and that the transaction is associated with the first user 1602. For example, the offer processing system 1604 may detect the stored payment credentials are being used to process the transaction represented by the transaction data.

At 1624 and time T5, the offer processing system 1604 may and update the transaction data to apply the offer to the transaction, and, at 1626, the offer processing system 1604 may send and the third party payment processing system 1606 may receive the updated transaction data. The third party payment processing system 1606 may then complete or approve the transaction.

At 1628 and time T6, the offer processing system 1604 may update the ledger associated with the first user 1602. For example, the offer processing system 1604 may redeem the offer via a coupon settlement company. When the value is received the offer processing system 1604 may determine what portion of the value is to be credited to the first user 1602 and then update the user's ledger accordingly.

At 1630, 1632, and at time T7, the offer processing system 1604 may send and the first user 1602 may receive a notification as to the value that is credited to the first user's ledger. In some cases, the notification may be sent to a user device implementing a client side or user application.

At 1634, the first user 1602 may cause the offer processing system 1604 to share the offer with another user, such as the second user 1608. In some cases, the notification received at 1632 may cause the user device to alert the first user 1602 to the credit and present the first user 1602 with the option to share the offer with one or more connected individuals, such as the second user 1608.

Figure 17:
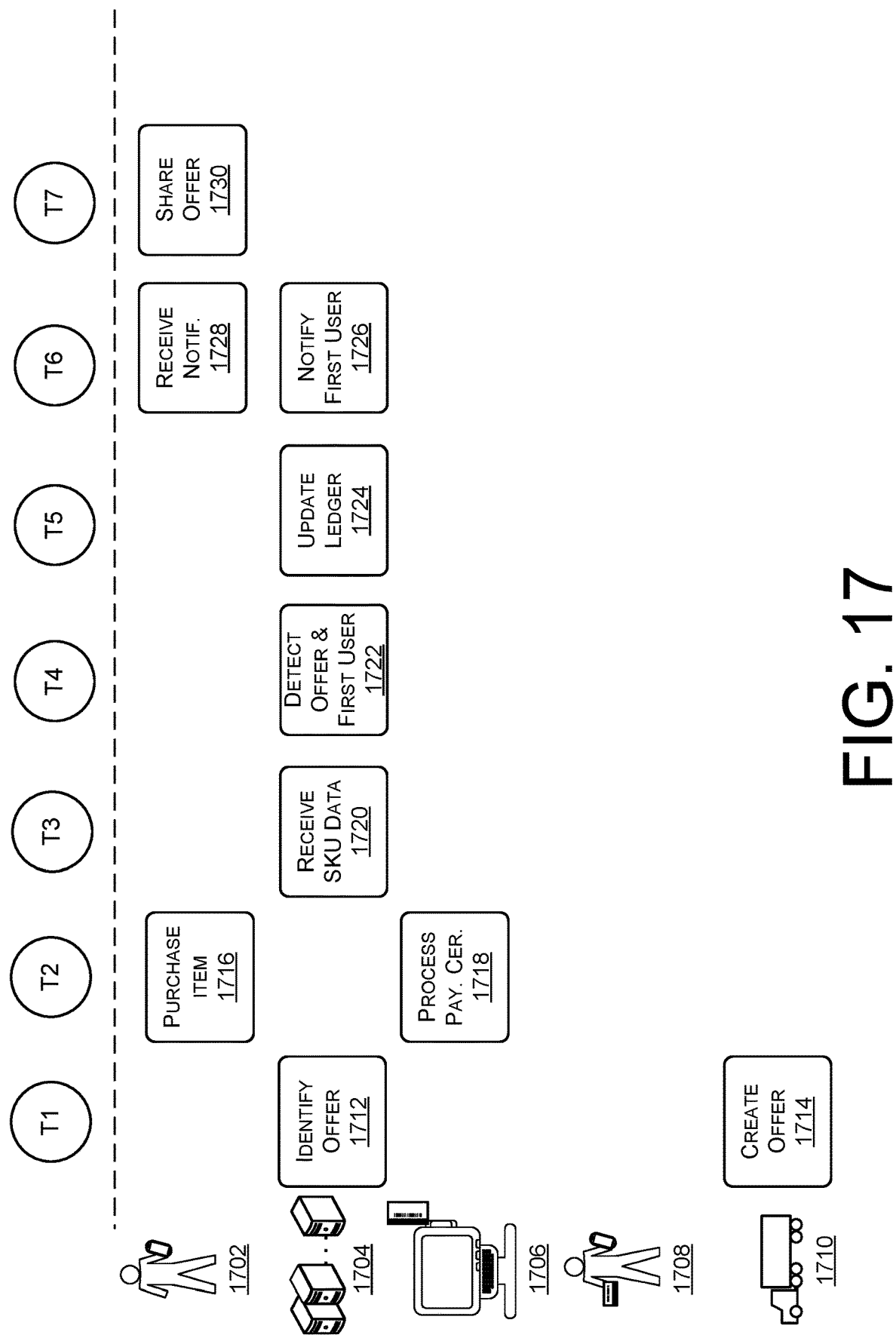
FIG. 17 is another example timing diagram showing an illustrative process for redeeming offers according to some implementations.

FIG. 17 is another example timing diagram showing an illustrative process 1700 for redeeming offers according to some implementations. As shown in the illustrated example, the process 1700 is performed over times T1-T7 by actors, such as a first user 1702, the offer processing system 1704, a third party point of sale system 1706, a second user 1708, and a merchant or merchant system 1710.

Initially at 1712 and a time T1, the offer processing system 1704 may identify an offer. For example, the offer processing system 1704 may detect an offer that is published to the Internet® or another network via one or more webcrawls or offer detection modules. In another case, such as discussed above with respect to FIG. 15, the offer processing system 1704 may generate an offer by converting a discount or wholesale price of an item, unit, inventory, or service into a cash back offer.

Alternatively, at 1714 and at time T1, the merchant 1710 may create the offer. For example, the merchant 1710 may access a merchant dashboard or platform, as discussed above with respect to FIG. 5, to generate an offer or an offer campaign (e.g., multiple offers or offers presented based on thresholds, such as redemption numbers or time).

At 1716 and time T2, the first user 1702 may purchase an item. For example, the user 1702 may utilize payment credentials stored with the offer processing system 1704 to make a purchase at a point of sale device 1706. In some cases, the purchase may meet or exceed one or more criteria associated with the offer detected at 1712 or created at 1714.

At 1718 and at time T2, payment credentials associated with the purchase of the first user 1702 is processed by the third party point of sale system 1706. The third party point of sale system 1706 may then provide the SKU data associated with the purchase to the offer processing system 1704. In some cases, the third party point of sale system 1706 may also provide transaction data to the offer processing system 1704 together with the SKU data.

At 1720 and time T3, the offer processing system 1704 may receive the SKU data from the third party payment processing system 1706. At 1722 and T4, the offer processing system 1704 may detect that the SKU data meets or exceeds the requirements of the offer (e.g., the purchase of a particular item or unit) and that the transaction is associated with the first user 1702. For example, the offer processing system 1704 may detect the stored payment credentials are being used to process the transaction represented by the transaction data.

At 1724 and time T5, the offer processing system 1704 may update the ledger associated with the first user 1702. For example, the offer processing system 1704 may redeem the offer via a coupon settlement company. When the value is received the offer processing system 1704 may determine what portion of the value is to be credited to the first user 1702 and then update the user's ledger accordingly.

At 1726, 1728, and at T6, the offer processing system 1704 may send and the first user 1702 may receive a notification as to the value that is credited to the first user's ledger. In some cases, the notification may be sent to a user device implementing a client side or user application.

At 1730 and time T7, the first user 1702 may cause the offer processing system 1704 to share the offer with another user, such as the second user 1708. In some cases, the notification received at 1728 may cause the user device to alert the first user 1702 to the credit and present the first user 1702 with the option to share the offer with one or more connected individuals, such as the second user 1708.

Figure 18:
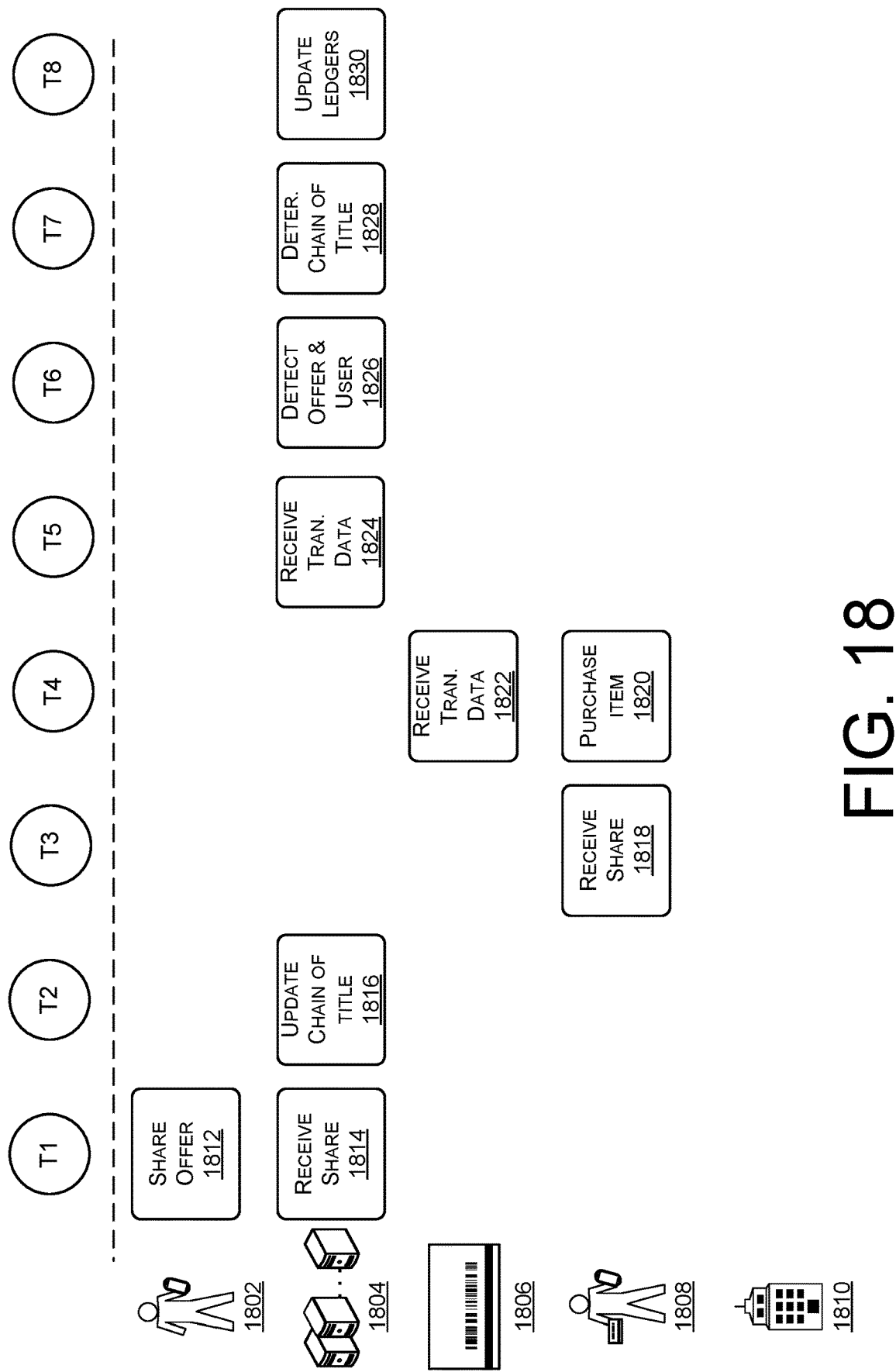
FIG. 18 is an example timing diagram showing an illustrative process for sharing offers according to some implementations.

FIG. 18 is an example timing diagram showing an illustrative process 1800 for sharing offers according to some implementations. As shown in the illustrated example, the process 1800 is performed over times T1-T8 by actors, such as a first user 1802, the offer processing system 1804, a third party payment processing system 1806, a second user 1808, and a merchant or merchant system 1810. In this particular example, the first user 1802 is sharing an offer with the second user 1808 whom in turn makes a purchase that meets or exceeds the criteria associated with the offer.

At 1812, 1814, and at time T1, the first user 1802 may cause the offer processing system 1804 to share the offer with another user, such as the second user 1808. For example, the first user 1802 may have received a notification related to the offer and thought that the second user 1808 would be interested.

At 1816 and time T2, the offer processing system 1804 may update a title associated with an instance of the offer. The chain of title may be utilized to track the sharing, viewing, and redemption of the offer with respect to user's social interactions. For example, the offer processing system 1804 may divide any value redeemed in association with an offer applied based on the chain of title or social sharing information.

At 1818 and time T3, the second user 1808 may receive the share of the offer. For instance, the offer may be presented to the second user 1808 via a second user device associated with the second user 1808 and implementing a client side application.

At 1820, 1822, and time T4, the second user 1808 may make a purchase that meets or exceeds the criteria of the offer at a point of sale device (not shown) using payment credentials stored with the offer processing system 1804. Transaction data associated with the purchase of the second user 1808 is received by the third party payment processing system 1806. The third party payment processing system 1806 may then provide the transaction data to the offer processing system 1804 during the pendency of the transaction or prior to final approval of the transaction.

At 1824 and time T5, the offer processing system 1804 may receive the transaction data from the third party payment processing system 1806. At 1826 and T6, the offer processing system 1804 may detect that the transaction data meets or exceeds the requirements of the offer and that the transaction is associated with the second user 1808. For example, the offer processing system 1804 may detect the stored payment credentials are being used to process the transaction represented by the transaction data.

At 1828 and time T7, the offer processing system 1804 may determine from the chain of tittle that the first user 1802 shared the offer with the second user 1808 prior to the second user 1808 completing a purchase that met or exceeded the criteria of the offer.

At 1830 and time T8, the offer processing system 1804 may update a ledger associated with the first user 1802 and a ledger associated with the second user 1808. For instance, once the offer processing system 1804 determines that the offer was shared by the first user 1802 with the second user 1808 and that the chain of title is valid, the offer processing system 1804 may allocate a portion of the value of the offer to the first user 1802 and the remainder of the value to the second user 1808.

Figure 19:
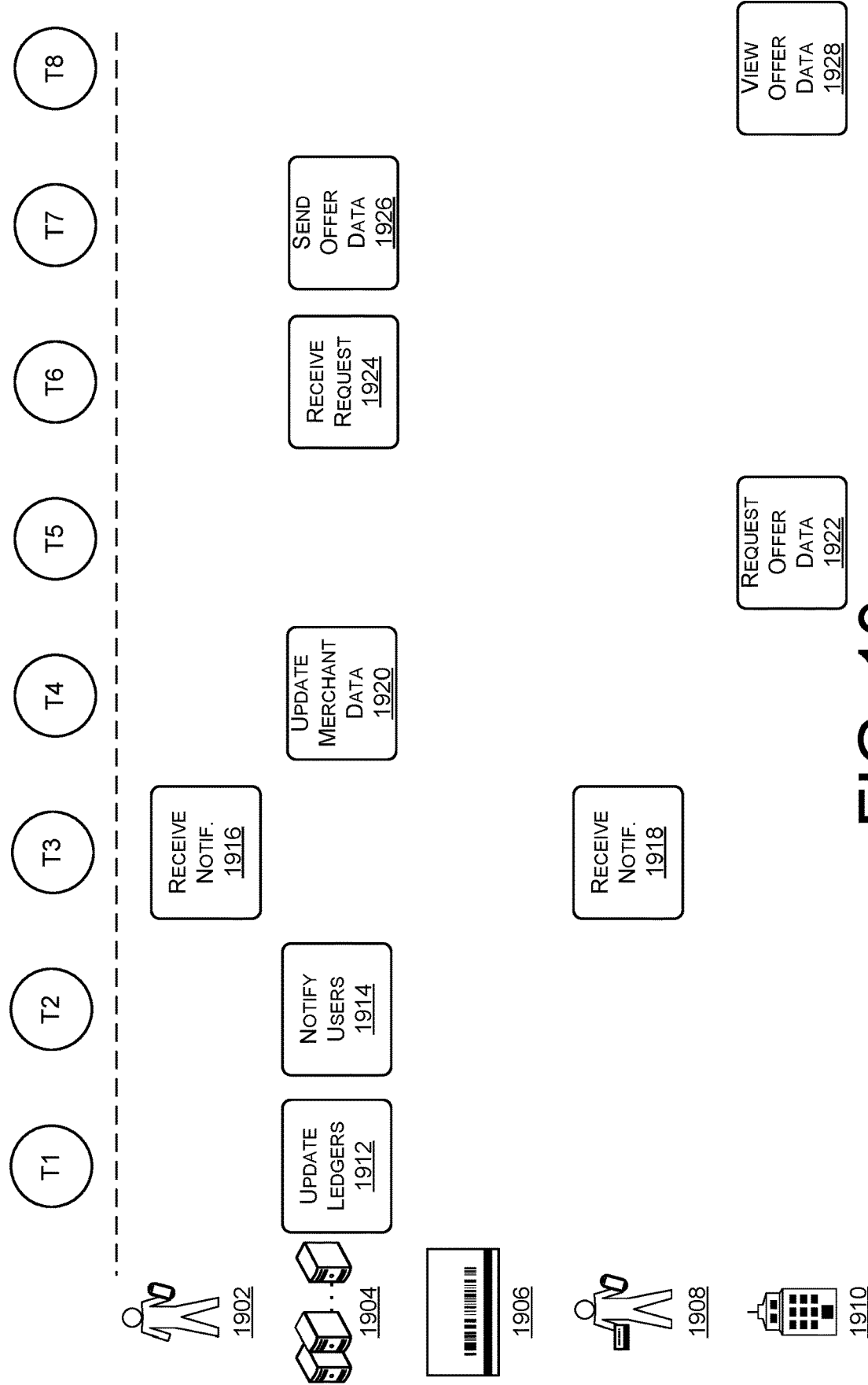
FIG. 19 is another example timing diagram showing an illustrative process for sharing offers according to some implementations.

FIG. 19 is another example timing diagram showing an illustrative process 1900 for sharing offers according to some implementations. As shown in the illustrated example, the process 1900 is performed over times T1-T8 by actors, such as a first user 1902, the offer processing system 1904, a third party payment processing system 1906, a second user 1908, and a merchant or merchant system 1910.

In this particular example, at 1912 and time T1, the offer processing system 1904 has updated the ledgers associated with the first user 1902 and the second user 1908 after the second user 1908 made a purchase that qualified for an offer shared with the second user 1908 by the first user 1902. For instance, once the offer processing system 1904 determines that the offer was shared by the first user 1902 with the second user 1908 based on a valid chain of title, the offer processing system 1904 may allocate a portion of the value of the offer to the first user 1902 and the remainder of the value to the second user 1908.

At 1914 and time T2, the offer processing system 1904 sends the first user 1902 a first notification as to the portion of the value credited to the first user's ledger and the second user a second notification as to the remaining portion of the value credited to the second user's ledger. In some cases, the notification may be sent to a user device implementing a client side or user applications.

At 1916, 1918, and time T3, the first user 1902 receives the first notification and the second user 1908 receives the second notification. For instance, the first user device may alert the first user 1902 to the first notification by vibrating, emitting an audible noise or sound, flashing a light, etc. Similarly, the second user device may alert the second user 1908 to the second notification.

At 1920 and T4, the offer processing system 1904 may update merchant or offer data. For instance, the offer processing system 1904 may collect analytics or data associated with each offer redeemed, each offer shared, revenue generated based on offers, user shopping habits and/or location, purchase time and dates, payment system usages, among others.

At 1922 and time T5, the merchant 1910 may access the offer processing system 1904 or send a request to the offer processing system 1904 to view the offer data being aggregated or collected by the system 1904. For example, the merchant 1910 may desire to view an amount of sharing associated with a particular offer, an amount of value redeemed on an offer, an amount of revenue generated from purchases associated with offers, types of users redeeming offers, etc.

At 1924 and time T6, the offer processing system 1904 may receive the request from the merchant 1910 and, at 1926 and time T7, send the requested data to the merchant system 1910 making the request. In some cases, the offer processing system 1904 may process the offer data prior to sending the requested data to the merchant system 1910. And, at 1928 and time T8, the merchant 1910 may view the offer data.

Figure 20:
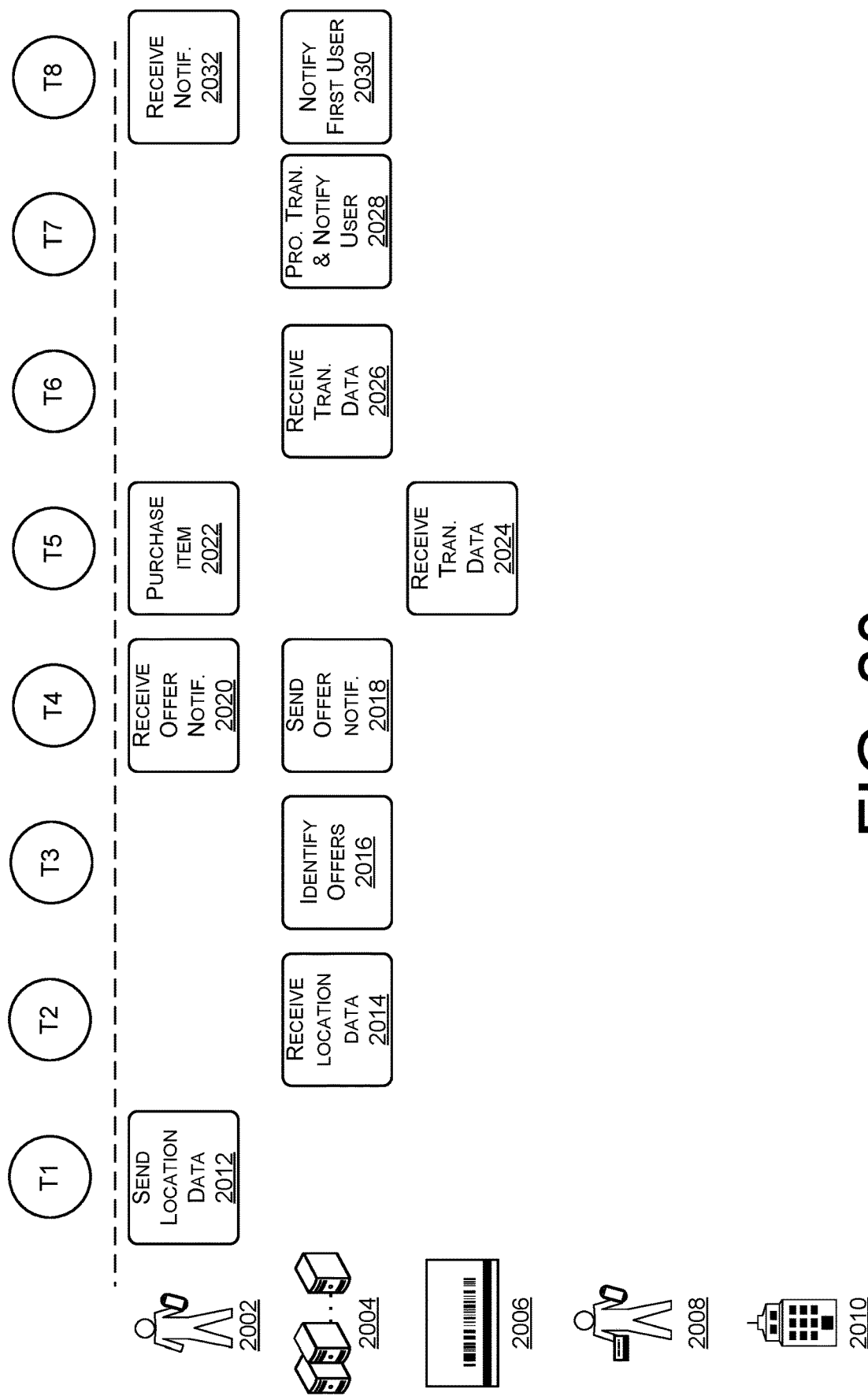
FIG. 20 is an example timing diagram showing an illustrative process for sharing offers according to some implementations.

FIG. 20 is an example timing diagram showing an illustrative process 2000 for sharing offers according to some implementations. As shown in the illustrated example, the process 2000 is performed over times T1-T8 by actors, such as a first user 2002, the offer processing system 2004, a third party payment processing system 2006, a second user 2008, and a merchant or merchant system 2010. In this example, the offer processing system 2004 is providing or sending offers to the user 2002 based on information known about the user 2002, such as location data received from a user device associated with the user 2002.

At 2012 and time T1, the user device hosting a client side application may transmit location data, such as global position satellite (GPS) data, wifi data, wireless communication network data (e.g., connected tower ID), among others to the offer processing system 2004. However, in other examples, it should be understood that the offer processing system 2004 may receive or store other data associated with the users 2002 and 2008, such as buying habits, previous purchase data, venue or merchant data (e.g., repeat purchases at the same venue), time/date data (e.g., similar purchases at similar times and dates), etc.

At 2014 and time T2, the offer processing system 2004 may receive the location data from the user device and, at 2016 and time T3, the offer processing system 2004 may identify one or more offers that may be of interest to the user 2002 based on the location data. For example, the offer processing system 2004 may select offers within a threshold distance of the user 2002 or offers that are located at venues on a predicted travel path of the user 2002. For instance, in one particular example, the offer processing system 2004 may determine from the location data and time data that the user 2002 is driving to work. The offer processing system 2004 may also be aware that the user 2002 typically stops for coffee on the drive to work based on previous purchase history. Thus, the offer processing system 2004 may identify offers for coffee at venues along the user's 2004 route to work or within a threshold distance of the route to work.

At 2018, 2020, and time T4, the offer processing system 2004 may send and the user device associated with the user 2002 may receive offer data or the offer identified as of interest to the user 2002 by the offer processing system 2004. For example, an application operating on the user device may present the offers as a visual indication on a map, such as together with navigation information.

At 2022 and time T5, the user may make a purchase corresponding to the offer via a third party point of sale device at the venue selected, as discussed above. At 2024, a third party payment processing system 2006 may receive the transaction data associated with the purchase. At 2026 and T6, the third party payment processing system 2006 may provide and the offer processing system 2004 may receive the transaction data. For instance, the transaction data may be accessible to the offer processing system 2004 during the pendency of the transaction or prior to final approval of the transaction by the third party payment processing system 2006.

At 2028 and time T7, the offer processing system 2004 may process the transaction data. For example, the offer processing system 2004 may determine that the transaction data meets or exceeds the criteria of the offer shared with the user 2002. The offer processing system 2004 may also determine that the transaction data is associated with the user 2002 and cause the offer to be redeemed from a third party coupon settlement company, merchant, or distributor on behalf of the user 2002. The offer processing system 2004 may then apply the value of the offer or a portion of the value of the offer to the user's 2002 ledger.

At 2030, 2032, and time T8, the offer processing system 2004 may send and the user device associated with the user 2002 may receive a notification to alert the user 2002 that the transaction data meets or exceeds the requirements of the offer and a value has been redeemed and added to the user's 2002 ledger within the offer processing system 2004.

Figure 21:
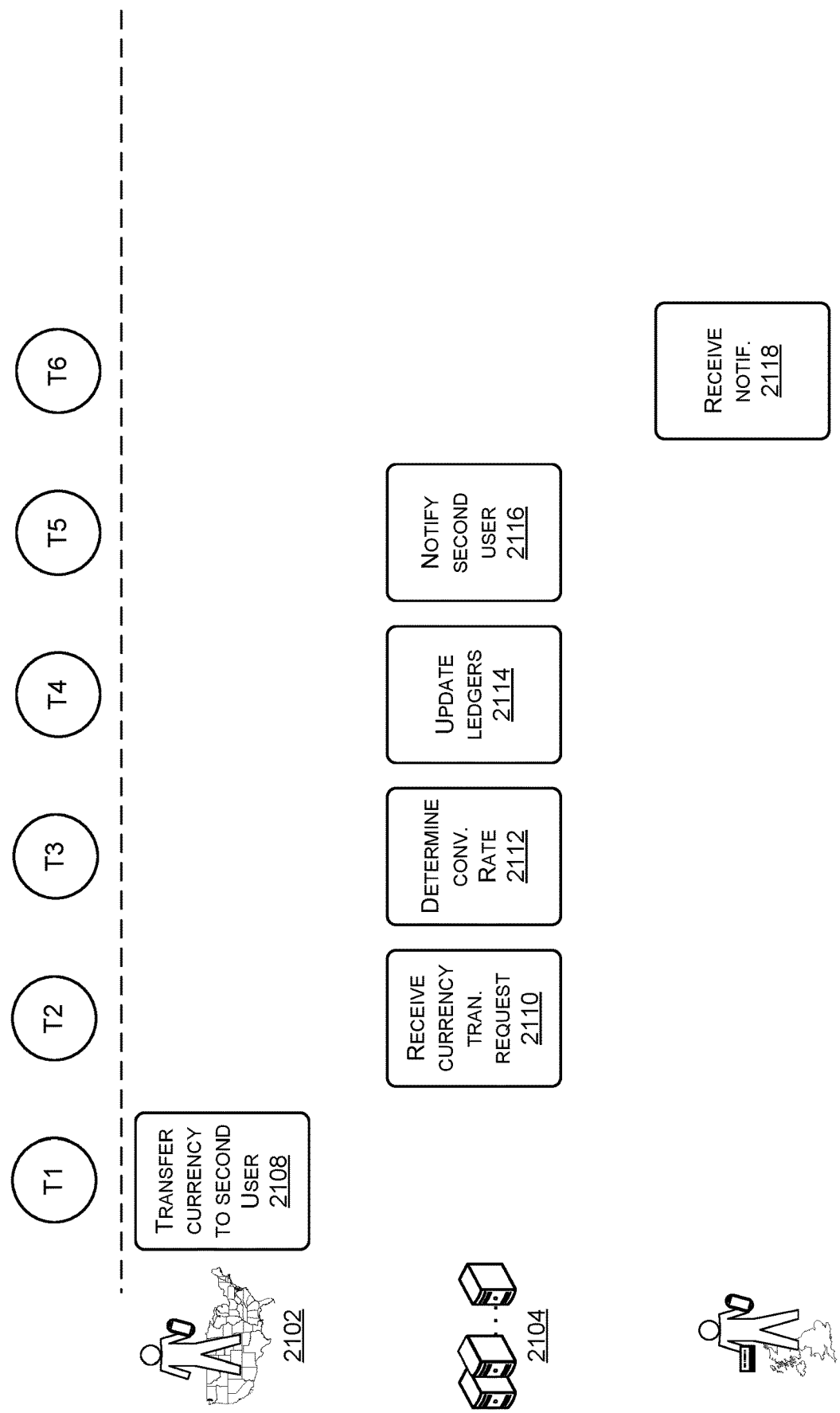
FIG. 21 is an example timing diagram showing an illustrative process for transferring currency via the offer processing system according to some implementations.

FIG. 21 is an example timing diagram showing an illustrative process 2100 for transferring currency via the offer processing system according to some implementations. As shown in the illustrated example, the process 2100 is performed over times T1-T6 by actors, such as a first user 2102, the offer processing system 2104, and a second user 2106. In this example, the first user 2102 is transferring or sending currency or value via the offer processing system 2104 to an account or ledger associated with the second user 2106. However, the first user 2102 is located within the United States that utilized the US dollar as the monetary unit and the second user 2106 is located within the United Kingdom that utilizes the Pound as the monetary unit.

In this example, the offer processing system 2104 may be configured to present the value stored on a user's ledger or account in the monetary unit that the user is accustomed to using or the monetary unit associated with a user's current location. Thus, the offer processing system 2104 may be configured and/or registered as a currency exchange system.

At 2108 and time T1, the first user 2102 may send a currency transfer request to transfer a portion of the value associated with the user's 2102 account or ledger to the second user 2106 via a user device associated with the first user 2102. For example, the first user 2102 may be giving a gift to a relative.

At 2110 and time T2, the offer processing system 2104 may receive the currency transfer request and, at 2112 and time T3, the offer processing system 2104 may determine a currency associated with the first user 2102 and a currency associated with the second user 2106. The offer processing system 2104 may then determine a substantially real time conversion rate between the currency of the first user 2102 (e.g., US Dollars) and the currency of the second user 2106 (e.g., Pounds).

At 2114 and time T3, the offer processing system 2104 may update the ledger or account of the first user 2102 and the second user 2106 based on the amount of currency to be transferred and the determined conversion rate. At 2116, 2118, and time T4, the offer processing system 2104 may send a notification to a user device associated with the second user 2106. The user device may then alert the second user 2106 to the deposit to the second user's 2106 account or ledger.

In the current example, the offer processing system 2104 may maintain ledgers or account balances in a currency associated with a location of the users. However, in other examples, the offer processing system 2104 may maintain the ledgers or account balances in a jurisdiction free currency that may be converted prior to transferring value out of the offer processing system 2104. In some specific examples, the jurisdiction free currency or offer processing system 2104 currency may be used as a live currency to make purchases, such as travel arrangements or other in system offers. In other examples, the jurisdiction free currency or offer processing system 2104 currency may be convertible into various point systems, such as rewards points, customer loyalty points, etc., in lieu of a transfer into live currency.

Figure 22:
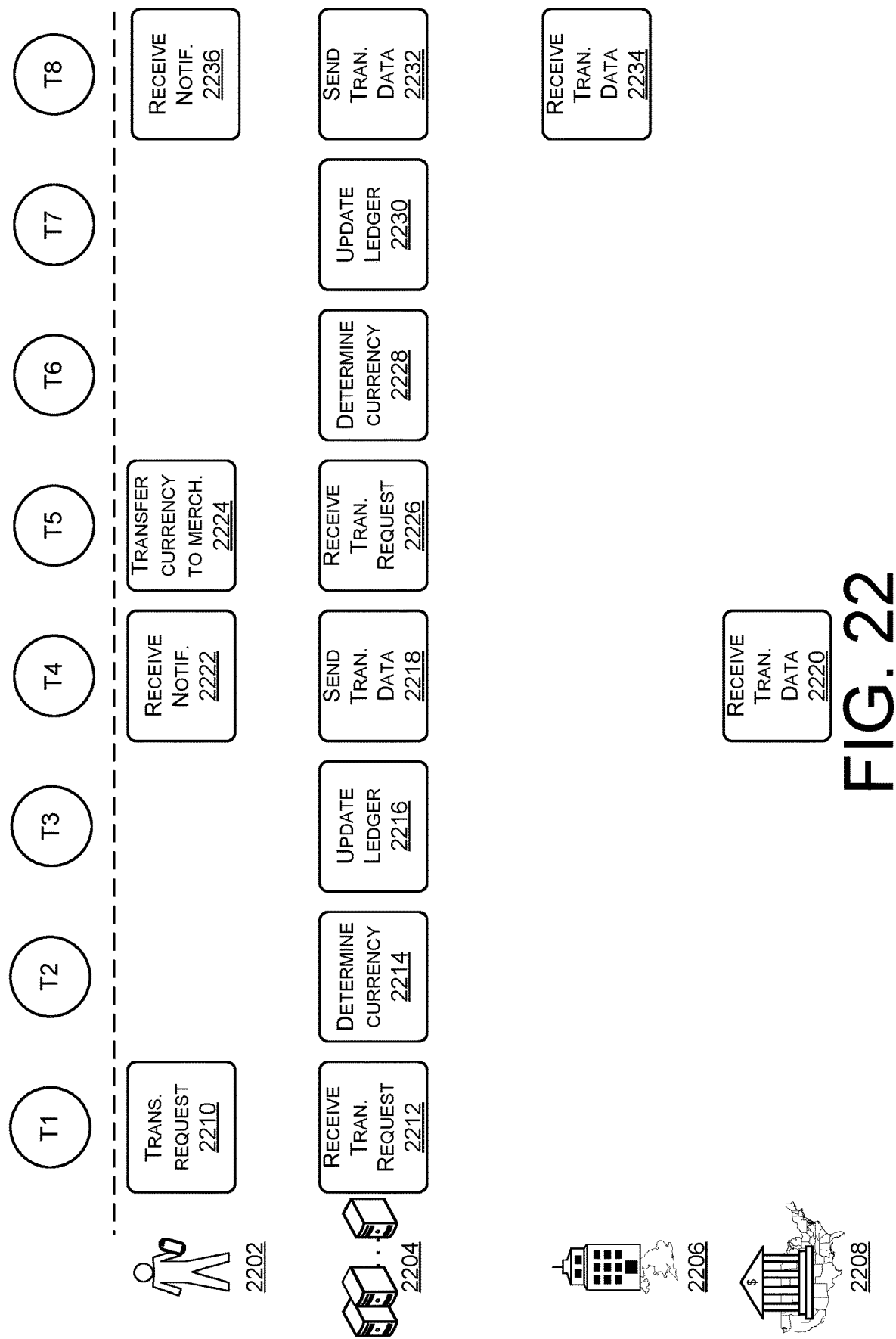
FIG. 22 is another example timing diagram showing an illustrative process for transferring currency via the offer processing system according to some implementations.

FIG. 22 is another example timing diagram showing an illustrative process 2200 for transferring currency via the offer processing system according to some implementations. As shown in the illustrated example, the process 2200 is performed over times T1-T8 by actors, such as a first user 2202, the offer processing system 2204, a merchant or merchant system 2206, and a financial system 2208. In this example, the first user 2202 is transferring or sending currency or value via the offer processing system 2204 to an account or ledger associated with the financial system 2208 as well as paying a balance due to a merchant 2206. In this example, the user's 2202 account or ledger with the offer processing system 2204 may be maintained in the jurisdiction free currency or offer processing system 2204 currency, while the financial system 2208 is located within the United States and utilized the US dollar as the monetary unit and the merchant system 2206 is located within the United Kingdom and utilizes the Pound as the monetary unit.

At 2210, 2212, and time T1, the first user 2102 may send and the offer processing system 2204 may receive a request to transfer currency to the financial system 2208. For example, the user 2202 may desire to deposit funds into a bank account prior to an automatic payment being withdrawn.

At 2214 and time T2, the offer processing system 2204 may determine a currency associated with the financial system 2208. For instance, in the illustrated example, the offer processing system 2204 may determine that the financial system 2208 operates in US Dollars based on a location of the financial system 2208 or the user 2202 within the United States. In some cases, the user 2202 may designate the currency to use for the transfer, such as a transfer request for Fifty-Five US Dollars.

At 2216 and time T3, the offer processing system 2204 may determine an amount or value to deduct from the ledger or account of the user 2202 based on the currency of the financial system 2208 and the current exchange rate between the offer processing system currency and, in this example, the US Dollar.

At 2218, 2220, and T4, the offer processing system 2204 may send and the financial system 2220 may receive transaction data to cause the value or amount of US Dollars to be transferred or deposited into an account at the financial system 2208. In some cases, at 2222 and T4, the offer processing system 2204 may also send a notification that is received at a user device associated with the user 2202 that the amount has been transferred and, in some cases, a balance remaining on the user's 2202 ledger or account.

At 2224, 2226, and time T5, the first user 2102 may send and the offer processing system 2204 may receive a request to transfer currency to the merchant system 2206. For example, the user 2102 may desire to pay a bill or balance due to the merchant 2206.

At 2228 and time T6, the offer processing system 2204 may determine a currency associated with the merchant system 2206. For instance, in the illustrated example, the offer processing system 2204 may determine that the merchant system 2206 operates in Pounds based on a location of the merchant system 2206. In some cases, the user 2202 may designate the currency to use for the transfer, such as a transfer request for One Hundred Pounds.

At 2230 and time T7, the offer processing system 2204 may determine an amount or value to deduct from the ledger or account of the user 2202 based on the currency of the merchant system 2206 and the current exchange rate between the offer processing system currency and, in this example, the Pound.

At 2232, 2234, and T8, the offer processing system 2204 may send and the merchant system 2206 may receive transaction data to cause the value or amount of Pounds to be transferred or deposited into an account associated with the merchant system 2206. In some cases, at 2236 and T8, the offer processing system 2204 may also send a notification that is received at a user device associated with the user 2202 that the amount has been transferred and, in some cases, a balance remaining on the user's 2202 ledger or account.

While actions associated with the FIGS. 16-22 above are shown at particular times T1-T8 in a particular order, it should be understood that in some cases a period of item between each time T1-T8 may vary and that actions associated with a time T1-T8 may be performed over a length of time or at substantially the same time.

FIGS. 23-27 are flow diagrams illustrating example processes associated with an offer processing system according to some implementations. The processes are illustrated as a collection of blocks in a logical flow diagram, which represent a sequence of operations, some or all of which can be implemented in hardware, software or a combination thereof. In the context of software, the blocks represent computer-executable instructions stored on one or more computer-readable media that, which when executed by one or more processors, perform the recited operations. Generally, computer-executable instructions include routines, programs, objects, components, encryption, deciphering, compressing, recording, data structures and the like that perform particular functions or implement particular abstract data types.

The order in which the operations are described should not be construed as a limitation. Any number of the described blocks can be combined in any order and/or in parallel to implement the process, or alternative processes, and not all of the blocks need be executed. For discussion purposes, the processes herein are described with reference to the frameworks, architectures and environments described in the examples herein, although the processes may be implemented in a wide variety of other frameworks, architectures or environments.

Figure 23:
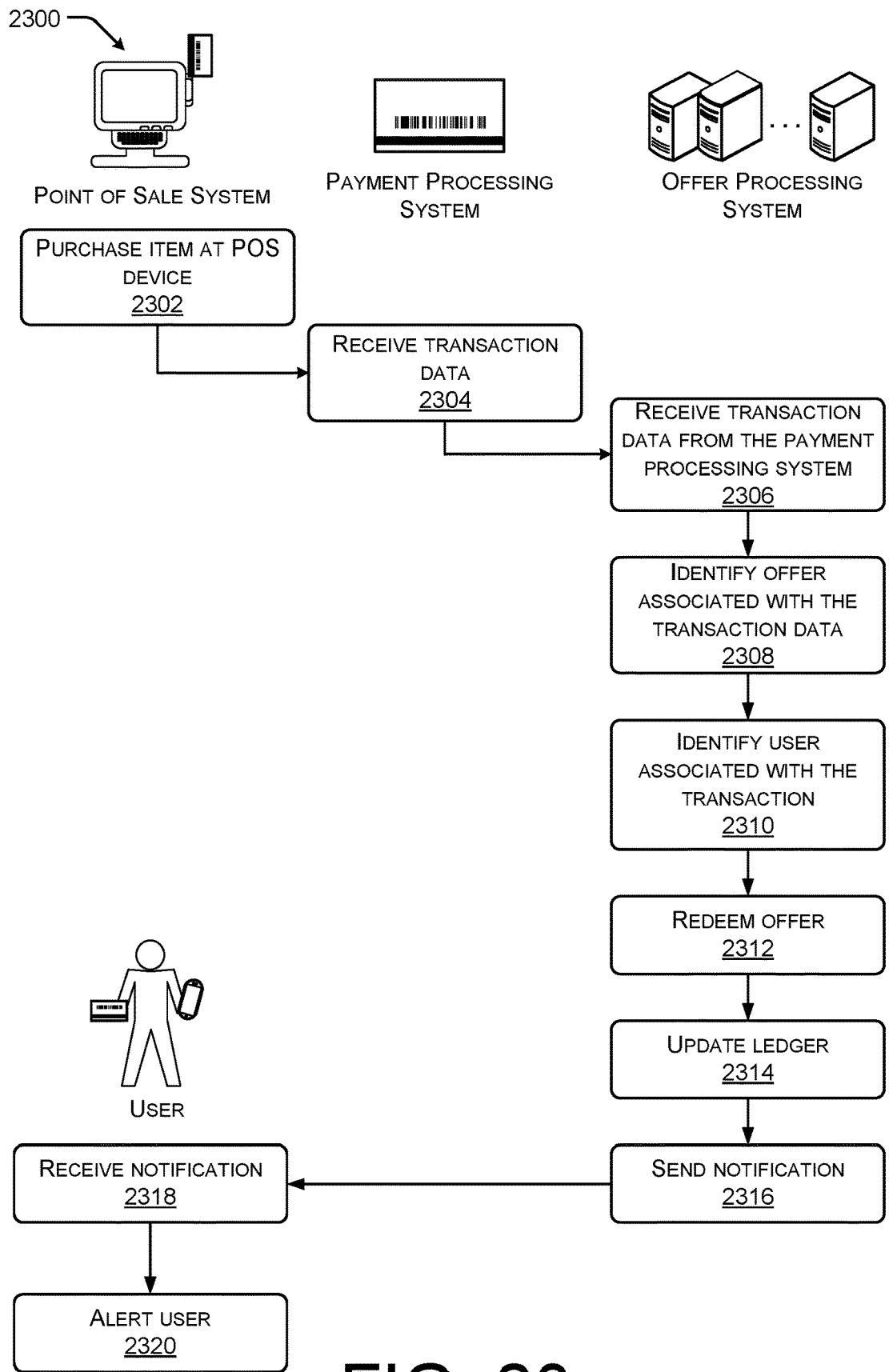
FIG. 23 is an example flow diagram showing another illustrative process for redeeming offers according to some implementations.

FIG. 23 is example flow diagram showing another illustrative process 2300 for redeeming offers according to some implementations. For instance, an offer processing system may be configured to monitor transaction data associated with purchases of one or more users and to determine if each purchase made by one or more users using a registered payment credential qualifies for an offer. When the offer processing system determines that a purchase does qualify for an offer, the offer processing system may redeem the offer on behalf of the user and alert the user to the savings.

At 2302, a user may purchase an item at a point of sale system. For example, the user may utilize payment credentials stored with the offer processing system to make a purchase that qualifies for one or more offers, cash back deals, or savings.

At 2304, the payment processing system may receive transaction data associated with the purchase of the user from the point of sale system. And, at 2306, the third party payment processing system may provide the transaction data to the offer processing system during the pendency of the transaction or prior to final approval of the transaction.

At 2308, the offer processing system may identify one or more offers associated with the transaction data. For example, the offer processing system may determine that the transaction was at a particular merchant running a cash back offer for purchases greater than $35 and that the purchase was for $40. In other cases, such as when SKU data is available in addition to the transaction data or in lieu of the transaction data, the offer processing system may determine that the transaction includes the purchase of an item that a distributor of the item has a current cash back offer on.

At 2310, the offer processing system may identify a user associated with the transaction. In this example, the offer processing system may identify the user based on matching the payment credentials used to make the purchase at the point of sale system as belonging to a particular user.

At 2312, the offer processing system may redeem the offer. For example, offer processing system may redeem the offer with a third party coupon settlement company. In another example, the offer processing system may redeem the offer directly with a merchant or distributor.

At 2314, the offer processing system may update the ledger associated with the user. For example, the offer processing system may determine what portion of the value redeemed is to be credited to the user and then update or credit the user's ledger with the portion of the value. In some cases, other portions of the value may be charged as a processing fee or distributed to other users of the system.

At 2316, the offer processing system may send a notification as to the value that is credited to the user's ledger to a user device associated with the user. At 2318, the user device may receive the notification from the offer processing system and, at 2320, the user device may alert the user to the credit. For instance, the user device may vibrate, emit a sound, generate a visual indication, etc. to alert the user to the credit.

Figure 24:
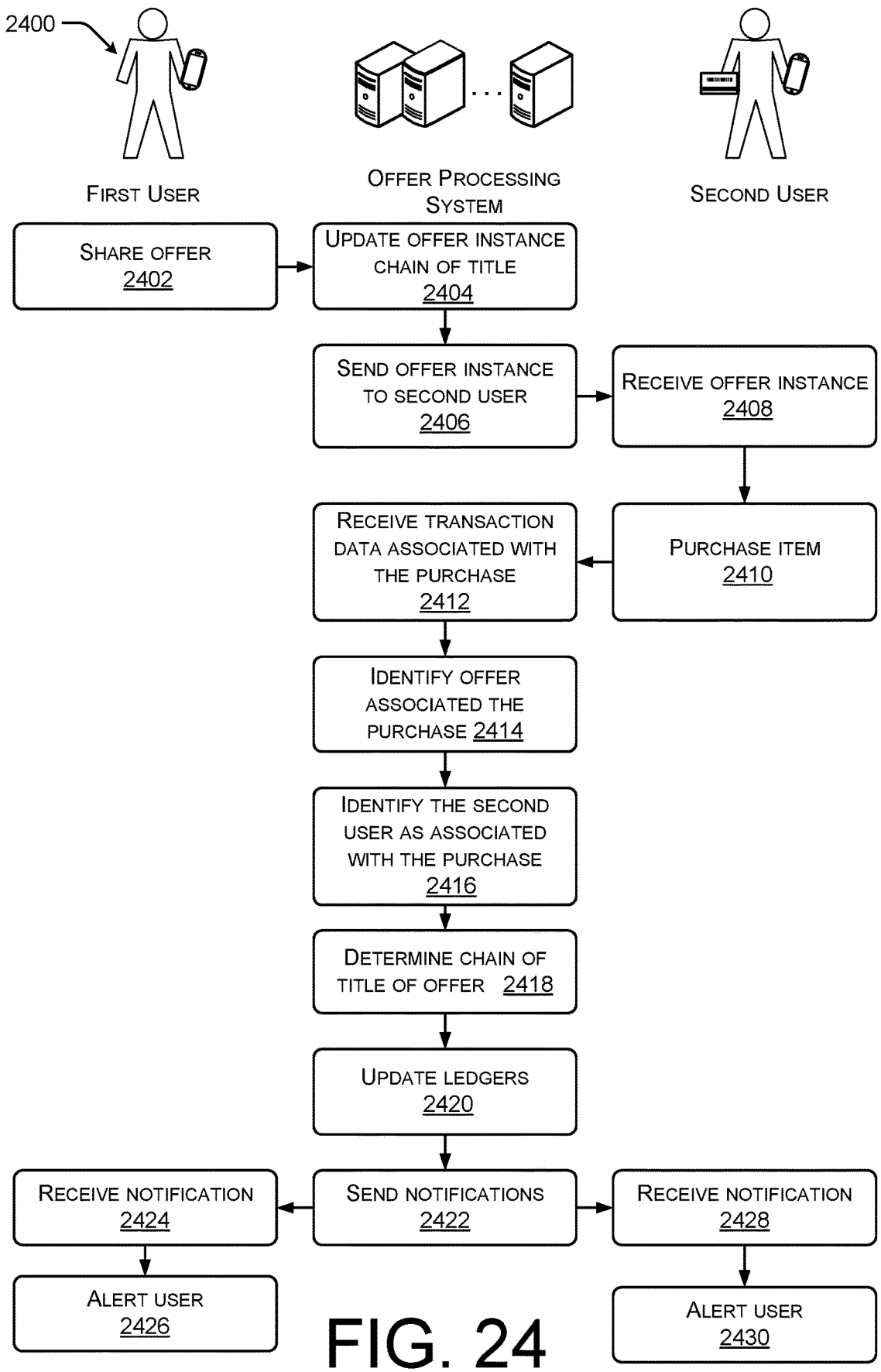
FIG. 24 is an example flow diagram showing another illustrative process for sharing offers according to some implementations.

FIG. 24 is example flow diagram showing another illustrative process 2400 for sharing offers according to some implementations. In the current example, a first user is sharing an offer with a second user. For instance, the first user may have received a notification associated with the offer indicating that the offer applied to a recent purchase of the first user. The first user may then determine that the second user may be interested in the offer.

At 2402, the first user may cause a user device to indicate that the first user desires to share the offer with the second user. The user device may transmit share instructions to the offer processing system, such that the offer processing system may facilitate the sharing of the offer.

At 2404, the offer processing system may receive the share instructions from the first user's device and update a chain of title associated with an instance of the offer. The chain of title may be used to track the sharing of the offer in order to credit individual users when a user recorded in the chain of title completes a purchase which meets or exceeds the criteria of the offer. In one particular example, the offer processing system may update a hash code associated with the instance of the offer to track the chain of title data in a way that is difficult to fake.

At 2406, the offer processing system may send the offer instance to the second user. For example, the offer processing system may send a notification or cause a user device associated with the second user to display the offer when the second user logs into the second user's account. At 2408, the second user's device may receive the notification and the second user may be alerted to the offer.

At 2410, the second user may make a purchase that meets or exceeds the criteria of the offer. For example, the second user may purchase the item being highlighted in the offer or complete a transaction at a particular merchant.

At 2412, the offer processing system may receive transaction data associated with the purchase. For instance, the offer processing system may receive the transaction data from a third party payment processing system. In another instance, the offer processing system may receive the transaction data and/or SKU data from a point of sale device or system. In some particular instances, the offer processing system may receive the transaction data from both a third party payment processing system and a third party point of sale system.

At 2414, the offer processing system may detect that the transaction data meets or exceeds the requirements of the offer. For example, the offer processing system may compare the transaction data to various merchant that have active offers and if a match is determined, compare the criteria of the offer to the transaction data to determine if an amount meets or exceeds an amount associated with the offer. In other cases, the offer processing system may compare SKU data with item identifiers that have corresponding active offers.

At 2416, the offer processing system may determine that the transaction is associated with the second user. For example, the offer processing system may detect the stored payment credentials are being used to process the transaction represented by the transaction data.

At 2418, the offer processing system may determine the chain of title associated with the offer instance or if an offer instance was shared with or by the second user. For example, the offer processing system may determine that the first user shared the offer with the second user prior to the second user completing the purchase that met or exceeded the criteria of the offer.

At 2420, the offer processing system may update a ledger associated with the first user and a ledger associated with the second user. For instance, once the offer processing system determines that the offer was shared by the first user with the second user and that the chain of title is valid, the offer processing system may allocate a portion of the value of the offer to the first user and the remainder of the value to the second user.

At 2422, the offer processing system may send notifications to the first user and the second user to alert the users that a portion of the value of the offer has been credited to the first user's account or ledger and that the remainder of the value has been credited to the second user's account or ledger.

At 2424, the device associated with the first user may receive the notification and, at 2426, the device associated with the first user may alert the first user to the notification. Similarly, at 2428 the device associated with the second user may receive the notification and, at 2430, the device associated with the second user may alert the second user to the notification.

Figure 25:
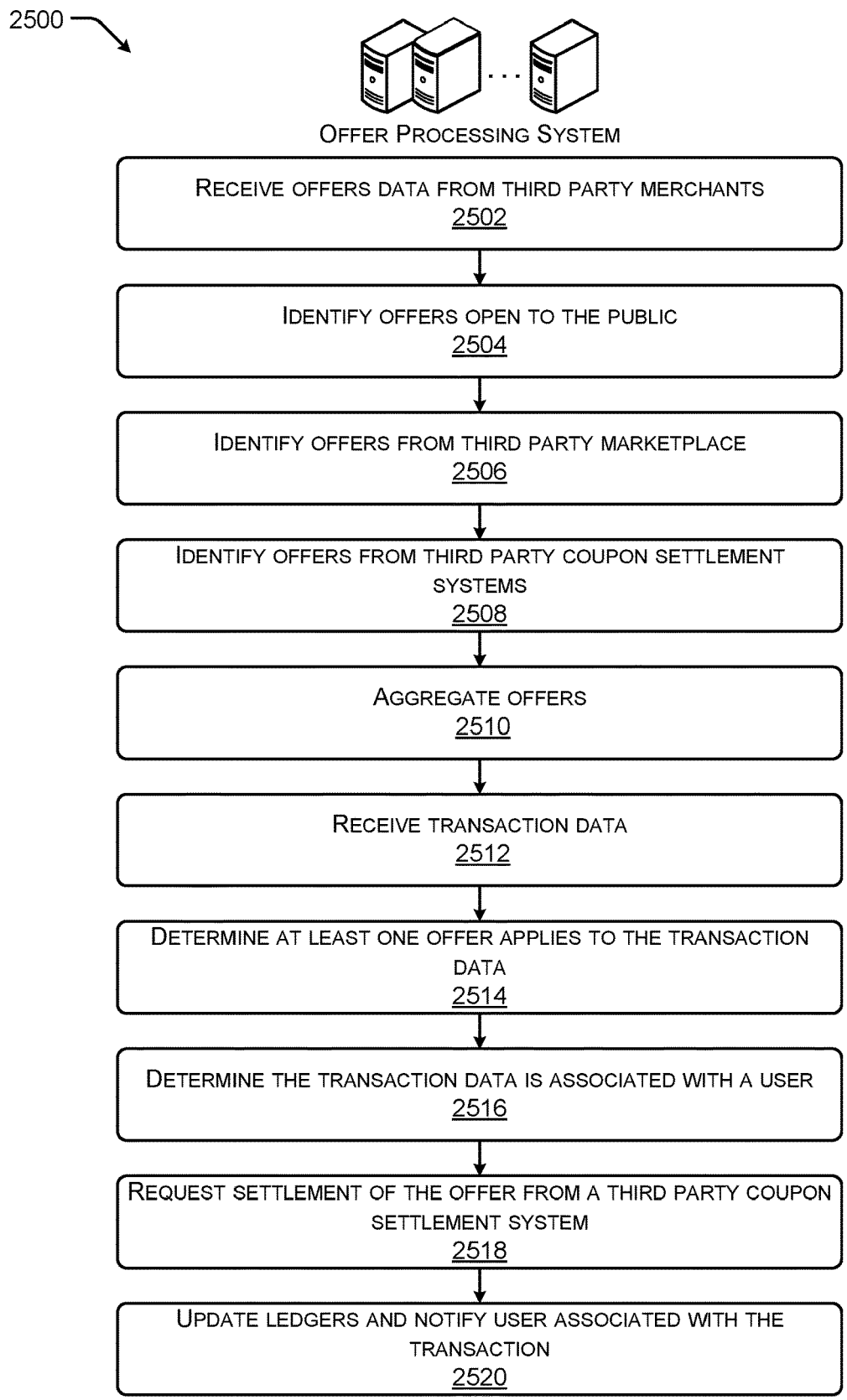
FIG. 25 is an example flow diagram showing another illustrative process for generating offers according to some implementations.

FIG. 25 is example flow diagram showing another illustrative process 2500 for generating offers according to some implementations. For example, public offers or discounts may be detected or identified by the offer processing system. In other examples, merchants, distributors, marketplaces may utilize the offer processing system or a merchant platform module of the offer processing system to generate offers that are private to the users of the offer processing system.

At 2502, the offer processing system may receive offer data from third party merchants. For example, the merchant may generate or create offers for use by the offer processing system in order to encourage the users of the offer processing system to make a purchase with the merchant. In some particular examples, the offer processing system may generate campaigns including multiple offers or changing offers based on thresholds, such as date, time, number of times an offer is redeemed, revenue generated, total user savings, etc.

At 2504, the offer processing system may identify offers open to the public. For example, the offer processing system may import offers listed at various coupon sites, at merchant sites, marketplace sites, etc. In one particular example, the offer processing system may include web-crawlers that may parse or search the Internet® for active offers.

At 2506, the offer processing system may identify offers associated with a marketplace. For example, the offer processing system may import offers that are available for shopping through marketplace sites, such as Esty.

At 2508, the offer processing system may identify or request offers available at a third party coupon settlement company. For example, the offer processing system may import offers that are redeemable at the third party coupon settlement company or may request a list of offers redeemable via the third party coupon settlement company.

At 2510, the offer processing system may aggregate the offers. For instance, the offer processing system may combine offers (e.g., offers valid on a particular item via the distributor and a particular merchant). The offer processing system may also remove duplicate offers (e.g., offers identified from public websites that mirror offers generated by a merchant or distributor with the offer processing system).

At 2512, the offer processing system may receive transaction data associated with the purchase. For instance, the offer processing system may receive the transaction data from a third party payment processing system. In another instance, the offer processing system may receive the transaction data and/or SKU data from a point of sale device or system. In some particular instances, the offer processing system may receive the transaction data from both a third party payment processing system and a third party point of sale system.

At 2514, the offer processing system may determine that at least one offer applies to the transaction data. For instance, the offer processing system may detect that the transaction data meets or exceeds the requirements of the offer. In one particular example, the offer processing system may compare the transaction data to various merchant identifiers that have active offers and if a match is determined, compare the criteria of the offer to the transaction data to determine if an amount is met or exceeded. In other cases, the offer processing system may compare SKU data with item identifiers that have corresponding active offers.

At 2516, the offer processing system may determine that the transaction is associated with a user. For example, the offer processing system may detect the stored payment credentials are being used to process the transaction represented by the transaction data.

At 2518, the offer processing system may request settlement of the offer from a third party coupon settlement system. For example, the offer processing system may redeem the value or request the value of the offer from the third party coupon settlement system.

At 2520, the offer processing system may update a ledger associated with the user and send notifications to the user to alert the users that the value of the offer has been credited to the user's account or ledger.

Figure 26:
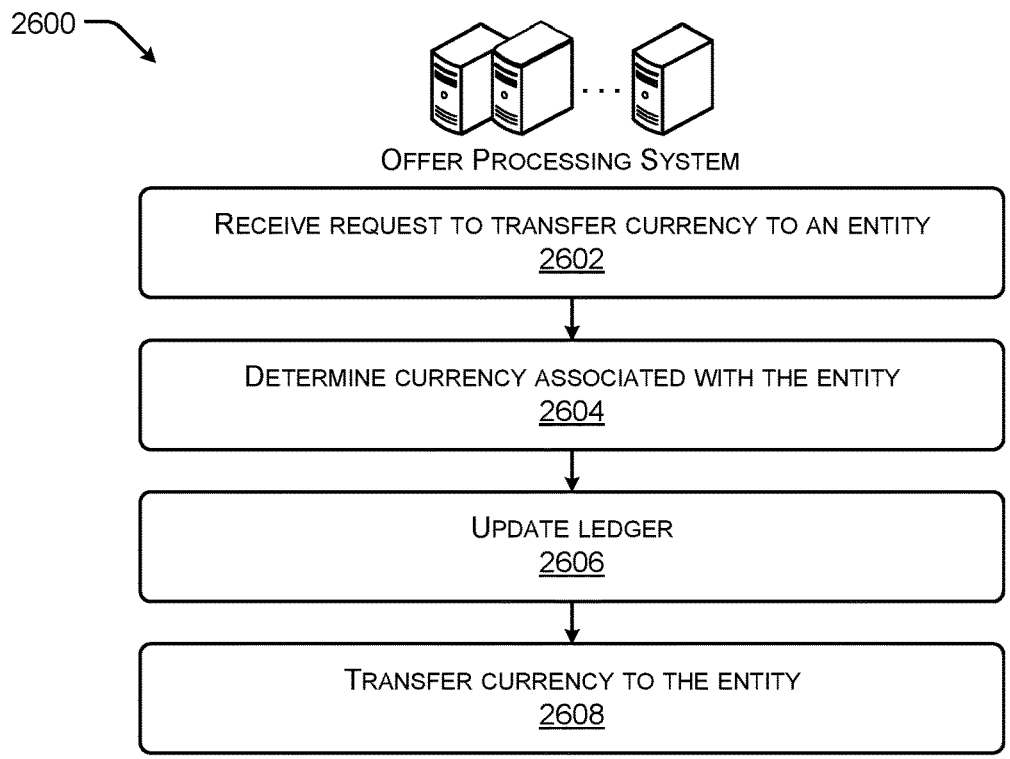
FIG. 26 is an example flow diagram showing another illustrative process for transferring currency according to some implementations.

FIG. 26 is example flow diagram showing another illustrative process 2600 for transferring currency according to some implementations. For example, the offer processing system may maintain the ledger or user accounts in a jurisdiction free or offer processing system currency. Thus, the offer processing system may convert the offer processing system currency via an exchange module into a corresponding value in a currency of an entity, user, or business when the currency is being transferred to a third party outside of the offer processing system.

At 2602, the offer processing system may receive a request to transfer currency to an entity. For example, the offer processing system may receive a request from a user to transfer currency to another individual as a gift, to a business, for instance, pay a bill, to a financial institute (e.g., a checking or savings account of the user), etc.

At 2604, the offer processing system may determine a currency associated with the entity. For instance, the offer processing system may determine that the financial system operates in US Dollars based on a location of the financial system or the user being within the United States. In some cases, the user may designate the currency to use for the transfer, such as a transfer request for Fifty-Five US Dollars. In other cases, the offer processing system may determine the currency based on a preferred currency of the entity. for instance, the offer processing system may allow entities to provide or suggest a preferred currency to use in transactions associated with the entity.

At 2606, the offer processing system may update a ledger associated with the user and send notifications to the user to alert the users to the value being transferred to the entity. For example, once the entity currency is determined the offer processing system may calculate an amount of offer processing system currency to deduct from the user's account or ledger.

At 2608, the offer processing system may transfer the currency to the entity. for example, the offer processing system may utilize a vault or secure electronic transfer protocol to transfer the currency to the entity.

Figure 27:
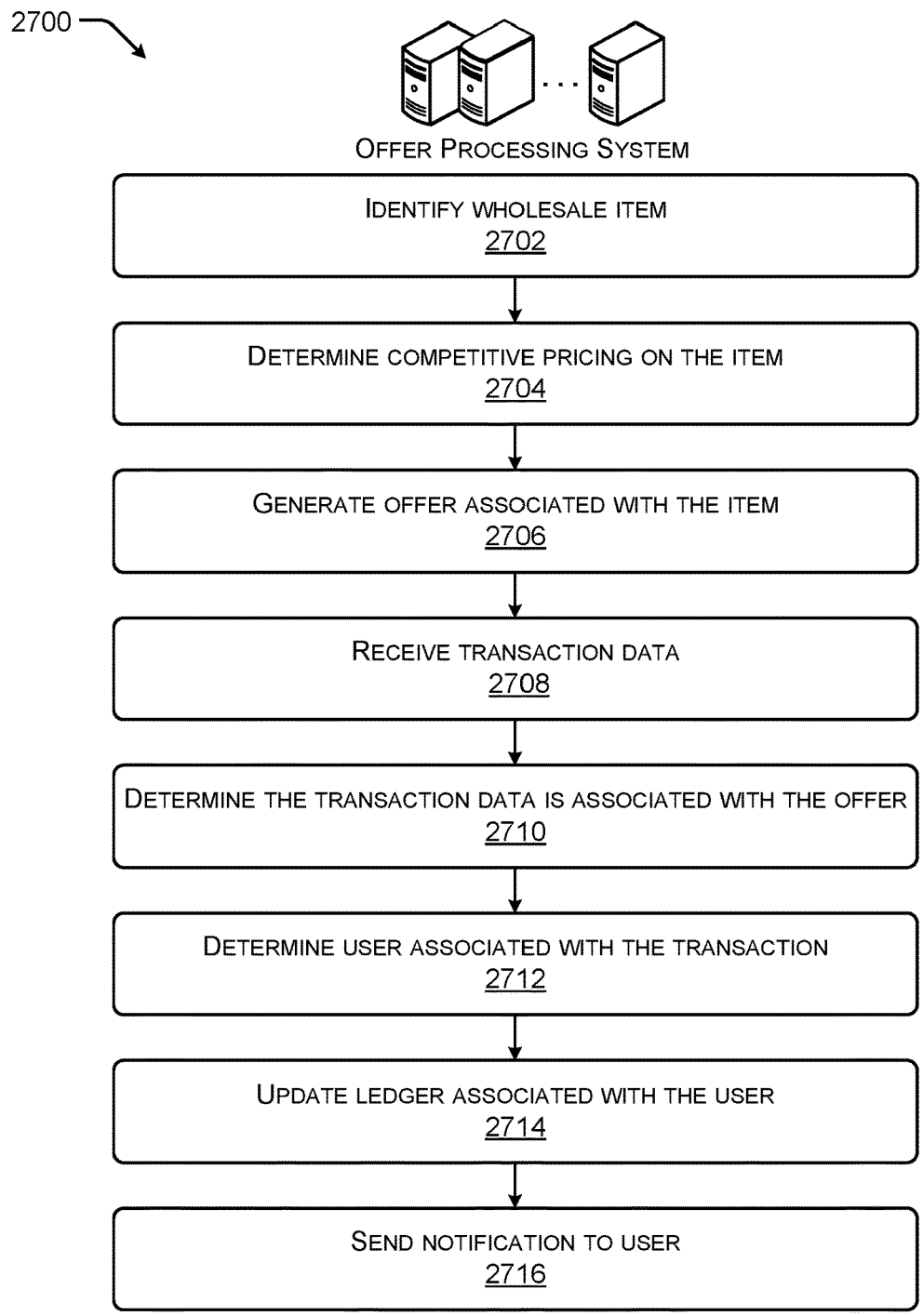
FIG. 27 is an example flow diagram showing another illustrative process for generating travel or discount based offers according to some implementations.

FIG. 27 is example flow diagram showing another illustrative process 2700 for generating travel or discount based offers according to some implementations. In some cases, such as travel inventory, items may be offered at a discount or at a wholesale price to special individuals or entities. In these cases, the offer processing system may be configured to purchase items or catalogue the items in order to create cash back offers based on the discount or savings due to the whole sale price. Thus, the savings may be passed on to users of the offer processing system whom may otherwise not be able to access the wholesale or discounted goods.

At 2702, the offer processing system may identify wholesale or discounted items. For example, the offer processing system may access travel wholesale systems to catalog hotel rooms or airline seats that are available for purchase at the wholesale price.

At 2704, the offer processing system may determine the competitive pricing for the item. For instance, the offer processing system may determine the pricing of the item from other discount sales systems. In one particular example, the offer pricing system may determine the pricing of travel aggregator or discount travel systems to determine the competitive pricing.

At 2706, the offer processing system may generate an offer for the item. For example, the offer processing system may generate the offer based on the wholesale or discounted price for the item and the competitive pricing. In one particular instance, the offer processing system may generate an offer equal to the difference between the wholesale or discount price and the lowest price offered by a competitor. In other cases, the offer processing system may generate an offer equal to a percentage of the difference between the wholesale or discount price and the lowest price offered by a competitor.

At 2708, the offer processing system may receive transaction data. For example, the offer processing system may receive the transaction data from a third party payment processing system or a third party point of sale system. In some cases, the transaction data may also include SKU data. In one pericarp, example, the offer processing system may receive the transaction data from a user device, such as when the offer is purchasable through a client side application associated with the offer processing system.

At 2710, the offer processing system may identify that the offer is associated with the transaction data. For example, the offer processing system may determine that a user selected to purchase the wholesale or discounted item via the offer processing system by clicking on selecting the offer.

At 2712, the offer processing system may identify a user associated with the transaction. In this example, the offer processing system may identify the user based on a user account or user device utilized to make the purchase via the offer processing system.

At 2714, the offer processing system may update a ledger associated with the user. For example, the offer processing system may redeem the offer by purchasing the item from the wholesale or discounted location and then credit the user's account or ledger with the price difference.

At 2716, the offer processing system may send a notification as to the value that is credited to the user's ledger or account to a user device associated with the user. The user device may receive the notification from the offer processing system and, alert the user to the credit. For instance, the user device may vibrate, emit a sound, generate a visual indication, etc. to alert the user to the credit.

Figure 28:
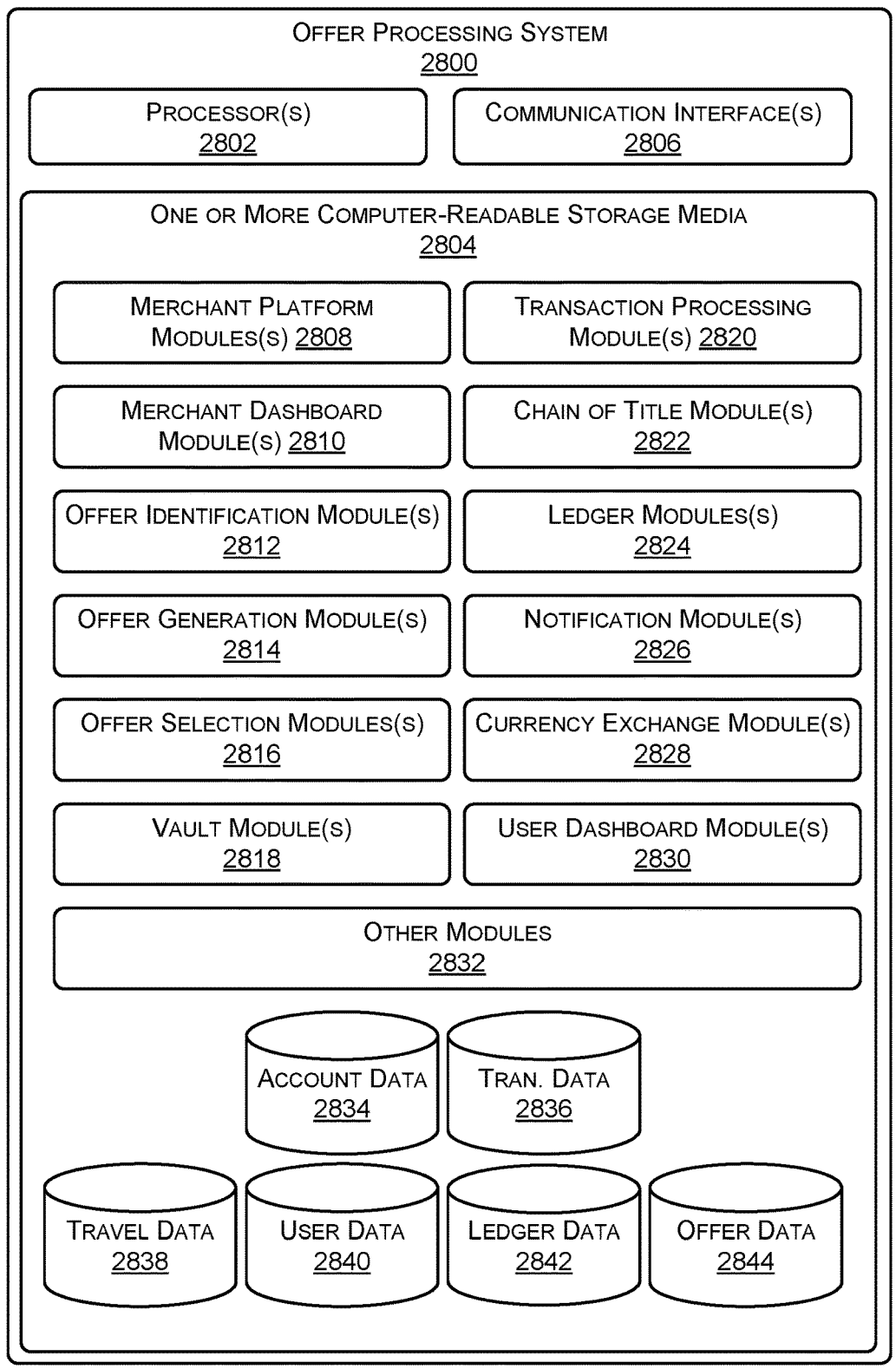
FIG. 28 illustrates an example architecture of one or more servers associated with an offer processing system according to some implementations.

FIG. 28 illustrates an example architecture of one or more servers associated with an offer processing system 2800 according to some implementations. The servers, which host the offer processing system 2800 collectively comprise processing resources, as represented by processors 2802, and computer-readable storage media 2804. The computer-readable storage media 2804 may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device.

The servers may also include one or more communication interfaces 2806, which may support both wired and wireless connection to various networks, such as cellular networks, radio (e.g., radio-frequency identification (RFID)), WiFi networks, short-range or near-field networks (e.g., Bluetooth®), infrared signals, local area networks, wide area networks, the Internet, and so forth. For example, the communication interfaces 2806 may allow the offer processing system 2800 to receive transaction data, user communications, and/or offer data from user devices and third party systems. In some cases, a co-located management system may act as a proxy or additional tier for a cloud-based management system.

Several modules such as instructions, data stores, and so forth may be stored within the computer-readable storage media 2804 and configured to execute on the processors 2802. For example, a merchant platform module 2808, a merchant dashboard module 2810, an offer identification module 2812, an offer generation module 2814, an offer selection module 2816, a vault module 2818, a transaction processing module 2820, a chain of title module 2822, a ledger module 2824, a notification module 2826, a currency exchange module 2828, a user dashboard module 2830, as well as other modules 2832. In some implementations, the computer-readable media 2804 may store data, such as account data 2834, transaction data 2836, travel data 2838, user data 2840, ledger data 2842, and offer data 2844, as well as other data.

The merchant platform module 2808 may allow merchants, marketplaces, distributors, or other entities or individuals to create offers and/or offer campaigns with the offer processing system 2800. For example, the merchant or marketplace may utilize the merchant platform module 2808 to create cash back offers associated with shopping at particular retail establishments or online venues. Similarly, the distributors may create offers associated with purchasing a particular item, unit, or service offered by the distributor regardless of the merchant or marketplace utilized to purchase the item, unit, or service.

The merchant dashboard module 2810 may allow the merchant, marketplace, coupon system, distributor or other entity or individual to track the effectiveness of an offer, such as a redemption rate, a sharing rate, a view or impression rate, etc. In some cases, the merchant dashboard module 2810 may convert the redemption rate into a revenue versus expense metric using the offer data 2844, user data 2840, and transaction data 2836 received from third party payment processing systems and/or third party point of sale systems. In some cases, the merchant dashboard module 2810 may allow the merchant, marketplace, coupon system, distributor or other entity or individual to track purchases across payment credentials even from the same user. For instance, if a user redeems the same offer at the same venue but utilized two different payment credentials (e.g., a debit card and a credit card), the offer processing system 2800 may aggregate the transaction data 2836 and present to the merchant, marketplace, coupon system, distributor or other entity or individual viewing results of an offer the fact that the same user made two purchases associated with an offer using two different payment credentials.

The offer identification module 2812 may be configured to search and locate the offer data 2844 associated with current valid offers provided by the sources. For example, the offer identification module 2812 may identify offers on various items, retail locations, online venues, etc. by searching networks for the offer data 2844. For instance, in one particular example, the offer identification module 2812 may locate and collect offer data 2844 associated with offers posted on the Internet®.

The offer generation module 2814 may be configured to generate offers based on the offer data 2844 collected by the offer identification module 2812. For example, the offer identification module 2812 may identify discount or whole sales goods (e.g., via a travel wholesaler system). The offer generation module 2814 may convert the discounted price or whole sale price of the goods into an offer redeemable by users. In one particular implementation, the offer generation module 2814 may be configured to purchase discounted items, units, inventory, or services and to generate offers to purchase the discounted items, units, inventory, or services via the offer processing system 2800.

In one particular example, the offer identification module 2812 may identify the discounted travel inventory or wholesale travel inventory as well as competitive pricing associated with the travel inventory. The offer generation module 2814 may then generate an offer based in part on a difference between the discounted or wholesale price and the competitive pricing. For example, the offer may include a cash back offer of a percentage of the difference.

The offer selection module 2816 may select offers to send to user based at least in part on the offer data 2844, account data 2834, and/or user data 2840. For example, the user data 2840 may include location data received from one or more of the user devices associated with individual users. The offer selection module 2816 may select and send offers within a threshold distance of the corresponding user device. In other cases, the offer selection module 2816 may select offers to send to the users based on past buying history, user selected interests, etc.

The vault module 2818 may include a secure level or security to allow the offer processing system 2800 to receive the confidential transaction data 2836 from the third party payment processing systems and/or the third party point of sale systems.

The transaction processing module 2820 may be configured to identify a user associated with a transaction and/or and offer associated with the transaction. For instance, the user may be identified based the payment credentials associated with the transaction. The offer may be identified based on the merchant identifier or SKU data associated with the transaction.

The chain of title module 2822 may be configured to determine if an instance of an offer was shared with a user associated with a transaction and to determine each individual that shared the offer or the chain of individuals that shared the offer. In some cases, the chain of title module 2822 may also determine that the offer is still valid based on, for instance, an initiating node of the chain of title having a valid time stamp or hash code.

The ledger module 2824 may be configured to maintain the ledgers or accounts associated with each of the users of the offer processing system 2800. For example, the ledger module 2824 may be configured to debit and credit the ledger of each user as offers are redeemed on behalf of the user and as the user transferred currency to other institutions.

The notification module 2826 may be configured to provide notifications to the user devices. For example, the notification module 2826 may send offers that may be of interest to the users, information related to redeemed offers, completion of actions (e.g., currency transfers), etc.

The currency exchange module 2828 may be configured to determine a currency associated with an individual or entity that funds are being transferred to. For instance, the currency exchange module 2828 may convert currency associated with a user's ledger from a currency associated with the user (e.g., US Dollars) or an offer processing system currency into a currency associated with a third party prior to debiting the user's ledger for the withdrawal. In this manner, the offer processing system 2800 may improve conventional exchange systems by converting the currency prior to initiating a transfer, thereby saving processing resources associated with a monetary exchange.

The user dashboard module 2830 may allow the user to view offers, search offers, redeem offers, make purchases (e.g., travel inventory purchases), transfer currency, add payment credentials, view social sharing and redeeming of offers, among others.

Figure 29:
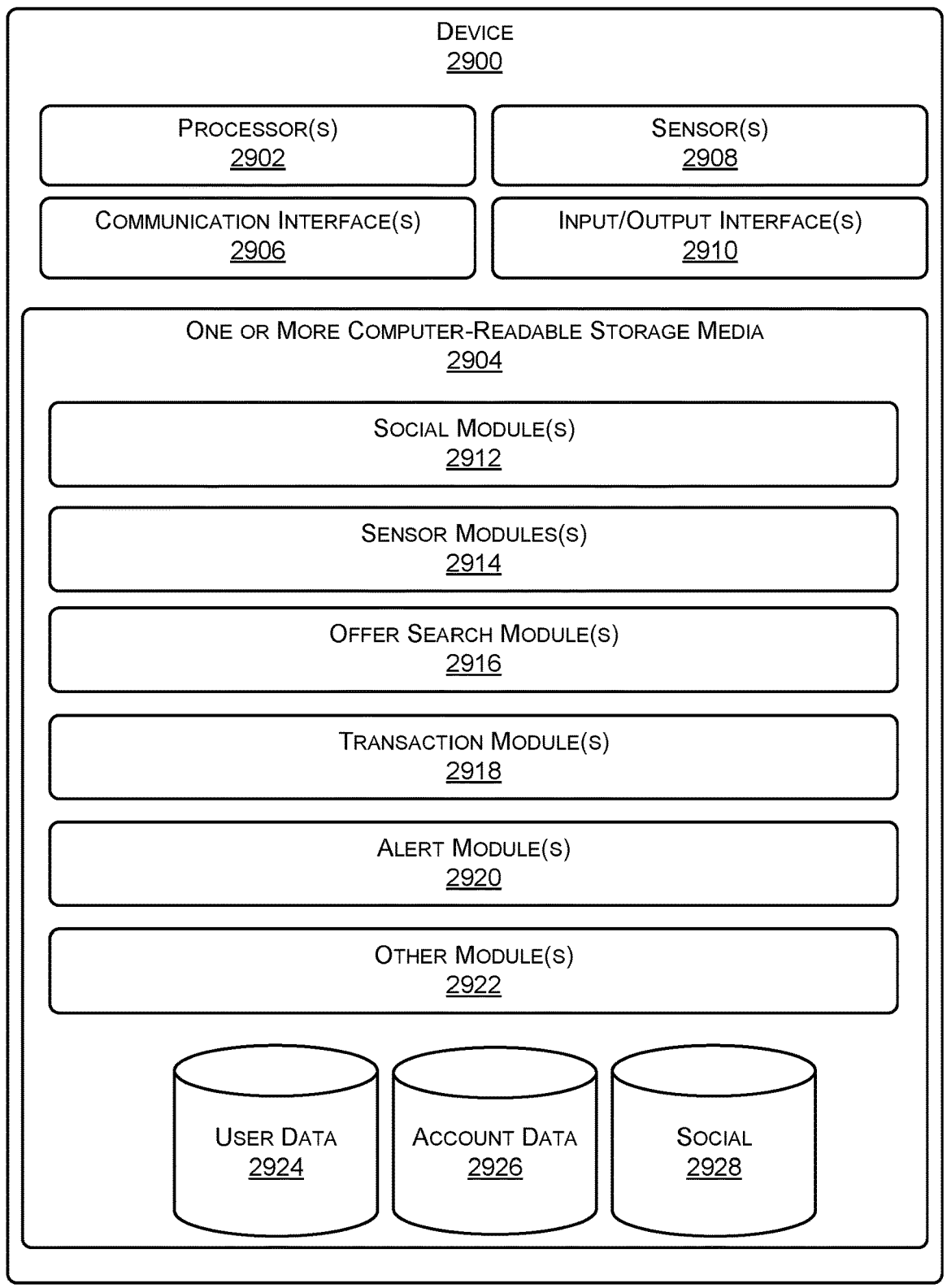
FIG. 29 illustrates example components of one or more user devices hosting a client side application associated with the offer processing system according to some implementations.

FIG. 29 illustrates example components of one or more user devices 2900 hosting a client side application associated with the offer processing system according to some implementations. The devices 2900 may host or implement an application or app that allows the user to interact with the offer processing system described herein. The device 2900 may include one or more processors 2902, and computer-readable storage media 2904 as well as commination interfaces 2906, sensors 2908, and input/output interfaces 2910.

The communication interfaces 2906 may support both wired and wireless connection to various networks, such as cellular networks, radio (e.g., radio-frequency identification (RFID)), WiFi networks, short-range or near-field networks (e.g., Bluetooth®), infrared signals, local area networks, wide area networks, the Internet, and so forth. For example, the communication interfaces 2906 may allow the device 2900 to receive notifications from the offer processing system.

The sensors 2908 may be used to monitor position and movement of the user device 2900. For example, the sensors may include motion sensors (e.g., gyroscopes and accelerometers) and/or position sensors (e.g., Global Position System (GPS) or other satellite receivers based location tracking systems). In some case, the sensors 2908 may include systems for tracking movement based on wireless signals, such as the nearest cellular tower or currently connected tower.

The input/output interfaces 2910 may include one or more output components, such as a display or touch screen, and one or more input components, such as keyboards, keypads, joysticks, a mouse, a touch screen, touch pad, drawing pad, or control buttons. In some implementations, the output components and input components are combined in a single interface to provide a touch-sensitive display, or touch screen display. For instance, in the illustrated example, the input/output interfaces 2910 include one or more displays for presenting information, such as electronic content items, to a user, one or more input sensors for accepting input resulting from contact and/or application of incident force, such as a user finger or stylus pressing upon one of the sensor.

The computer-readable storage media 2904 may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device.

Several modules such as instruction, data stores, and so forth may be stored within the computer-readable storage media 2904 and configured to execute on the processors 2902. For example, the computer-readable media 2904 may store a social module 2912 to allow users to share offers and view social activity (e.g., total redeemed value on shared offers). The computer-readable media 2904 may also store a sensor module 2914 to process the sensor data generated by the sensors 2908 and to send the data to the offer processing system via the communication interfaces 2906. In some cases, the computer-readable media 2904 may store an offer search module 2916 to allow the user to search for offers on particular items, merchants, venues, etc. The offer processing system 2900 may also store a transaction module 2918 to allow the user to purchase items, units, or inventory via the offer processing system (e.g., discounted travel inventory). The computer-readable media 2904 may also store an alert module 2920 to alert the user to notifications received from the offer processing system and to credit earned when the offer processing system redeems offers on the user's behalf. In addition to the offer processing modules, the computer-readable media 2904 may store other modules 2922. In some implementations, the computer-readable media 2904 may store data, such as user data 2924, account data 2936, and social data 2928.

Figure 30:
FIG. 30 is an illustrative example home interface of a client side application of the offer processing system according to some implementations.

FIG. 30 is an illustrative example home interface 3000 of a client side application of the offer processing system according to some implementations. In the current illustration, the application is presenting on a display of a user device, a currency balance 3002 or amount of the user's ledger or account. For instance, the balance 3002 may be accumulated by the offer processing system redeeming offers on the user's behalf and crediting the value or a portion of the value redeemed to the user.

The application is also presenting on a display of a user device, a total social currency balance 3004. In this example, the social currency balance 3004 may be a total value of redeemed offers that were associated with an instance of an offer shared by the user. Thus, if the user shared an instance of an offer with a second user and a third user and both the second and third user redeemed the offer, the value received by the second and third user may be added to the social currency balance 3004. The home interface 3000 may also display a list of notifications 3006 received from the offer processing system. In this example, the notifications 3006 include notices that friends or connections of the user earned value or currency based on offers with Merchant A and Merchant B. In this instance, the user may select the offers associated with Merchant A or Merchant B to learn more.

Figure 31:
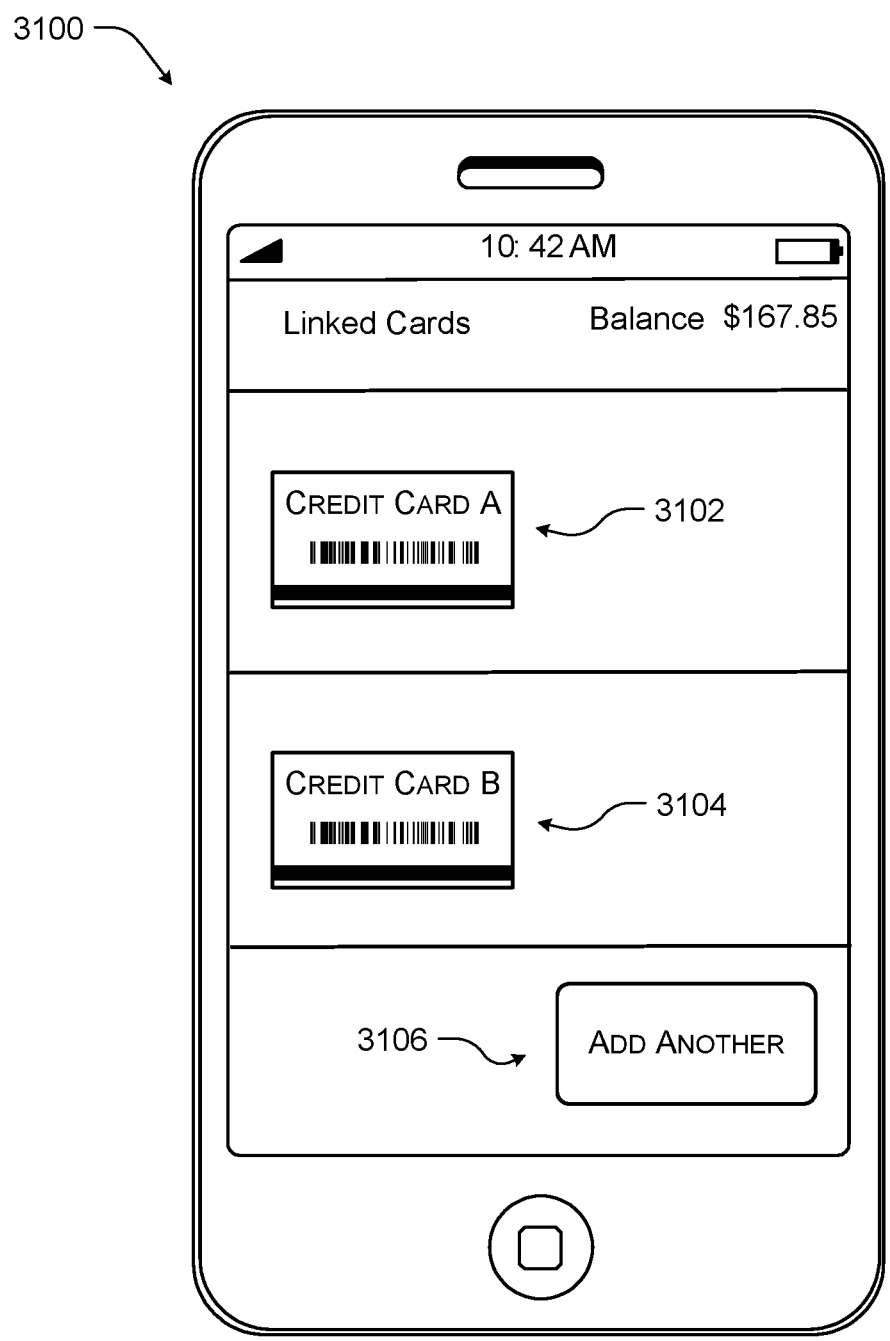
FIG. 31 is an illustrative example user interface for managing payment credentials of a client side application of the offer processing system according to some implementations.

FIG. 31 is an illustrative example user interface 3100 for managing payment credentials of a client side application of the offer processing system according to some implementations. In this example, the user has linked two payment credentials 3102 and 3104 (e.g., two credit cards) to the offer processing system. Thus, if the user purchases items using the payment credentials 3102 or 3104, the offer processing system may locate and redeem offers on the user's behalf. In the current example, the user is also able to add additional payment credentials using button 3106.

Figure 32:
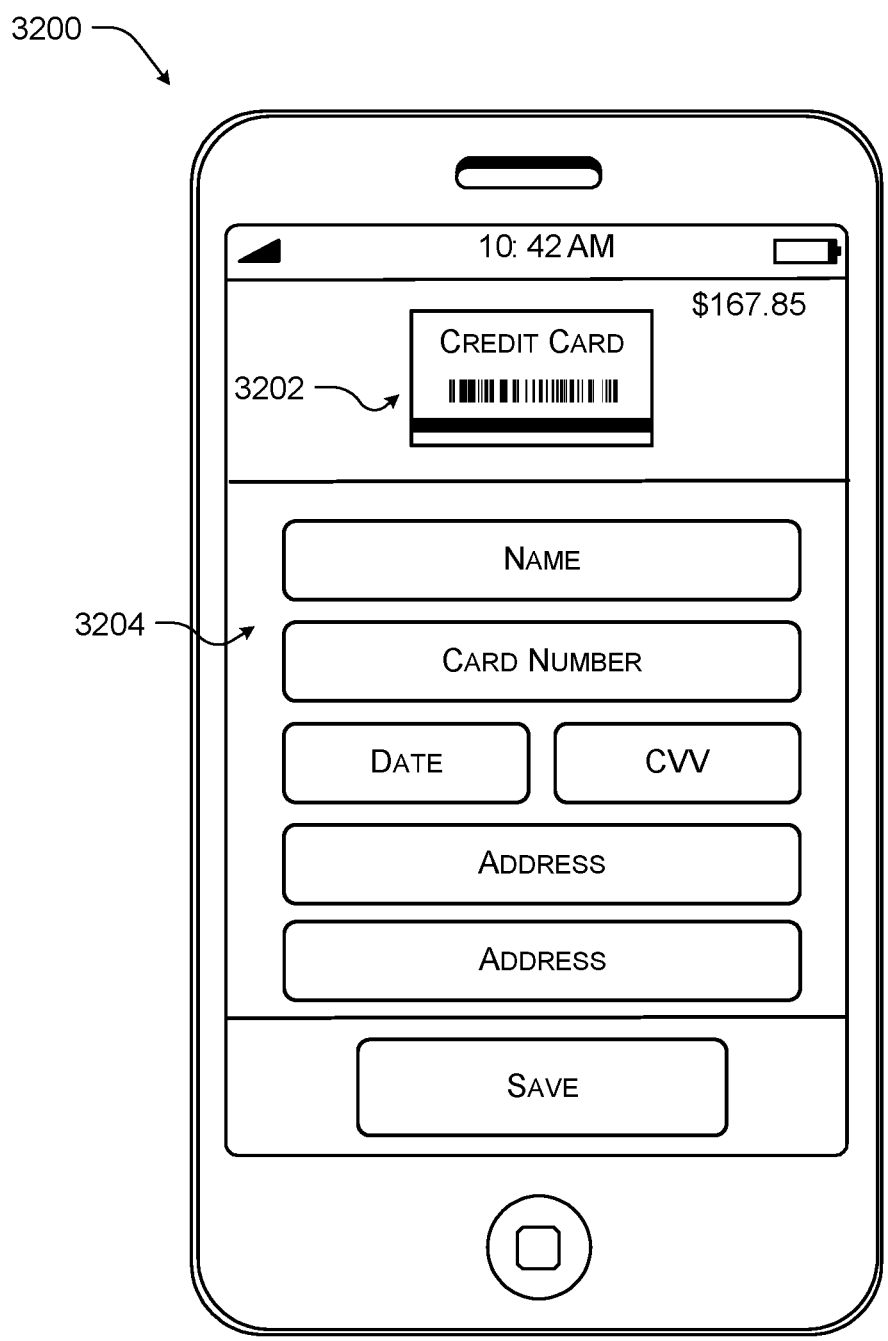
FIG. 32 is an illustrative example user interface for entering payment credentials into the offer processing system according to some implementations.

FIG. 32 is an illustrative example user interface 3200 for entering payment credentials into the offer processing system according to some implementations. For instance, in the illustrated example, the user may select a payment type 3202 or 3204 (e.g., a credit card, debit card, bank account, routing number, etc.). The user may also be able to enter information, such as billing information, associated with the payment credentials.

Figure 33:
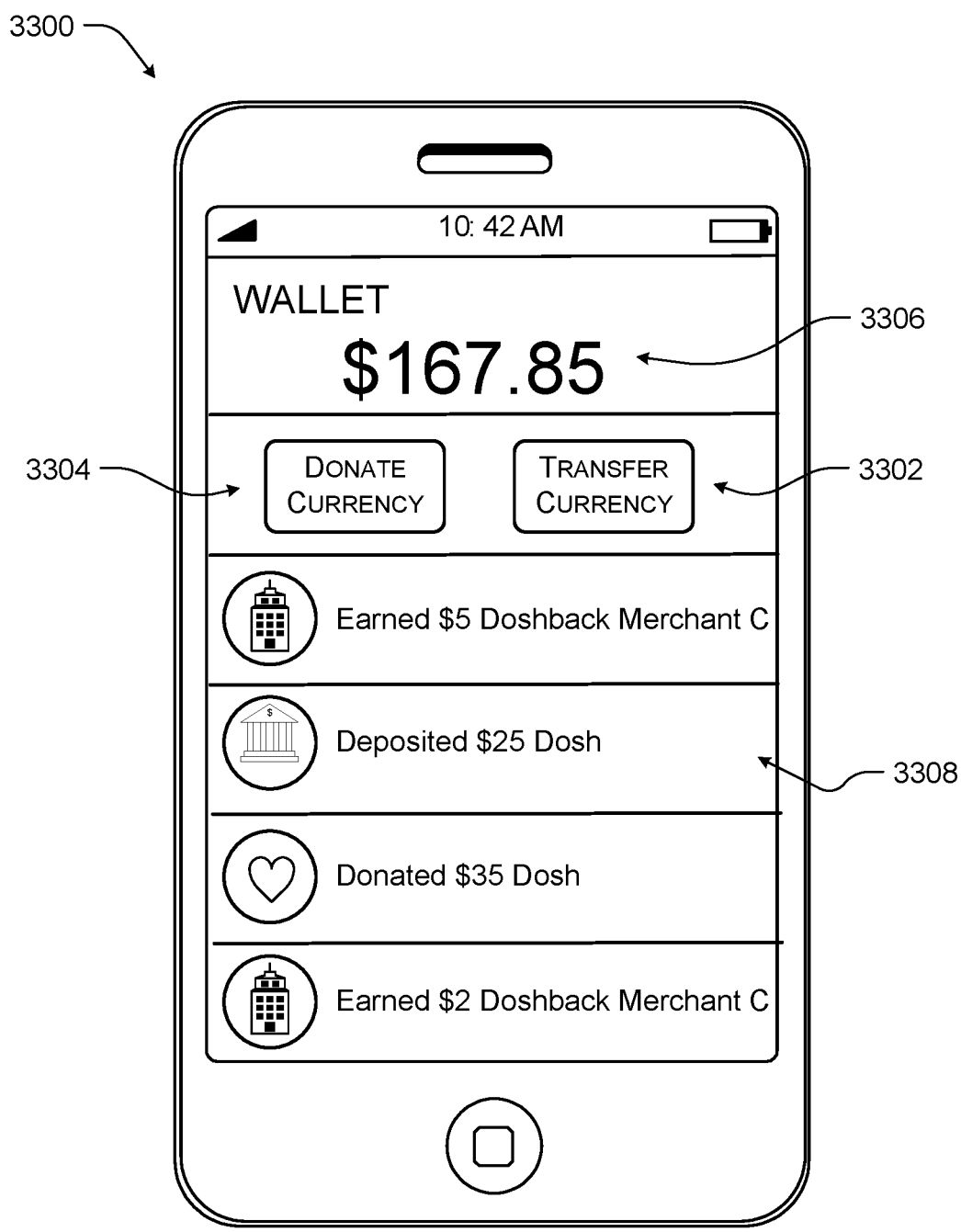
FIG. 33 is an illustrative example wallet interface of a client side application of an offer processing system according to some implementations.

FIG. 33 is an illustrative example wallet interface 3300 of a client side application of the offer processing system according to some implementations. In the illustrated example, the user may transfer currency 3302 or donate currency 3304 to various organizations, individuals, or entities. For example, the user may transfer a portion of the balance 3306 of the user's wallet or ledger to other individuals or entities. In some cases, such as the current example, the application may also cause the display to present a list, generally indicated by 3308, of previous or current transactions performed using the application.

Figure 34:
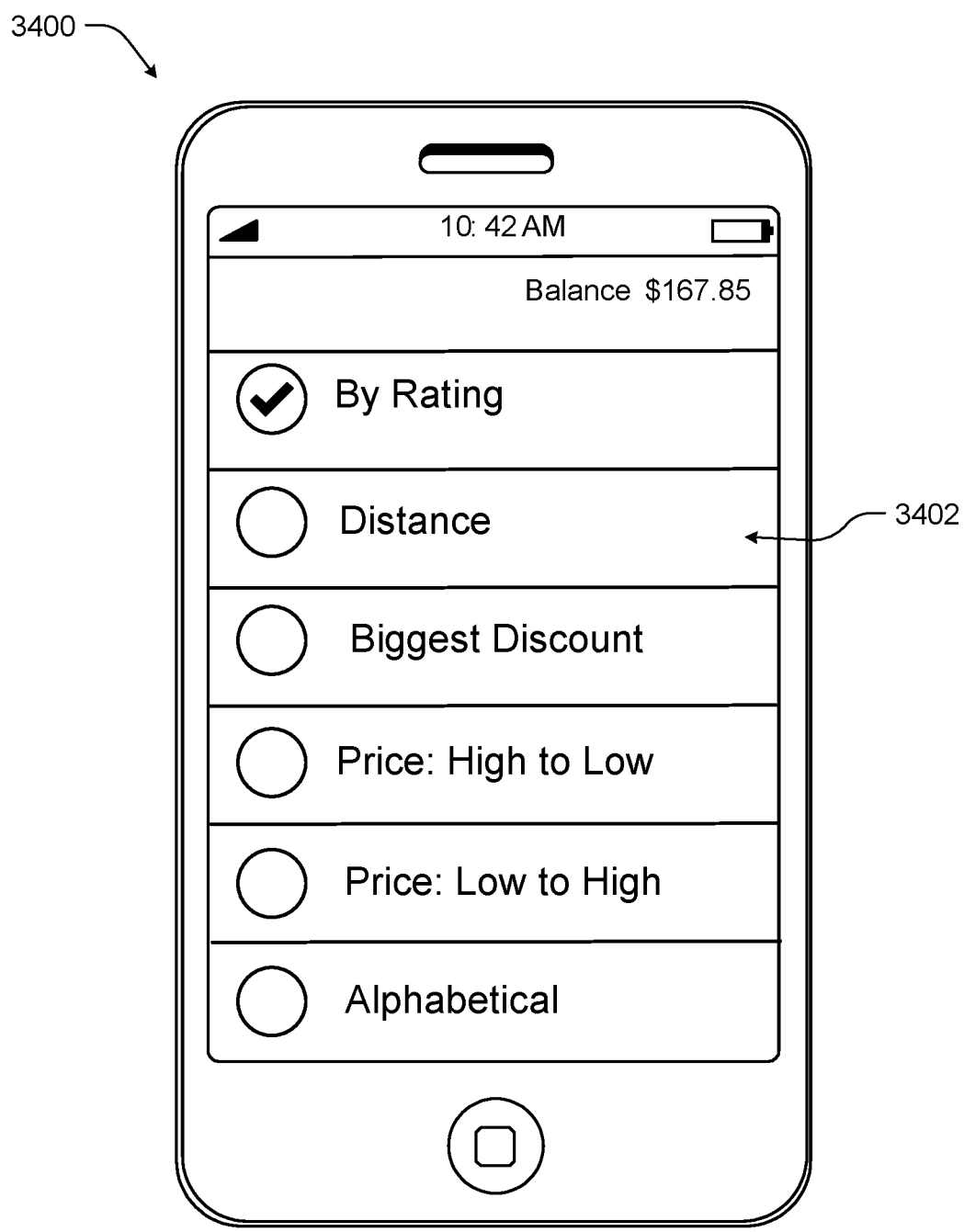
FIG. 34 is an illustrative example offer search interface of a client side application of an offer processing system according to some implementations.

FIG. 34 is an illustrative example offer search interface 3400 of a client side application of the offer processing system according to some implementations. In the current example, the user may be utilizing the application to search for available offers. In some cases, the offers returned by the offer processing system may be sorted based on various conditions 3402. For instance, the offers may be sorted based on user ratings or system ratings, distance from the user's location, biggest discount or most currency back, price either high to low or low to high, alphabetical or others.

Figure 35:
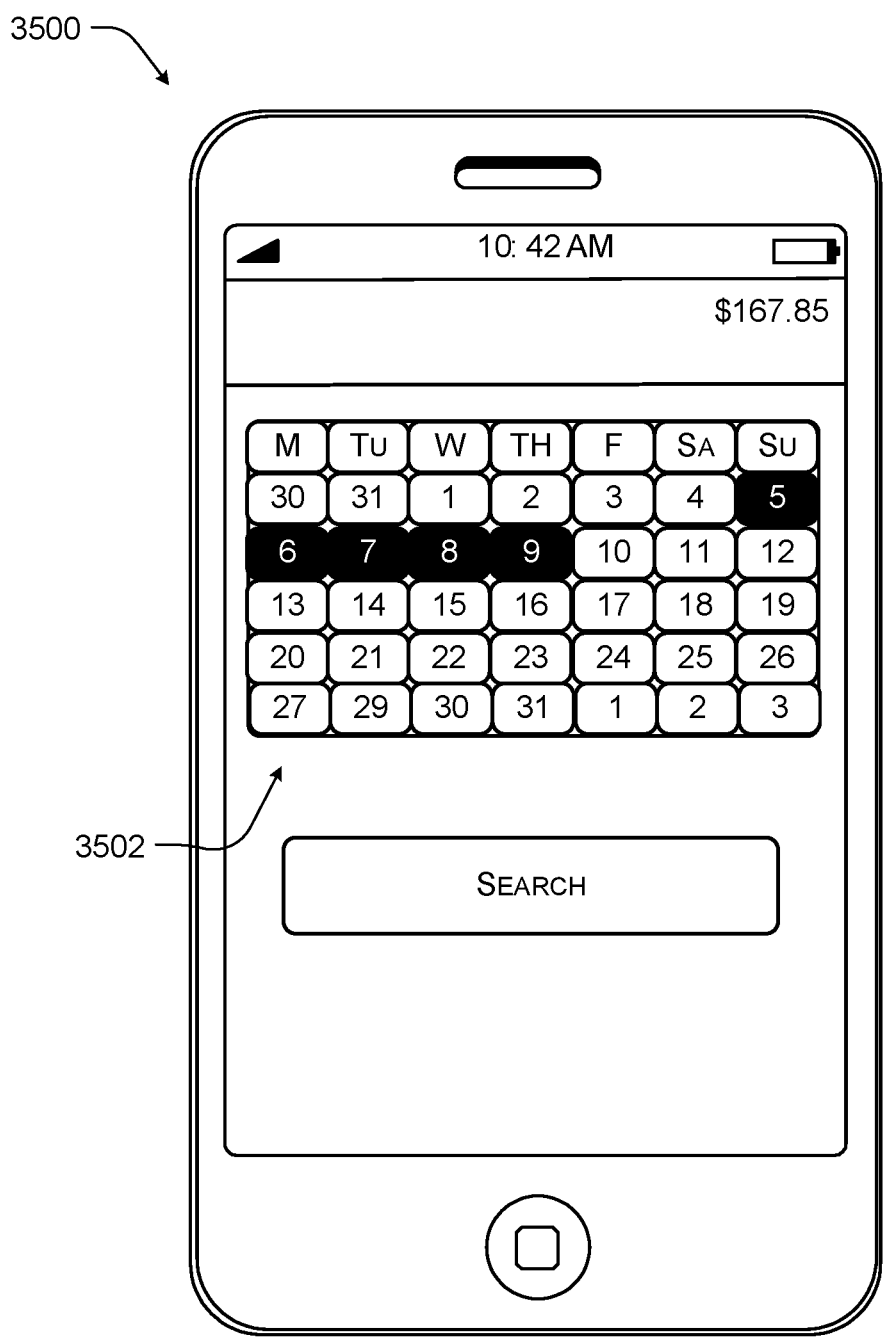
FIG. 35 is an illustrative example offer search interface of a client side application of an offer processing system according to some implementations.

FIG. 35 is an illustrative example offer search interface 3500 of a client side application of the offer processing system according to some implementations. In the current example, the user may be able to search for offers based on time or date. For instance, the user may select days from a calendar 3502 for which the user desires to view offers. For instance, in the case of travel inventory the user may desire to view, discounted or wholesale travel offers within a time period associated with the user's trip. In some cases, the calendar 3502 may be utilized as a booking tool such as for hotel rooms for a period of time.

Figure 36:
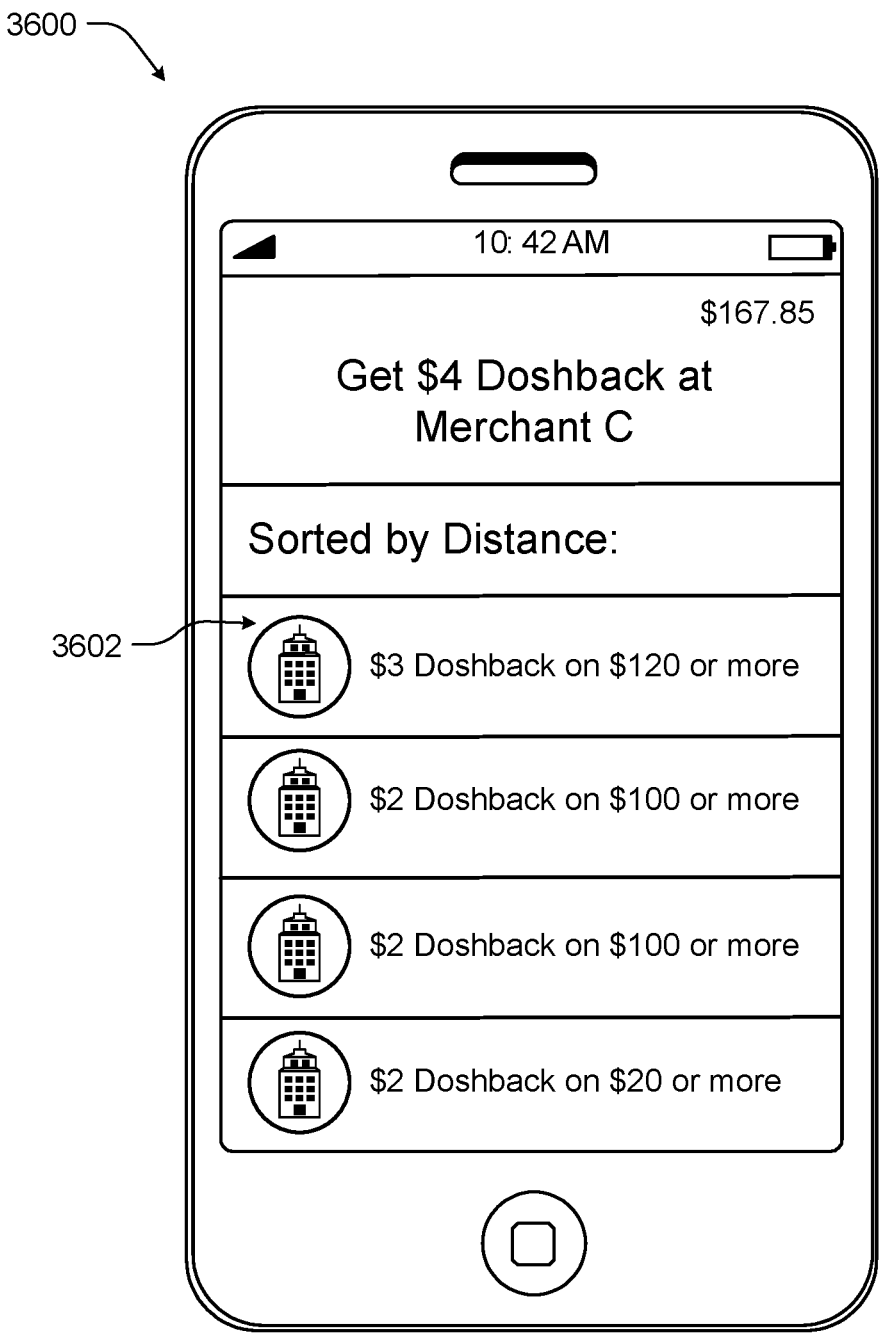
FIG. 36 is an illustrative example offer search interface of a client side application of an offer processing system according to some implementations.

FIG. 36 is an illustrative example offer search interface 3600 of a client side application of the offer processing system according to some implementations. In the current example, the user may have performed a search based on a distance from a current location of the user or the user device. Once the user requests the search results, the client side application may cause the user device to display the results in a list 3602 based on distance from the user device.

Figure 37:
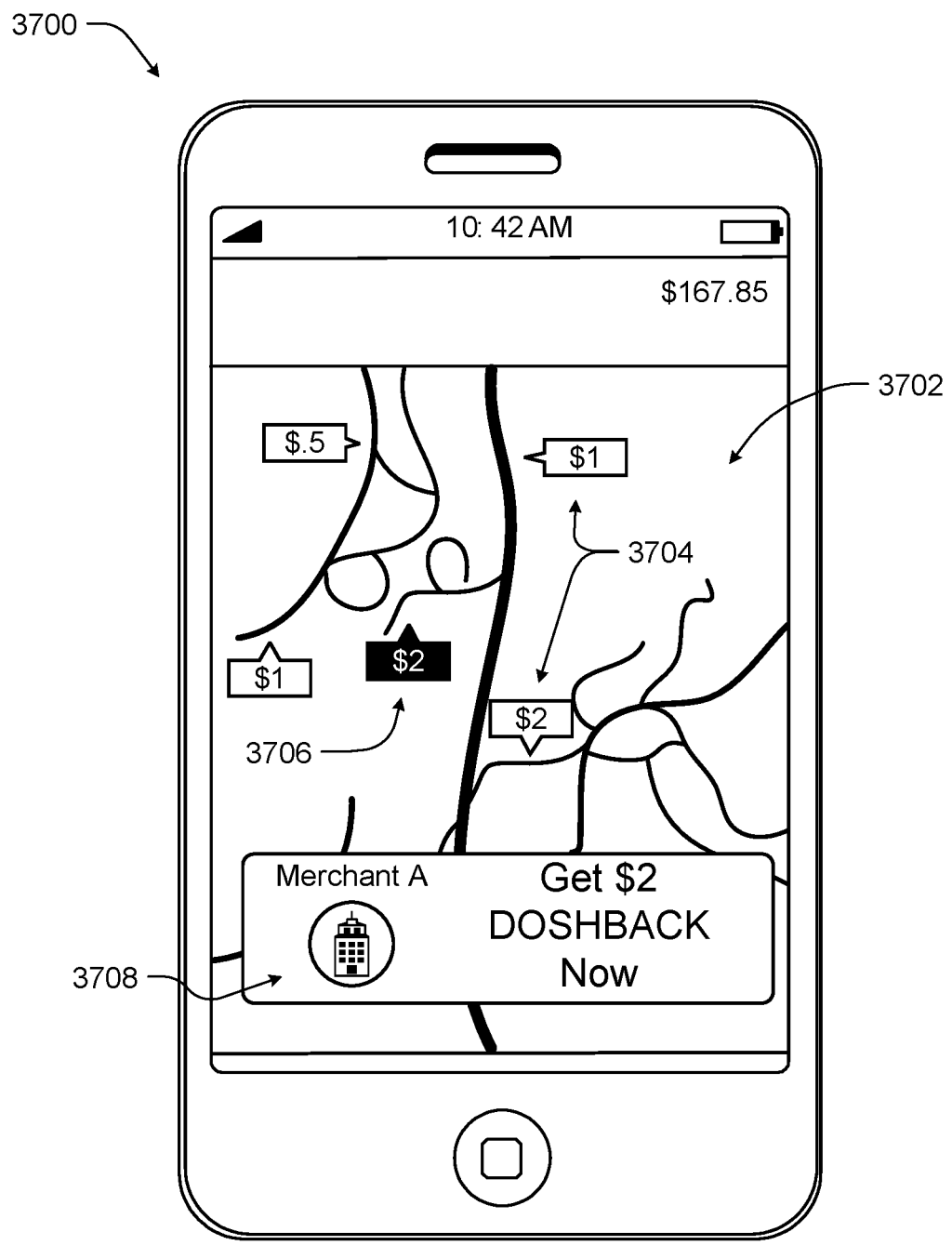
FIG. 37 is an illustrative example offer search interface of a client side application of an offer processing system according to some implementations.

FIG. 37 is an illustrative example offer search interface 3700 of a client side application of the offer processing system according to some implementations. In the current example, the user may have performed a search based on a distance from a current location of the user or the user device. In this case, the client side application may cause the user device to display the results in a map 3702. In some cases, the position of the map 3702 may be based on a known location of the user or the user device. In some cases, the offer presented, such as offers 3704, may be within a threshold range of the user. In some cases, the range may be changed by the user by zooming in and out of the map 3702.

In the illustrated example, a selected offer 3706 may be presented in more detail within an offer window 3708. Thus, if the user selects another offer 3704 on the map 3702, the offer window 3708 may present details associated with the newly selected offer.

Figure 38:
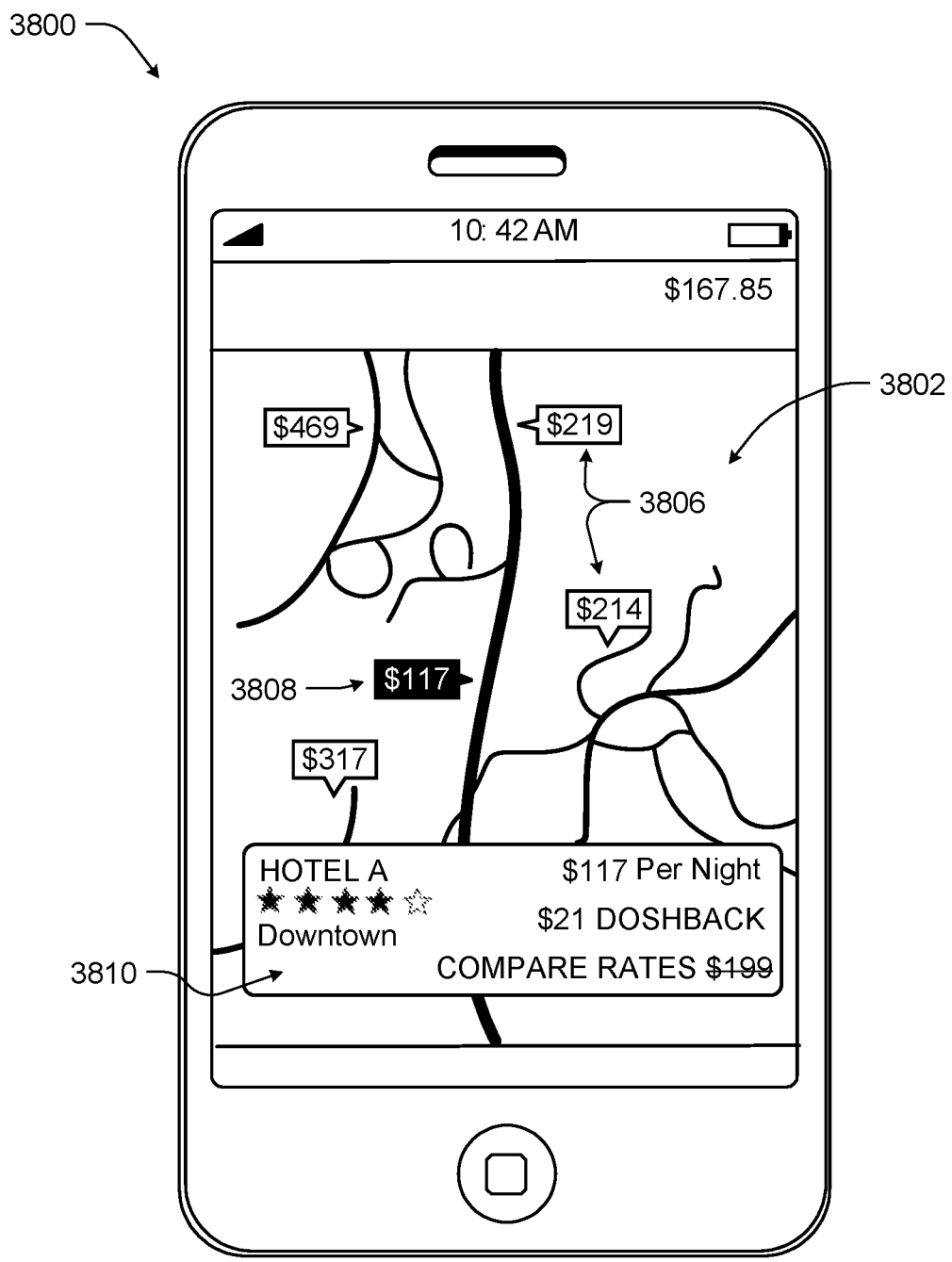
FIG. 38 is an illustrative example offer search interface of a client side application of an offer processing system according to some implementations.

FIG. 38 is an illustrative example offer search interface 3800 of a client side application of the offer processing system according to some implementations. In the current example, the user may have performed a search based on a distance from a desired location of the user or the user device. For instance, the user may desire to search for hotel rooms in or around a desired location of the user's trip. In this case, the client side application may cause the user device to display the results in a map 3802. In some cases, the position of the map 3802 may be based on a location selected by the user. In some cases, the offer presented, such as offers 3804, may be within a threshold range of the location selected by the user. In some cases, the range may be changed by the user by zooming in and out of the map 3802.

In the illustrated example, a selected offer 3808 may be presented in more detail within an offer window 3810. Thus, if the user selects another offer 3806 on the map 3802, the offer window 3810 may present details associated with the newly selected offer.

Figure 39:
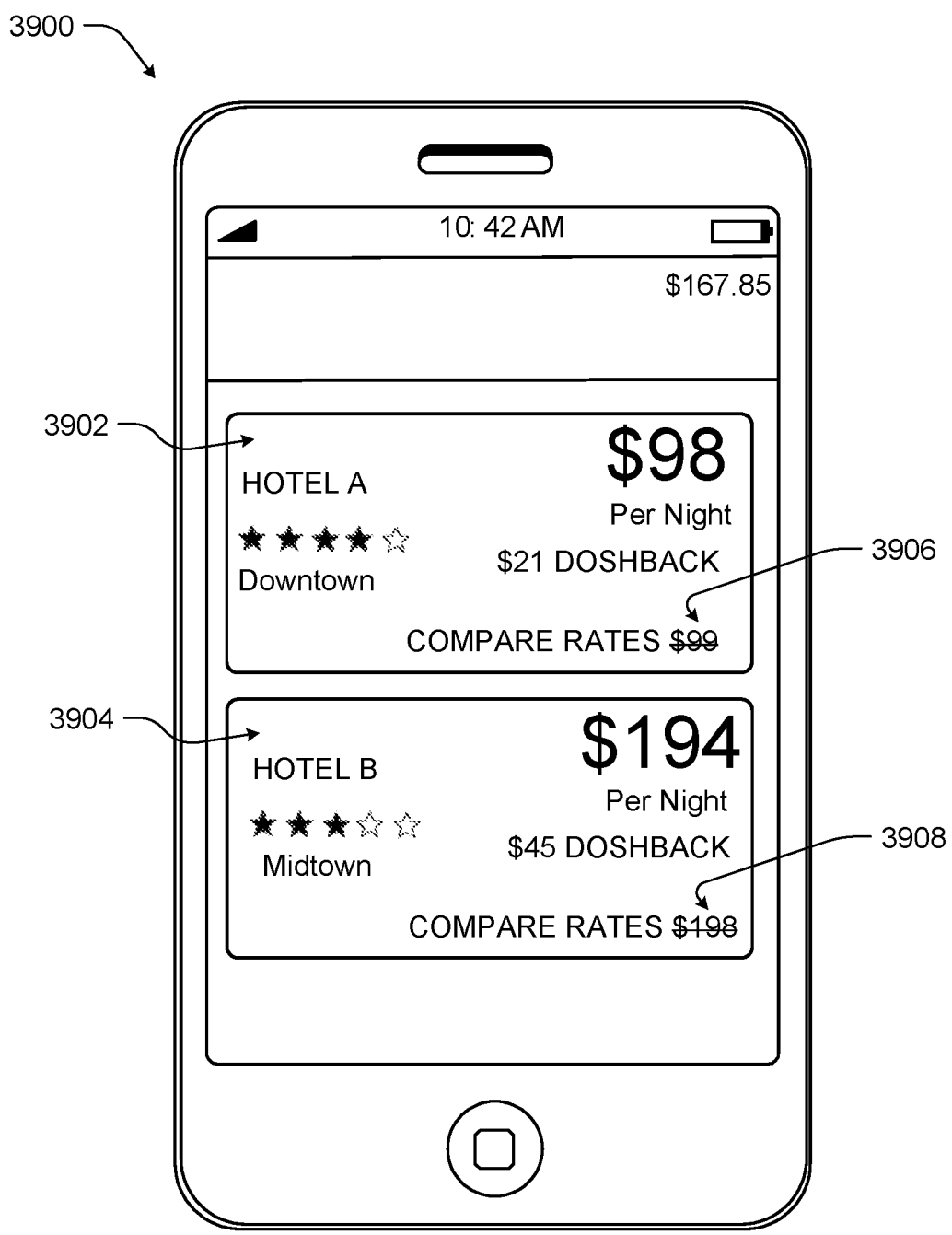
FIG. 39 is an illustrative example travel inventory offer interface of a client side application of an offer processing system according to some implementations.

FIG. 39 is an illustrative example travel inventory offer interface 3900 of a client side application of the offer processing system according to some implementations. In the current example, the user may be viewing available travel inventory offers, such as travel inventory offer 3902 and 3904. In this example, the offers may be generated by the offer processing system and based on a difference or percentage of a difference between the competitive pricing of the travel inventory, generally indicated by 3906 and 3908, and a price the travel inventory is purchased at or purchasable for based on a wholesale price.

Figure 40:
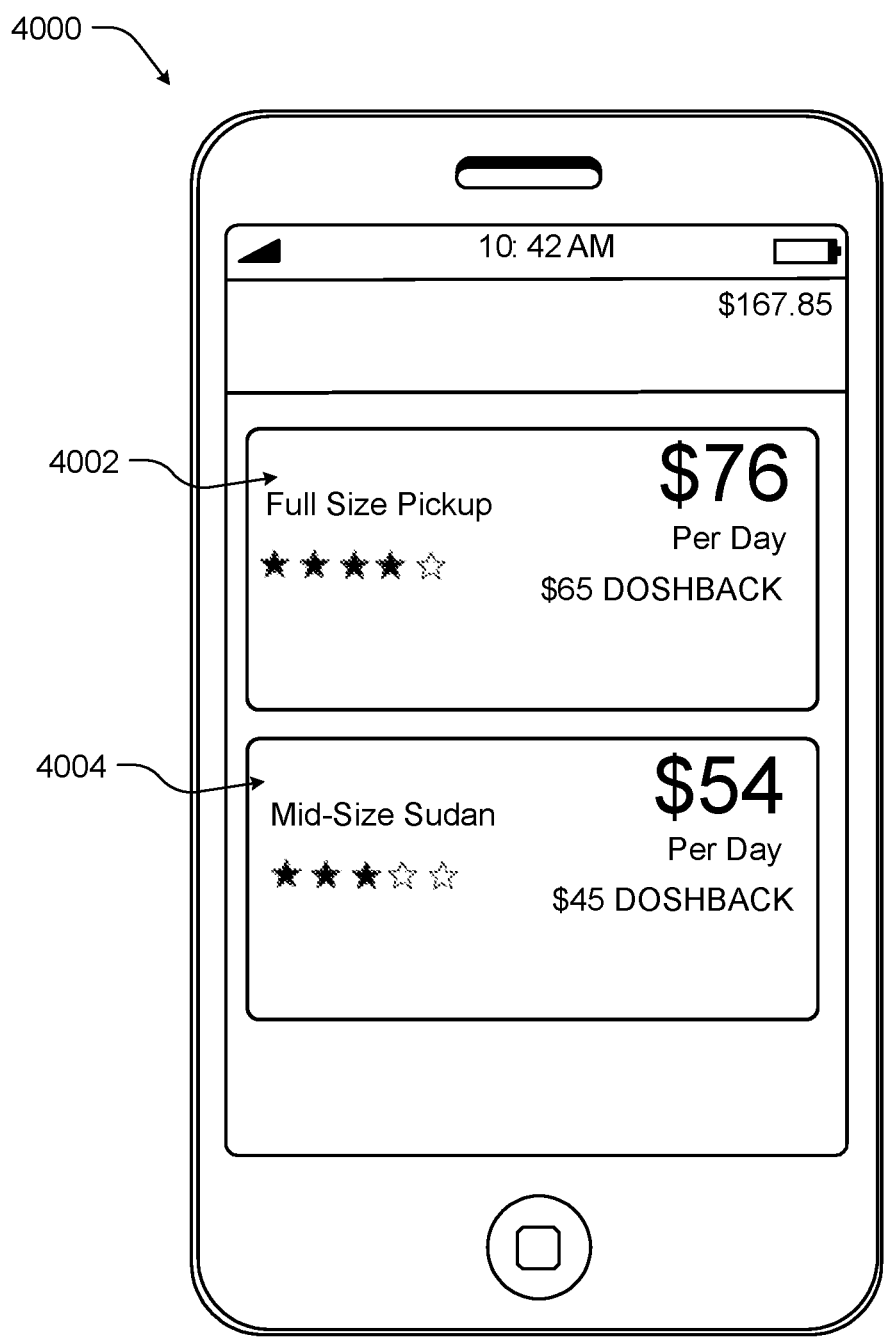
FIG. 40 is an illustrative example travel inventory offer interface of a client side application of an offer processing system according to some implementations.

FIG. 40 is an illustrative example travel inventory offer interface 4000 of a client side application of the offer processing system according to some implementations. In the current example, the user may be viewing available travel inventory offers, such as travel inventory offer 4002 and 4004. In this example, the user may be renting a vehicle and that the offer processing system has access to vehicle rentals at a discounted or wholesale price. Thus, the offer processing system may generate offers based on a difference between competitive pricing and the discounted or wholesale price.

Figure 41:
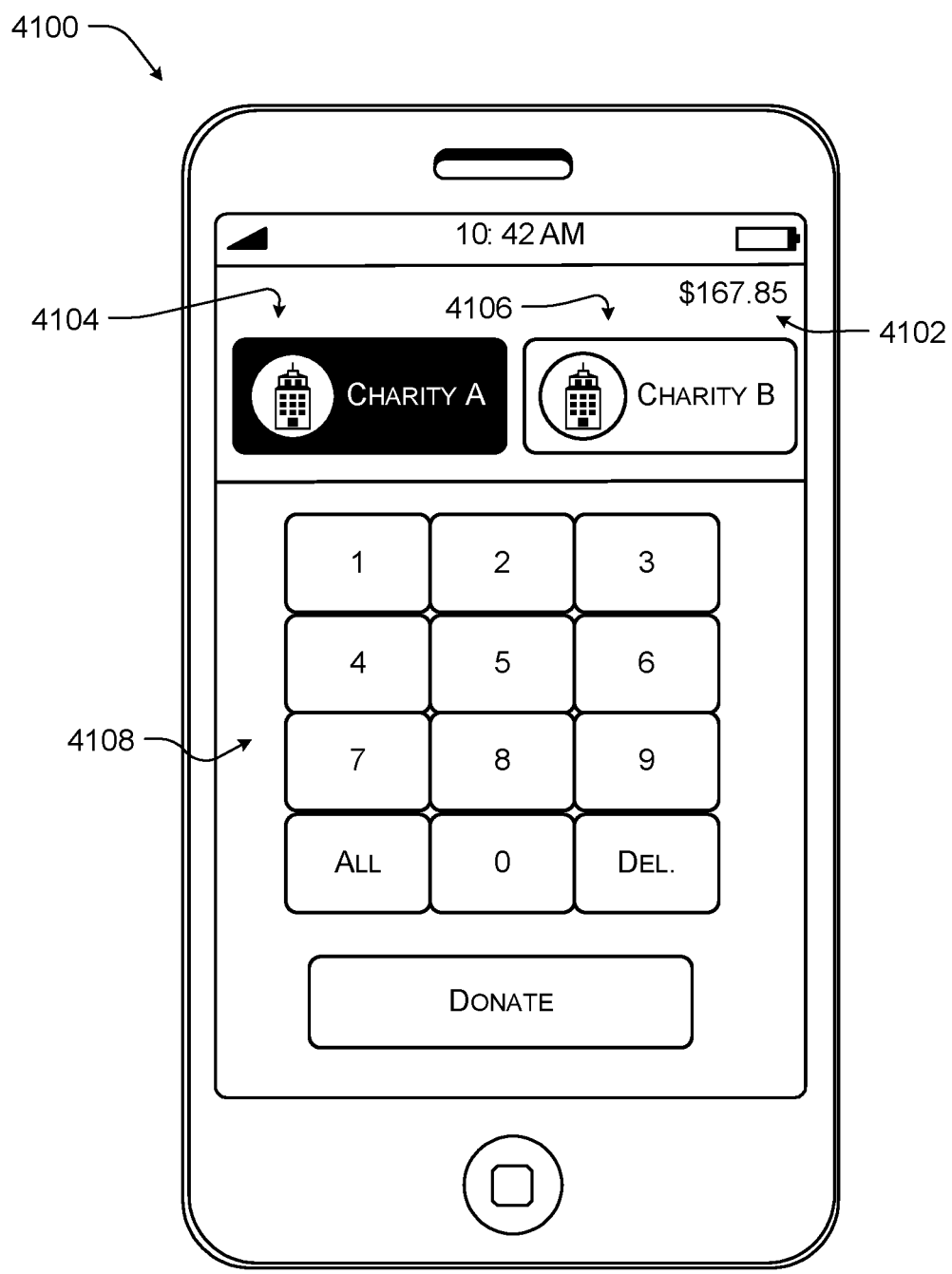
FIG. 41 is an illustrative example donation interface of a client side application of an offer processing system according to some implementations.

FIG. 41 is an illustrative example donation interface 4100 of a client side application of the offer processing system according to some implementations. in this example, the user may decide to donate a portion of the user's balance 4102. In this example, the user may select between charities, such as charity 4104 and 4106. The user may also select or enter an amount of the balance 4102 to donate using a user input area 4108.

Figure 42:
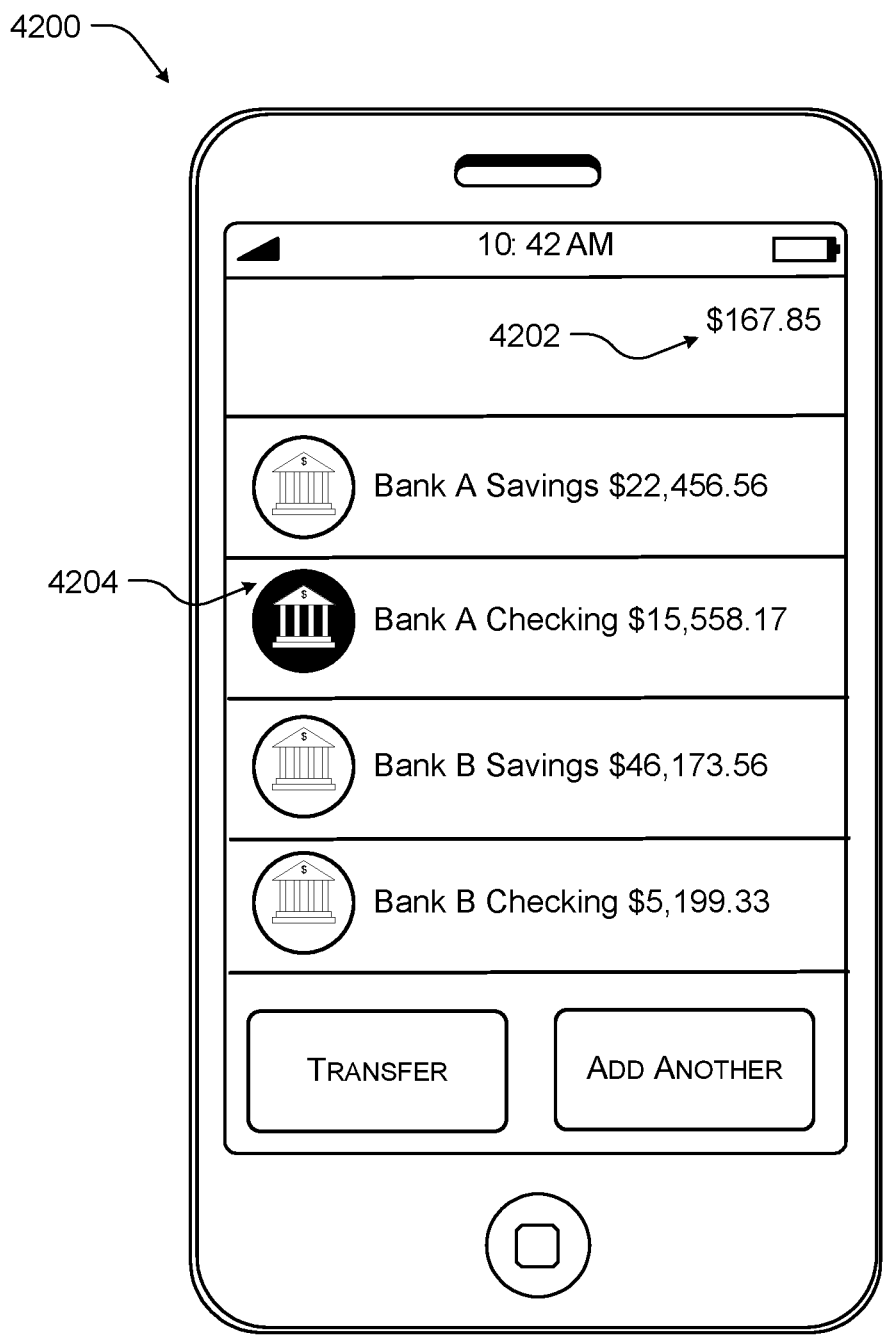
FIG. 42 is an illustrative example user interface of a client side application of an offer processing system for transferring currency to other entities according to some implementations.

FIG. 42 is an illustrative example user interface 4200 of a client side application of the offer processing system for transferring currency to other entities according to some implementations. In the current example, the user may select entities and cause or allow the offer processing system to transfer a portion of the value of the balance 4202 between selected entities. In this example, the user may select from a list 4204 of entities to pay bills and transfer currency. In some cases, the user may be able to transfer funds stored with the entity into the offer processing system.

Figure 43:
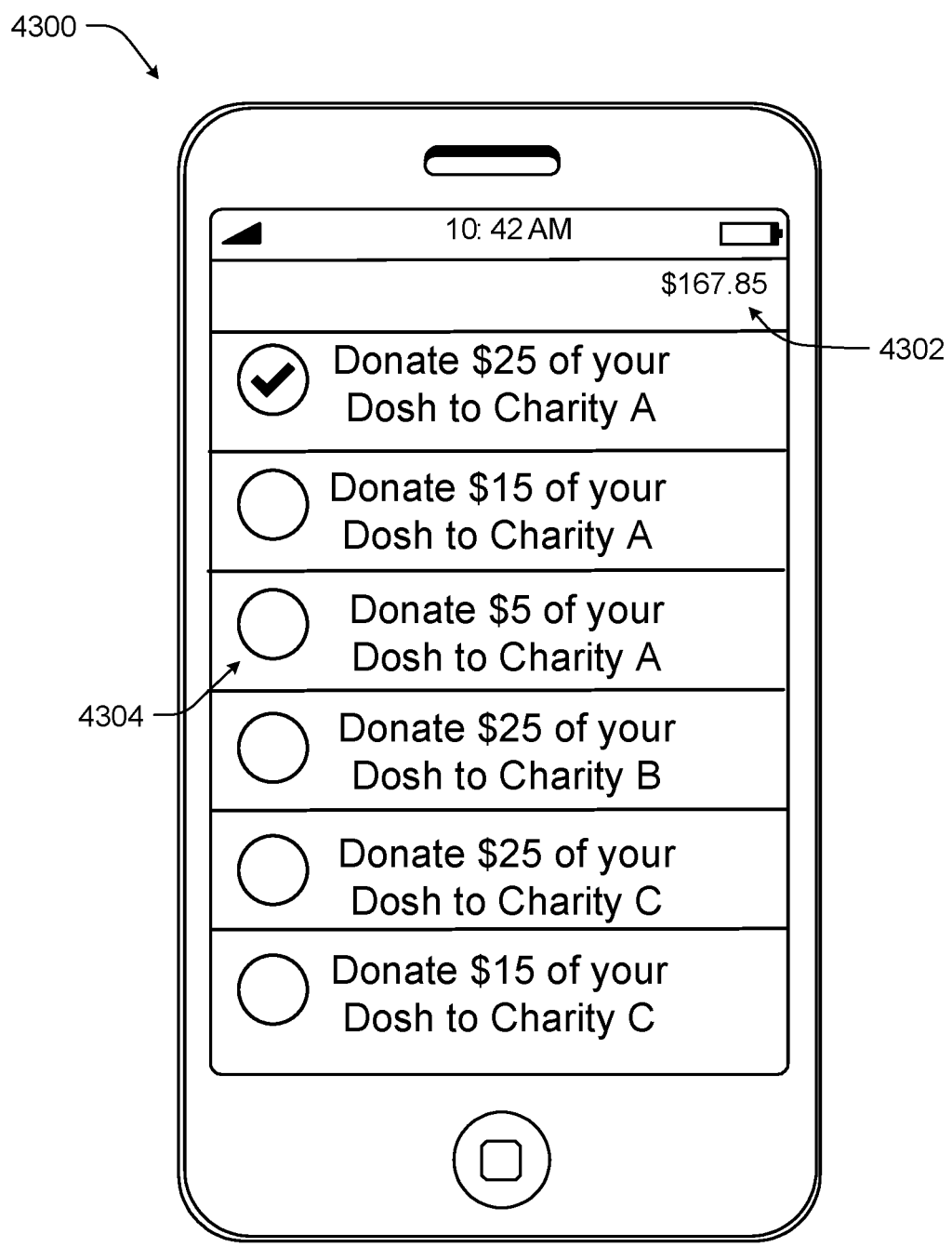
FIG. 43 is an illustrative example donation interface of a client side application of an offer processing system according to some implementations.

FIG. 43 is an illustrative example donation interface 4300 of a client side application of the offer processing system according to some implementations. For instance, after an offer has been redeemed by the offer processing system, the offer processing system may present to the user an option to donate a portion of the redeemed value or a portion of the user's balance 4302. In this example, the offer processing system may provide a list 4304 including various selectable options to donate. For instance, in the current example, the user has selected to donate $25 to Charity A.

Figure 44:
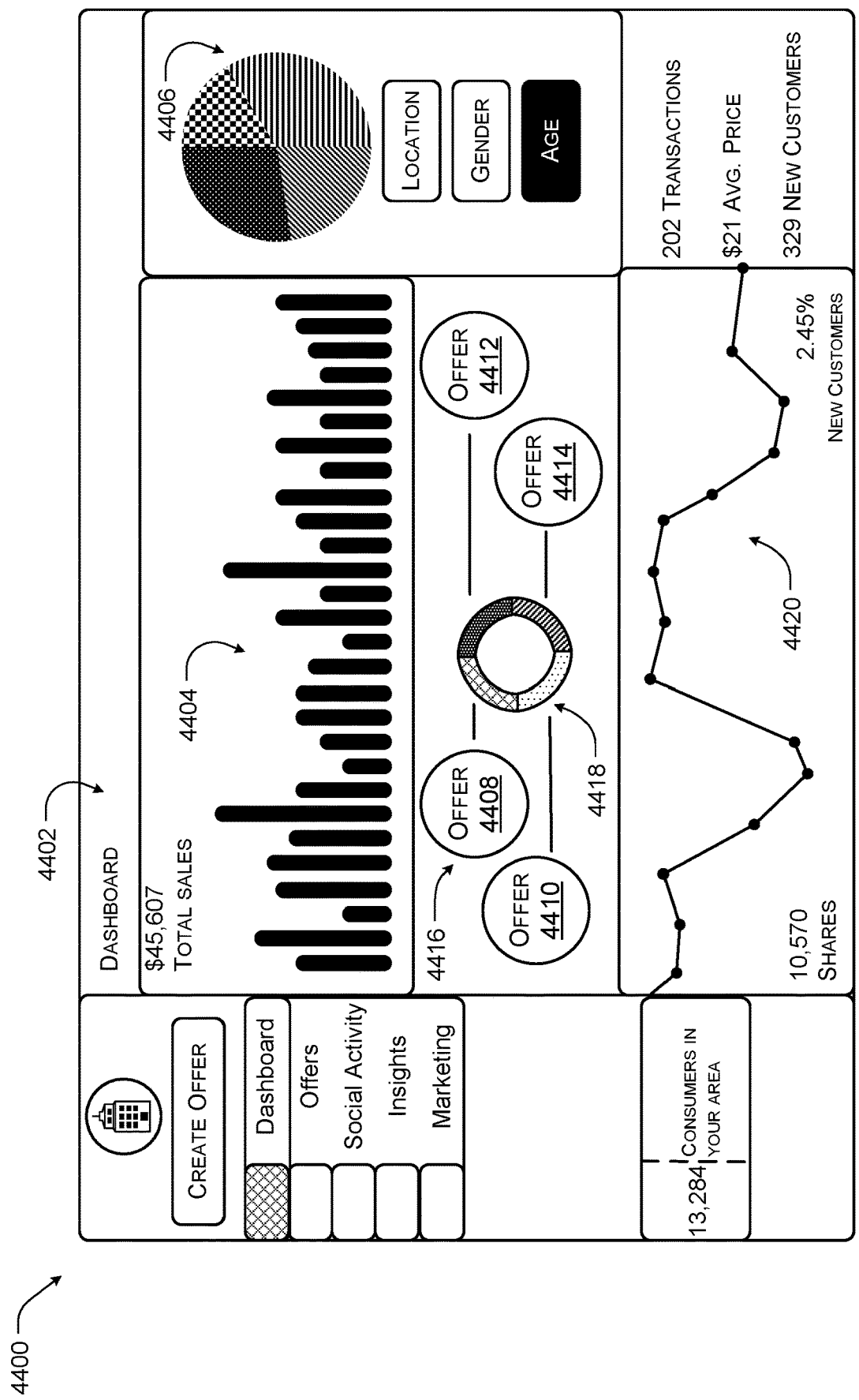
FIG. 44 is an illustrative example merchant interface associated with an offer processing system according to some implementations.

FIG. 44 is an illustrative example merchant interface 4400 associated with an offer processing system according to some implementations. In the illustrated example, the merchant, distributor, marketplace, or other entity may be viewing a dashboard 4402. In this case, the merchant may be able to view the total sales activity, for instance, over time in a sales activity window 4404. The merchant may be able to view the total sales activity based on demographic information, such as location, gender, and age, among others, in a demographic window 4406.

In some cases, the dashboard 4402 may present data related to the top performing offers, such as offers 4408, 4410, 4412, and 4414, in an offer performance window 4416. In the illustrated example, the offer data may be presented as both a graph 4418 as well as in a more detailed offer via a per offer view, such as offer views 4408, 4410, 4412, and 4414.

The merchant may be able to view social data in a social window 4420. For instance, in the illustrated example, the social data is presented as a graph of shares over time per offer. The offer processing system may also present to the merchant via the dashboard 4402 data related to a number of transaction during a period of time, number or percentage of new customers during the period of time, average purchase price of a transaction during the period of time, and the number of users on the offer processing system that may be customers of the merchant.

Figure 45:
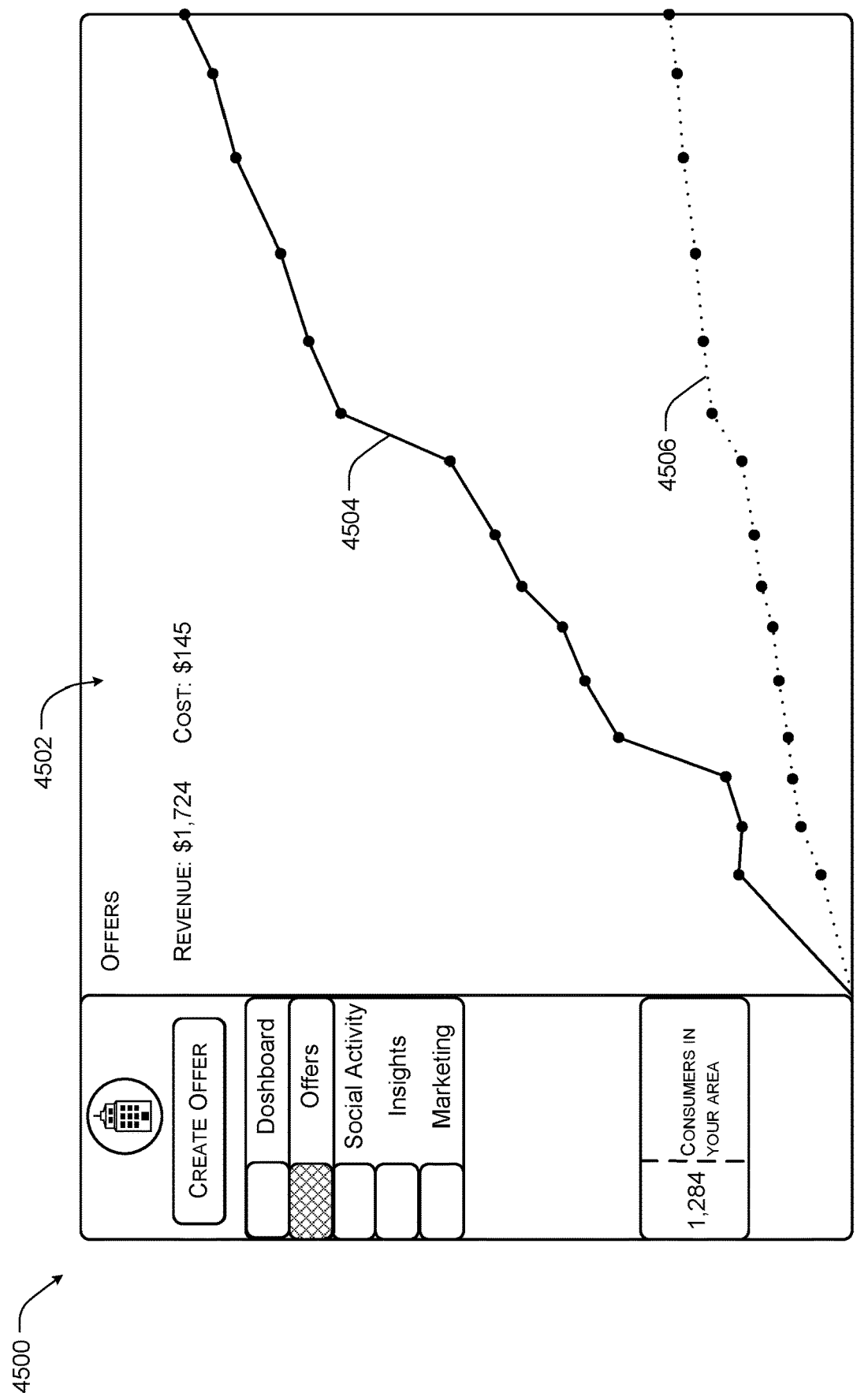
FIG. 45 is another illustrative example merchant interface associated with an offer processing system according to some implementations.

FIG. 45 is another illustrative example merchant interface 4500 associated with an offer processing system according to some implementations. In the current example, the merchant may be viewing an offer detail view 4502. In this example, the offer processing system may present to the user analytics associated with revenue generated from an offer, generally indicated by 4504, in comparison with costs associated with the offer, generally indicated by 4506. For instance, the offer processing system may present revenue as the amount of currency earned by the merchant from offer processing system users against the costs or the amount of value redeemed by the offer processing system on behalf of the users of the offer processing system.

Figure 46:
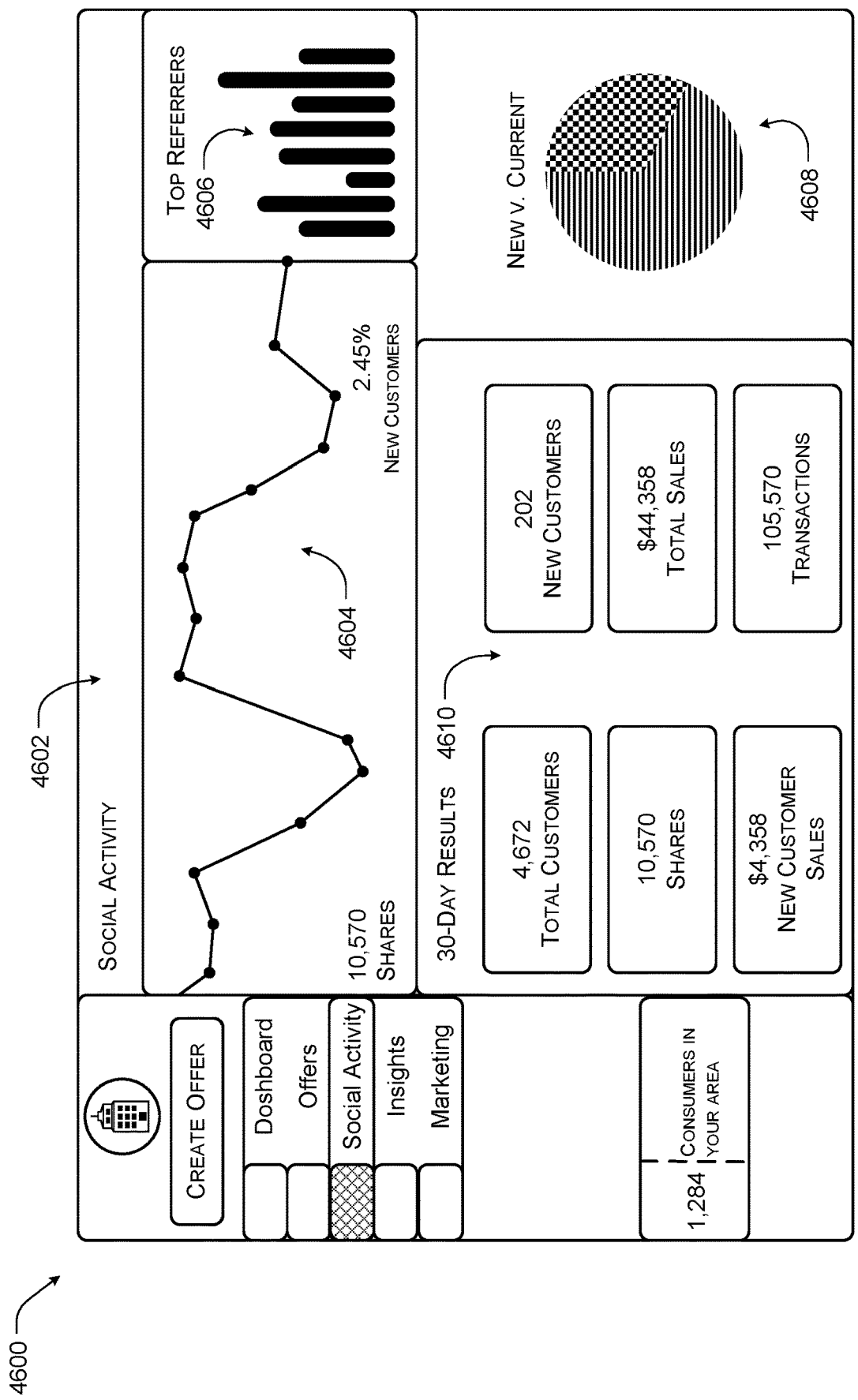
FIG. 46 is yet another illustrative example merchant interface associated with an offer processing system according to some implementations.

FIG. 46 is yet another illustrative example merchant interface 4600 associated with an offer processing system according to some implementations. For instance, the offer processing system may provide the merchant with analytics associated with the social sharing or amount of social activity associated with an offer via a social activity view 4602. In these instances, the offer processing system may present data related to a total amount of shares per offer over a period of time in a social activity window 4604. The social activity view 4602 may also include a top referrer or top sharer window 4606 to highlight the individual users that share the offers of the merchant to the greatest extent. In some cases, the social activity view 4602 may also include a new user and return user window 4608 to illustrate to the merchant how many return customers redeemed offers compared with the number of new customers that redeemed offers. In one particular example, the social activity view 4602 may include a results window 4610 to present to the merchant the results of the merchant's offers over a predefined period of time, such as 30 days.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A system comprising:
one or more communication interfaces;
one or more processors; and
computer readable storage media storing computer-executable instructions external to a third-party point of sale system and a third-party payment processing system, which when executed by the one or more processors cause the one or more processors to:
identify and catalog offers from external sources;
during a pendency of a purchase transaction after a payment credential has been entered at a third-party point of sale device but prior to an approval of the purchase transaction by the third-party processing system:
receive from the third-party payment processing system, via the one or more communication interfaces and a vault system, third-party payment processing transaction data, in tokenized form, for the purchase transaction associated with stored payment credentials;
determine that the received third-party payment processing transaction data associated with the stored payment credentials meets or exceeds a criteria of for an offer of the catalogued offers;
determine that the offer was not previously redeemed at the third-party point of sale system;
redeem, via the one or more communication interfaces and without user input, the offer with a coupon settlement system;

convert a currency value in a currency associated with the offer into an amount of a jurisdiction free internal currency of the coupon settlement system based on a current exchange rate between the jurisdiction free internal currency and the currency associated with the offer;

credit the amount of the jurisdiction free internal currency to a ledger of an account associated with the stored payment credentials;

convert a portion of the jurisdiction free internal currency into a points value in a points system;

generate updated payment transaction data reflecting the currency value in the currency associated with the offer; and send via the one or more communication interfaces and the vault system, the updated payment transaction data to the third-party payment processing system.

2. The system as recited in claim 1, wherein the computer-readable storage media stores additional computer-executable instructions, which when executed by the one or more processors cause the one or more processors to:

receive a request from a user device associated with the account to transfer a portion of the jurisdiction free internal currency credited to the ledger to a third party system;

determine a second currency associated with the third party system; and convert the portion of jurisdiction free internal currency credited to the ledger into a second amount of the second currency based on a current exchange rate between the jurisdiction free internal currency and the second currency.

3. The system as recited in claim 2, wherein the currency and the second currency are a same currency.

4. The system as recited in claim 2, wherein the third party system is at least one of:
a merchant system;
a financial system;
a charity system; or
a marketplace system.

5. The system as recited in claim 1, wherein the computer-readable storage media stores additional computer-executable instructions, which when executed by the one or more processors cause the one or more processors to:

receive a request from a user device associated with the account to access the ledger;

determine a second currency associated with a location of the user device;

convert a second value of the ledger into the second currency based on a current exchange rate between the jurisdiction free internal currency and the second currency; and send data representative of the second value in the second currency to the user device.

6. The system as recited in claim 5, wherein the computer-readable storage media stores additional computer-executable instructions, which when executed by the one or more processors cause the one or more processors to:

receive a second request from a second user device associated with the account to access the ledger;

determine a third currency associated with a location of the second user device;

convert a third value of the ledger into the third currency based on a current exchange rate between the jurisdiction free internal currency and the third currency; and send data representative of the third value in the third currency to the second user device.

7. The system as recited in claim 1, wherein the computer-readable storage media stores additional computer-executable instructions, which when executed by the one or more processors cause the one or more processors to:

receive a request from a user device associated with the account to access the ledger; and send data representative of the currency value in the jurisdiction free internal currency to the user device.

8. A method comprising:
external to a third-party point of sale system and a third-party payment processing system:
identifying and collecting offers from external sources;
during a pendency of a purchase transaction after a payment credential has been entered at a third-party point of sale device but prior to approval of the transaction by the third-party processing system:

receiving third-party transaction data, via a vault and in tokenized form, from the third-party payment processing system for the purchase transaction associated with stored payment credentials;

determining that the received third-party transaction data associated with the stored payment credentials meets or exceeds a criteria of an offer of the catalogued offers;

determine that the offer was not previously redeemed at the third-party point of sale system;

redeeming a currency value of the offer in a currency associated with the offer without user input;

converting the currency value of the offer into an amount of a jurisdiction free internal currency of an offer settlement system based on a current exchange rate between the jurisdiction free internal currency and the currency;

crediting the amount of the jurisdiction free internal currency to a ledger of an account associated with the payment credentials in the jurisdiction free internal currency;

convert a portion of the jurisdiction free internal currency into a points value in a points system;

generating updated payment transaction data reflecting the currency value associated with the offer; and sending via the one or more communication interfaces and the vault system, the updated payment transaction data to the third-party payment processing system.

9. The method as recited in claim 8, further comprising:
determine a second currency associated with a location of a user device;
convert a second value of the ledger into the second currency based on a current exchange rate between the jurisdiction free internal currency and the second currency; and
send data representative of the second value in the second currency to the user device.

10. The method as recited in claim 8, further comprising:
receiving a request from a user device associated with the account to transfer a portion of the jurisdiction free internal currency credited to the ledger to a third party system;
determining a second currency associated with the third party system; and
converting the portion of the jurisdiction free internal currency credited to the ledger into a second amount of the second currency based on a current exchange rate between the jurisdiction free internal currency and the second currency.

11. The method as recited in claim 10, wherein the second currency is determined based at least in part on a physical location associated with the third party system, a government entity associated with the third party system, or a selection by the third party system.

\* \* \* \* \*